United States Patent
Soejima

[19]

[11] Patent Number: 5,951,118
[45] Date of Patent: Sep. 14, 1999

[54] VEHICLE HYDRAULIC BRAKING SYSTEM HAVING PRESSURE CONTROL SEATING VALVE WHOSE SEATING VELOCITY IS REDUCED BY CONTROLLER TO REDUCE ABUTTING IMPACT

[75] Inventor: Shinichi Soejima, Toyota, Japan

[73] Assignee: Toyota Jidosha Kabushiki Kaisha, Toyota, Japan

[21] Appl. No.: 09/112,321

[22] Filed: Jul. 9, 1998

[30] Foreign Application Priority Data

Aug. 12, 1997 [JP] Japan ................................. 9-217902

[51] Int. Cl.⁶ .................................................. B60T 8/32
[52] U.S. Cl. .................................. 303/113.1; 303/116.1; 303/119.1; 303/152; 303/119.2
[58] Field of Search ...................... 303/119.2, 115.2, 303/119.1, 119.3, DIG. 1, DIG. 2, 84.1, 84.2, 68, 69, 116.1, 113.1, 162, 152, 15, 20, DIG. 3, DIG. 4, 166, 155, 167; 188/216; 251/129.22, 129.01, 129.02, 129.21, 129.16, 129.18

[56] References Cited

U.S. PATENT DOCUMENTS 5,727,851   3/1998   Ohkubo et al. ..................... 303/119.2

FOREIGN PATENT DOCUMENTS

A-9-175375   7/1997   Japan .

Primary Examiner—Douglas C. Butler
Attorney, Agent, or Firm—Oliff & Berridge, PLC

[57] ABSTRACT

Vehicle hydraulic braking system including a brake including a wheel brake cylinder operated with a pressurized fluid to brake a vehicle wheel, a seating valve having a valve member movable toward and away a valve seat and biased in a first direction for seating of the valve member onto the valve seat, and a valve driving device for generating a valve drive force acting on the valve member in a second direction opposite to the first direction, and a seating valve control device for controlling the valve driving device to selectively open and close the seating valve, for thereby regulating a pressure of the fluid in the wheel brake cylinder, and wherein the seating valve control device includes a seating velocity reducing device for commanding the valve driving device to generate a valve drive force, during at least a portion of a movement of the valve member for seating onto the valve seat, for reducing a seating velocity of the valve member.

9 Claims, 28 Drawing Sheets

FIG. 13
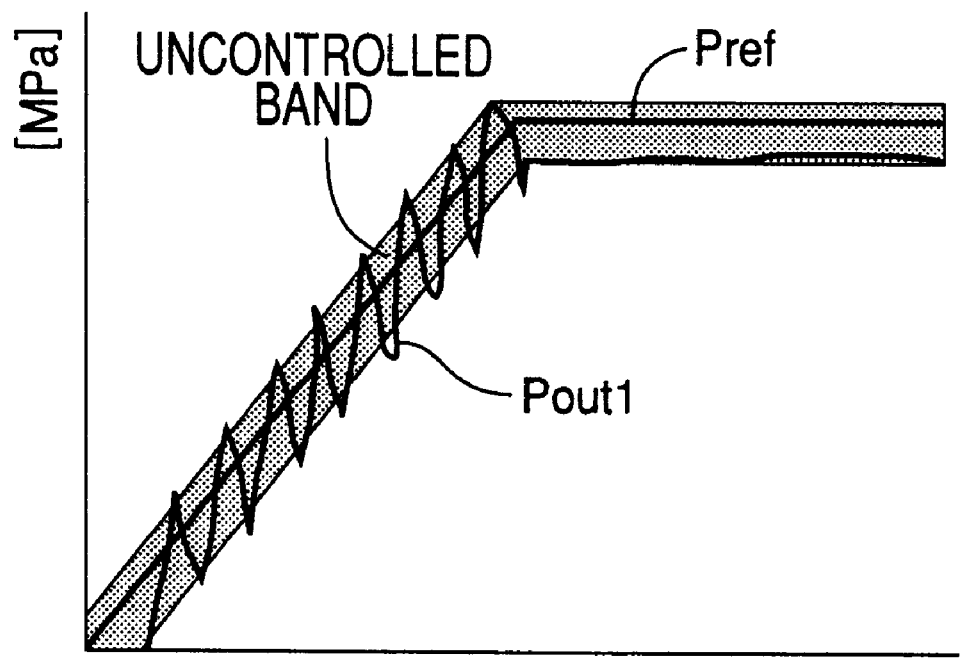
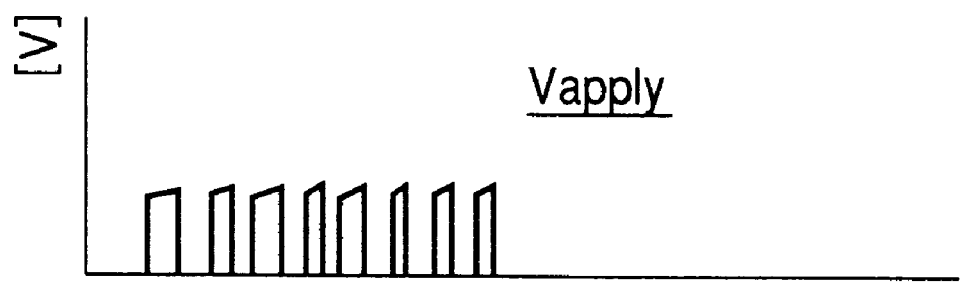
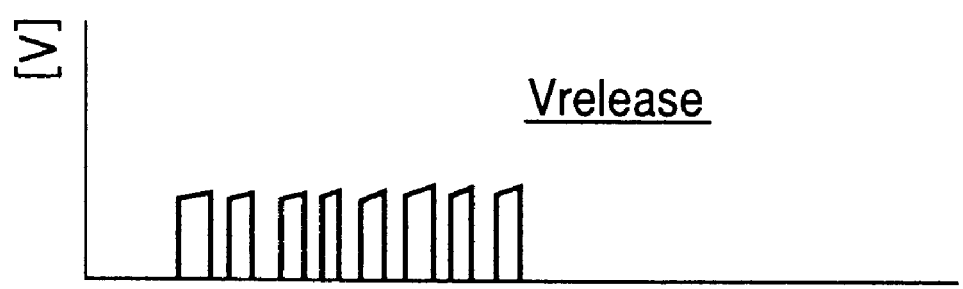

VEHICLE HYDRAULIC BRAKING SYSTEM HAVING PRESSURE CONTROL SEATING VALVE WHOSE SEATING VELOCITY IS REDUCED BY CONTROLLER TO REDUCE ABUTTING IMPACT

This application is based on Japanese Patent Application No. 9-217902 filed Aug. 12, 1997, the content of which is incorporated hereinto by reference.

BACKGROUND OF THE INVENTION

1. Field of the Invention

The present invention relates in general to a hydraulically operated braking system, and more particularly to a control device for controlling a seating valve included in the braking system.

2. Discussion of the Related Art

JP-A-9-175375 (laid-open publication of Japanese Patent Application No. 7-336642 filed by the assignee of the present application) discloses a hydraulically operated braking system which includes (a) a brake for braking a wheel of a motor vehicle, (b) a seating valve, and (c) a seating valve control device for controlling the seating valve. The brake is provided with a wheel brake cylinder which is activated by a pressurized working fluid supplied thereto, to brake the vehicle wheel. The seating valve is provided in a fluid passage connected to the wheel brake cylinder, and includes a valve seat, a valve member which is movable toward the valve seat to be seated thereon and away from the valve seat, a biasing means for biasing the valve member in a biasing direction toward the valve seat, and a valve driving device which generates a drive force which acts on the valve member in a direction opposite to the biasing direction. The seating valve control device controls the valve driving device of the seating valve, so as to selectively open and close the seating valve for regulating the fluid pressure in the wheel brake cylinder. When the valve member is moved by the drive force generated by the valve driving device, away from the valve seat against the biasing force of the biasing means, the seating valve is placed in an open state thereof. When the drive force is zeroed, the valve member is seated on the valve seat by the biasing force of the biasing means, so that the seating valve is placed in a closed state thereof.

In the hydraulically operated braking system disclosed in JP-A-9-175375 (which is not qualified as the prior art against the present invention), the fluid pressure in the wheel brake cylinder is regulated by two seating valves, namely, a pressure-increasing seating valve and a pressure-reducing seating valve. The pressure-increasing seating valve is disposed between the wheel brake cylinder and a master cylinder, and is adapted to be opened to increase the fluid pressure in the wheel brake cylinder. The pressure-reducing seating valve is disposed between the wheel brake cylinder and a reservoir, and is adapted to be opened to reduce the fluid pressure in the wheel brake cylinder.

However, the braking system described above suffers from a problem that the seating valve generates a relatively large impact upon seating of the valve member onto the valve seat. Since the valve member is biased toward the valve seat, the valve member is seated onto the valve seat at a high velocity, with a large impact therebetween, when the drive force generated by the valve drive device is zeroed. The large impact results in an accordingly large noise of abutting contact between the valve member and the valve seat, causing deterioration of driving comfort of the vehicle. Further, the high seating velocity causes early wear or fatigue of the contacting portions of the valve member and valve seat, leading to reduced durability of the seating valve.

SUMMARY OF THE INVENTION

It is therefore a primary object of the present invention to provide a hydraulically operated braking system for a motor vehicle, which includes a seating valve and which is arranged to at least reduce the impact upon seating of the valve member of the seating valve onto the valve seat.

The above object may be achieved according to any one of the following modes of the present invention, each of which is numbered like the appended claims and depends from the other claim or claims, as needed, so as to indicate possible combinations of elements or features in preferred forms of the present invention. It is noted, however, that only the elements provided in the mode (1) are essential, and that any of the elements in the other modes are optional and preferred elements. This summary of the invention does not necessarily describe all necessary elements or features so that the invention may also be a sub-combination of these described features.

(1) A hydraulically operated braking system for a motor vehicle, including (a) a brake including a wheel brake cylinder to which a pressurized fluid is supplied to brake the wheel, (b) a seating valve which is disposed in a fluid passage connected to the wheel brake cylinder and which includes a valve seat, a valve member movable toward and away from the valve seat, biasing means which biases the valve member in a first direction for seating of the valve member onto the valve seat to close the seating valve, and a valve driving device for generating a valve drive force acting on the valve member in a second direction opposite to the first direction, for moving the valve member away from the valve seat, and (c) a seating valve control device for controlling the valve driving device of the seating valve to selectively open and close the seating valve, for thereby regulating a pressure of the pressurized fluid in the wheel brake cylinder, and wherein the seating valve control device comprises seating velocity reducing means for commanding the valve driving device to generate a valve drive force, during at least a portion of a movement of the valve member for seating onto the valve seat, for reducing a seating velocity at which the valve member is seated onto the valve seat, so that the seating velocity reduced by the valve drive force is lower than a seating velocity at which the valve drive force is not generated by the valve driving device.

When the valve drive force generated by the valve driving device is zeroed, the valve member is moved toward and finally seated onto the valve seat, by the biasing force of the biasing means, whereby the seating valve is closed. The velocity of movement of the valve member toward the valve seat is acceleratingly increased, and is maximized upon abutting contact of the valve member with the valve seat. The seating or abutting velocity at which the valve member is seated onto the valve seat increases with an increase in the biasing force of the biasing means. Accordingly, the abutting impact between the valve member and the valve seat increases as the biasing force increases.

When the valve driving device is activated to generate a certain amount of valve drive force acting on the valve member in the direction opposite to the biasing direction of the biasing means while the valve member is moved toward the valve seat, the overall force for moving the valve member toward the valve seat is made smaller than when the valve drive force is zero. In this case, therefore, the acceleration of the valve member is reduced, so that the seating or abutting velocity is reduced, with a result of reduction in the abutting impact, leading to an improvement in the durability of the seating valve. Further, the reduction in the seating velocity results in reduction in the abutting noise. Since the reduction in the seating or abutting velocity of the valve member results in reduction in the abutting impact and noise as described above, the seating velocity reducing means of the seating valve control device may be considered to be means for reducing the abutting impact or abutting noise.

The seating valve may serve as at least one of a pressure-increasing shut-off valve and a pressure-reducing shut-off valve. The pressure-increasing shut-off valve has a pressure increasing state in which the valve member is spaced apart from the valve seat, to permit a flow of the fluid into the wheel brake cylinder, and a pressure holding state in which the valve member is seated on the valve seat, to inhibit the flow of the fluid into the wheel brake cylinder. The pressure-reducing shut-off valve has a pressure reducing state in which the valve member is spaced apart from the valve seat, to permit a flow of the fluid from the wheel brake cylinder, and a pressure holding state in which the valve member is seated on the valve seat, to inhibit the flow of the fluid from the wheel brake cylinder. Alternatively, the seating valve may serve as at least one of a pressure-increasing control valve and a pressure-reducing control valve. The pressure-increasing control valve has a pressure increasing state in which the valve member is spaced apart from the valve seat, to permit a flow of the fluid into the wheel brake cylinder at a flow rate corresponding to a distance between the valve member and the valve seat (a cross sectional area of flow), and a pressure holding state in which the valve member is seated on the valve member, to inhibit the flow of the fluid into the wheel brake cylinder. The pressure-reducing control valve has a pressure reducing state in which the valve member is spaced apart from the valve seat, to permit a flow of the fluid from the wheel brake cylinder at a flow rate corresponding to a distance between the valve member and the valve seat, and a pressure holding state in which the valve member is seated on the valve member, to inhibit the flow of the fluid from the wheel brake cylinder. Each of the pressure-increasing and pressure-reducing control valves may be provided with electromagnetic drive means adapted to be operated with a controlled voltage so that the control valve permits a flow of the fluid therethrough depending upon the voltage value, as long as a pressure difference is present across the control valve. The seating valve may be a directional control valve for fluid communication of the wheel brake cylinder selectively with a high-pressure source and a low-pressure source (reservoir). In any case, the seating valve is adapted to be selectively opened and closed so as to control the fluid pressure in the wheel brake cylinder.

The seating velocity reducing means provided according to the above mode (1) of this invention is adapted to command the valve driving device to generate a valve drive force during at least a portion of the movement of the valve member toward the valve seat, namely, during only a portion of the movement, or during the entire portion of the movement. However, the valve drive force is desirably generated during only a selected portion of the movement. In this case, the valve drive force may be generated only once or two or more times during the selected portion of the movement.

The valve drive force generated may be either constant or variable. Where the valve drive force is constant, it may be a predetermined constant value, or may be a constant value which is determined on the basis of appropriate parameter or parameters such as: a distance or operating stroke between the valve member and the valve seat upon initiation of the movement of the valve member toward the valve seat; a valve drive force which was generated by the valve driving device to control the fluid pressure in the wheel brake cylinder before the seating velocity reducing means is activated; and a pressure difference force based on the pressure difference across the seating valve. Where the valve drive force is variable, it may be reduced or increased with the time.

Where the valve drive force generated is constant, the seating velocity may be lowered by increasing the time duration in which the valve drive force is kept generated. In this case, however, it takes a longer time for the valve member to have been seated on the valve seat, that is, it takes a longer time for the seating valve to be closed. This increasing closing time makes it difficult to regulate the fluid pressure in the wheel brake cylinder as needed for an appropriate braking operation. Where the time duration for which the valve drive force is generated is constant, the seating velocity may be lowered by increasing the valve drive force. In this case, too, the fluid pressure in the wheel brake cylinder cannot be regulated as needed. Therefore, the amount of the valve drive force and the time duration for which the valve drive force is generated are desirably determined so as to not only lower the seating velocity but also reduce deterioration of the control accuracy of the fluid pressure in the wheel brake cylinder.

Since the generation of a valve drive force when the seating valve is closed makes it possible to lower the seating or abutting velocity of the valve member, the seating velocity reducing means may be considered to include means for generating a valve drive force when the seating valve is closed. This means may be considered to include constant force generating means for generating a constant valve drive force, or a variable force generating means for generating a valve drive force which varies with the time. The following modes (2) and (3) of the present invention include examples of the variable force generating means, while the following mode (4) includes an example of the constant force generating means.

(2) A hydraulically operated braking system according to the above mode (1), wherein the seating velocity reducing means includes gradual drive force reducing means for reducing the valve drive force such that a rate of reduction of the seating velocity of the valve member is gradually reduced.

In the braking system according to the above mode (2), the valve drive force which is generated during at least a portion of the movement of the valve member toward the valve seat is exponentially reduced. In this arrangement, the rate of reduction of the valve drive force immediately after initiation of the reduction of the valve drive force (immediately after the generation of the valve drive force) is higher than where the valve drive force is linearly reduced. Since the valve drive force is rapidly reduced, the distance between the valve member and the valve seat can be immediately reduced, so that the rate of flow of the fluid between the valve member and the valve seat can be immediately lowered. The rate of reduction of the valve drive force is lowered after the flow rate of the fluid has been considerably lowered, so that the relatively slow movement of the valve member into abutting contact with the valve seat will have only a small influence on the accuracy of control of the wheel brake cylinder pressure by the seating valve.

(3) A hydraulically operated braking system according to the above mode (2), wherein the gradual drive force reducing means determines a present value of the valve drive force by multiplying a last value of the valve drive force by a predetermined constant which is smaller than one.

The gradual drive force reducing means according to the above mode (3) is adapted to obtain the present value of the valve drive force by multiplying the last value by the predetermined constant smaller than one. This arrangement facilitates control processing to determine the instantaneous valve drive force. The gradual drive force reducing means is an example of the variable force generating means, and may be considered to serve as means for reducing the valve drive force when the seating valve is closed.

(4) A hydraulically operated braking system according to the above mode (1), wherein the seating velocity reducing means includes stopping drive force generating means for generating a constant valve drive force, at least immediately before seating of the valve member onto the valve seat, the constant valve drive force being sufficient to substantially stop the movement of the valve member.

The valve drive force sufficient to substantially stop the movement of the valve member immediately before its seating onto the valve seat can be determined on the basis of the operating stroke of the valve member (distance between the valve member and the valve seat) upon initiation of the seating or closing movement of the valve member, the biasing force of the biasing means, and the pressure difference force acting on the valve member based on the fluid pressure difference across the seating valve. The valve drive force required to stop the movement of the valve member immediately before its seating onto the valve member increases with an increase in the operating stroke of the valve member upon initiation of the closing or seating movement. Similarly, the valve drive force required to stop the movement of the valve member increases with an increase in the biasing force of the biasing means. On the other hand, the required valve drive force to stop the movement decreases with an increase in the pressure difference force. The braking system according to the above mode (4) preferably includes means for obtaining the operating stroke of the valve member, and means for obtaining the pressure difference force acting on the valve member.

The stopping drive force generating means according to the above mode (4) is adapted to generate the constant valve drive force, at least immediately before seating of the valve member onto the valve seat. That is, the constant valve drive force may be kept generated throughout the movement of the valve member, namely, from the moment of initiation of the movement up to a moment immediately before the moment of seating of the valve member onto the valve seat. Alternatively, the constant valve drive force may be generated during a portion of the movement, from a moment a given time after the moment of initiation of the movement, up to a moment immediately before the moment of seating of the valve member. Still alternatively, the constant valve drive force may be generated immediately before the moment of seating of the valve seat.

The stopping drive force generating means may be adapted to permit the valve member to be rapidly moved toward the valve seat, up to a position only a short distance ahead of the valve seat, and to substantially stop the valve member at that position. This arrangement permits rapid reduction of the rate of flow of the fluid through the seating valve, and is effective to minimize a delay in the closing action of the seating valve due to the operation of the seating velocity reducing means. The stopping drive force generating means is an example of the constant force generating means.

(5) A hydraulically operated braking system according to any one of the above modes (1)–(4), further including a pressure-increasing control valve and a pressure-reducing control valve at least one of which is the seating valve, the pressure-increasing control valve having a pressure increasing state in which the valve member is spaced apart from the valve seat, to permit a flow of the fluid into the wheel brake cylinder at a flow rate corresponding to a distance between the valve member and the valve seat, and a pressure holding state in which the valve member is seated on the valve seat, to inhibit the flow of the fluid into the wheel brake cylinder, the pressure-reducing control valve having a pressure reducing state in which the valve member is spaced apart from the valve seat, to permit a flow of the fluid from the wheel brake cylinder at a flow rate corresponding to a distance between the valve member and the valve seat, and a pressure holding state in which the valve member is seated on the valve seat, to inhibit the flow of the fluid from the wheel brake cylinder.

In the braking system according to the above mode (5), the seating valve serves as at least one of the pressure-increasing and pressure-reducing control valves. In the control valve which is the seating valve, the seating velocity at which the valve member is seated onto the valve seat is lowered by the valve drive force, which is generated by the valve driving device under the control of the seating velocity reducing means, during at least a portion of the movement of the valve member toward the valve seat.

The principle of the present invention wherein the seating velocity reducing means is provided is applicable to at least one of the pressure-increasing and pressure-reducing control valves, to reduce the abutting impact between the valve member and the valve seat. The seating velocity reducing means may be activated each time the seating valve (pressure-increasing or pressure-reducing control valve) is brought to its closed state, or activated only when the seating valve is closed under a certain selected condition. In the latter case, the seating velocity reducing means is activated only where the abutting noise of the seating valve is expected to be large in the absence of the activation of the seating velocity reducing means, or only where the seating valve is closed under a quiet condition in which the abutting noise of the seating valve is particularly recognized as a noise. This arrangement permits the seating velocity reducing means to provide an intended effect while minimizing the deterioration of the control accuracy of the fluid pressure in the wheel brake cylinder due to the activation of the seating velocity reducing means.

In the braking system according to the above mode (5), the fluid pressure in the wheel brake cylinder is increased by opening the pressure-increasing control valve and closing the pressure-reducing control valve, and is reduced by opening the pressure-reducing control valve and closing the pressure-increasing control valve. The fluid pressure in the wheel brake cylinder is held at the same level by closing the pressure-increasing and pressure-reducing control valves. The seating velocity reducing means may be activated only when the pressure-increasing or pressure-reducing control valve which has been open to increase or reduce the fluid pressure in the wheel brake cylinder is closed to hold the wheel brake cylinder pressure. In this case, the seating velocity reducing means may not be activated when the pressure-increasing or pressure-reducing control valve which has been open to increase or reduce the wheel brake cylinder pressure is closed to reduce or increase the wheel brake cylinder pressure. In this case, the seating velocity reducing means of the seating valve control device functions as means for commanding the valve driving device to generate a valve drive force when the control valve (seating valve) is closed to hold the fluid pressure in the wheel brake cylinder. If the seating velocity reducing means is activated when the control valve (seating valve) which has been open to increase or reduce the wheel brake cylinder pressure is closed to reduce or increase the wheel brake cylinder pressure, the seating velocity reducing means functions as means for commanding the valve driving device to generate a valve drive force when the wheel brake cylinder pressure which has been reduced or increased is increased or reduced.

(6) A hydraulically operated braking system according to any one of the above modes (1)–(5), wherein the valve driving device includes a movable member which is formed of a ferromagenetic material and which is movable with the valve member, and a solenoid coil which is energized to produce a magnetic field for moving the movable member in the second direction opposite to the first direction which the valve member is biased by the biasing means.

When a voltage is applied to the solenoid coil, the movable member is subjected to a magnetic force acting in the direction opposite to the biasing direction of the biasing means, so that the movable member is moved in the second direction to move the valve member away from the valve seat, for thereby opening the seating valve. When a voltage is applied to the solenoid coil during at least a portion of the movement of the valve member toward the valve seat for closing the seating valve, the velocity at which the valve member is seated onto the valve seat can be lowered. Thus, the voltage applied in this case may be considered a voltage for reducing the seating or abutting velocity or the seating or abutting noise upon abutting contact of the valve member with the valve seat.

(7) A hydraulically operated braking system for a motor vehicle having a wheel, including (a) a brake including a wheel brake cylinder to which a pressurized fluid is supplied to brake the wheel, (b) a seating valve which is disposed in a fluid passage connected to the wheel brake cylinder and which includes a valve seat, a valve member movable toward and away from the valve seat, biasing means which biases the valve member in a first direction for moving the valve member away from the valve seat to open the seating valve, and a valve driving device for generating a valve drive force acting on the valve member in a second direction opposite to the first direction, for seating of the valve member onto the valve seat to close the seating valve, and (c) a seating valve control device for controlling the valve driving device of the seating valve to selectively open and close the seating valve, for thereby regulating a pressure of the pressurized fluid in the wheel brake cylinder, the braking system being characterized in that the seating valve control device comprises seating velocity reducing means operable for commanding the valve driving device to reduce the valve drive force, immediately before seating of the valve member onto the valve seat, such that the reduced valve drive force is smaller than the valve drive force before operation of the seating velocity reducing means, for reducing a seating velocity at which the valve member is seated onto the valve seat.

In the braking system according to the above mode (7) of this invention, the valve member is moved toward and seated onto the valve seat when a valve drive force is generated so as to act on the valve member in the second direction opposite to the first direction in which the biasing force of the biasing means acts on the valve member. By reducing the valve drive force, the velocity of the movement of the valve member is lowered and substantially zeroed to substantially stop the movement of the valve member toward the valve seat. Where the biasing force of the biasing means increases as the valve member approaches the valve seat, the moving velocity of the valve member can be reduced even if the valve drive force is held constant during the movement of the valve member for seating onto the valve seat. However, it is desirable to positively reduce the valve drive force. For instance, it is desirable to hold the valve drive force at a relatively large value until the valve member has been moved to a position which is a short distance ahead of the valve seat, and then reduce the valve drive force when the valve member has been moved to that position. In this case, the valve member can be rapidly moved to the position near the valve seat, and substantially stopped or decelerated immediately before the seating of the valve member onto the valve seat.

(8) A braking system for a motor vehicle, including a hydraulically operated braking system according to any one of the above modes (1)–(7), and a regenerative braking system including an electric motor which generates a regenerative braking force for braking the wheel.

BRIEF DESCRIPTION OF THE DRAWINGS

The above and optional objects, features, advantages and technical and industrial significance of this invention will be better understood by reading the following detailed description of presently preferred embodiments of the invention, when considered in connection with the accompanying drawings, in which:

FIG. 13 is a graph indicating an example of a change in the desired fluid pressure Pref, and an example of a change in an output fluid pressure Pout1 according to the voltage values VFapply and VFrelease calculated in the sub-routine of FIG. 7;

DETAILED DESCRIPTION OF THE PREFERRED EMBODIMENTS

The following detailed description of the preferred embodiments is provided for illustrative purpose only, and is not provided to limit the claimed invention. It is to be understood that the invention is not limited to the details of the illustrated embodiments and that the combinations of the features in the illustrated embodiments are not to be construed to be essential according to the principle of the invention.

Figure 1:
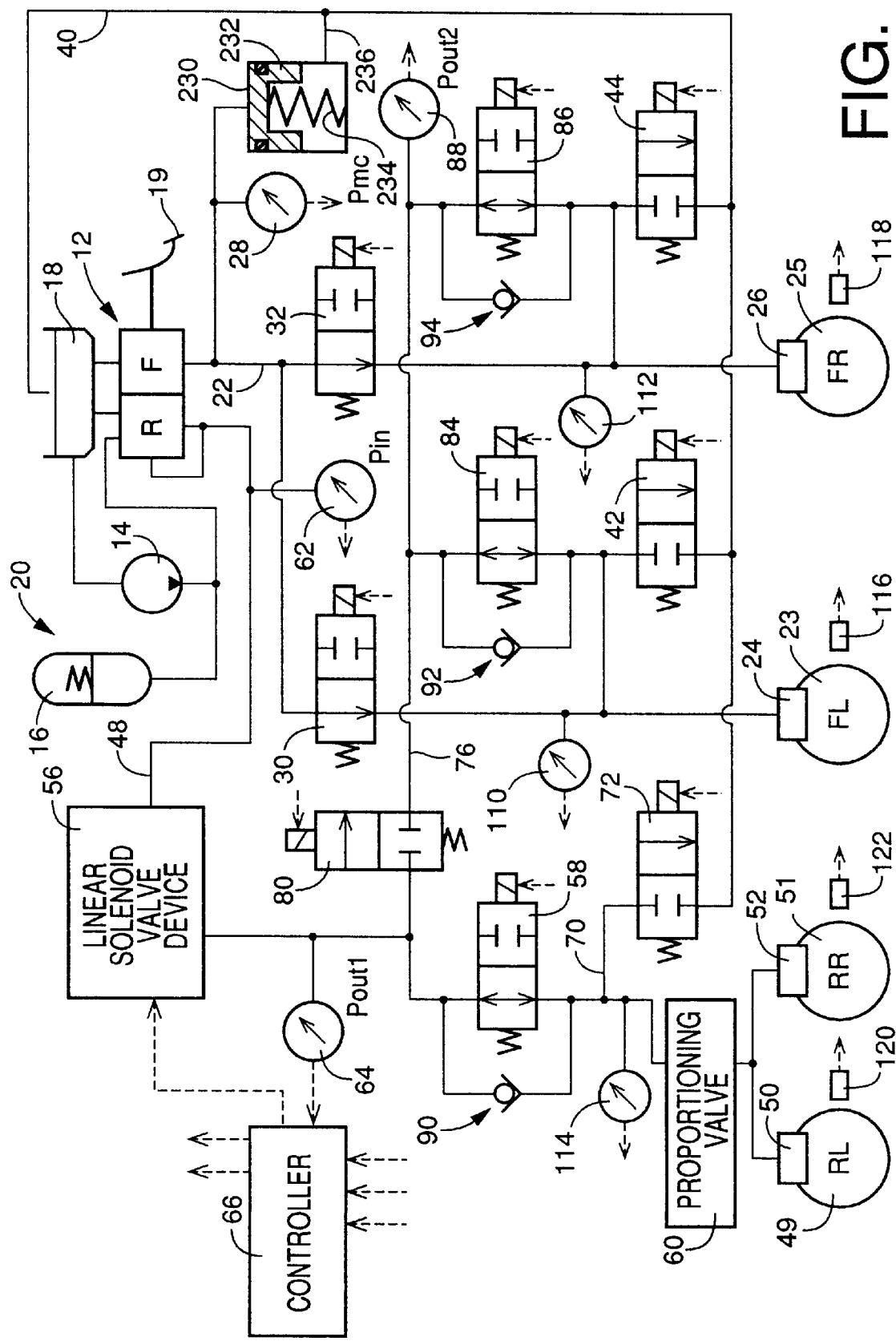
FIG. 1 is a diagram showing a hydraulically operated braking system constructed according to one embodiment of the present invention.

Referring first to the diagram of FIG. 1, there is shown a hydraulically operated braking system for a motor vehicle, which is constructed according to one preferred embodiment of this invention. The motor vehicle is a so-called hybrid vehicle equipped with an internal combustion engine and an electric motor as a drive power source. The hybrid vehicle includes a regenerative braking system (not shown) as well known in the art, as well as the present hydraulically operated braking system (hereinafter referred to as "hydraulic braking system" where appropriate). The regenerative braking system uses the electric motor as an electric generator or dynamo, which is operated in a regenerative braking mode so as to provide a regenerative brake. The electric energy generated by the electric generator in the regenerative braking mode is stored in a battery. Described more specifically, the drive shaft of the electric motor placed in the regenerative braking mode is forcibly driven by a kinetic energy of the running vehicle during deceleration of the vehicle, and the electric motor is operated as the electric generator to generate an electromotive force (regenerative electromotive force), which is utilized to charge the battery. In the regenerative braking mode, the electric motor functions as a load, and therefore applies a regenerative brake to the vehicle. In other words, a portion of the kinetic energy of the vehicle under deceleration is converted into an electric energy stored in the battery. Thus, the regenerative braking system not only functions to apply brake to the vehicle, but also functions to charge the battery, so as to prevent excessive reduction of the electric energy amount stored in the battery, making it possible to increase the running distance of the vehicle without charging of the battery by an external charging device.

The regenerative braking force is not always constant. When the running speed of the vehicle is extremely low, for example, the regenerative braking force is almost zero. When the battery is fully charged, the hybrid drive system of the vehicle is generally inhibited from being operated in the regenerative braking mode, in order to prevent deterioration of the battery due to excessive charging thereof with the electric energy generated by the regenerative braking system. While the regenerative braking is inhibited, the regenerative braking force is zero. On the other hand, the braking force generated by the hydraulic braking system has to be controlled to a value which is desired by the vehicle operator and which does not have a direct relationship with the regenerative braking force. Therefore, the hydraulic braking force that must be generated by the hydraulic braking system 10 is equal to the operator's desired braking force minus the regenerative braking force. The control mode in which the hydraulic braking system 10 is controlled to provide the hydraulic braking force equal to the operator's desired braking force minus the regenerative braking force will be referred to as "cooperative control mode", which is the mode in which the hydraulic braking system 10 is operated in cooperation with the regenerative braking system. The operator's desired braking force can be readily obtained from the operating state of the brake operating member, such as the operating force, amount and time of the brake operating member. Information regarding the regenerative braking force can be obtained from the regenerative braking system of the hybrid drive device.

Figure 3:
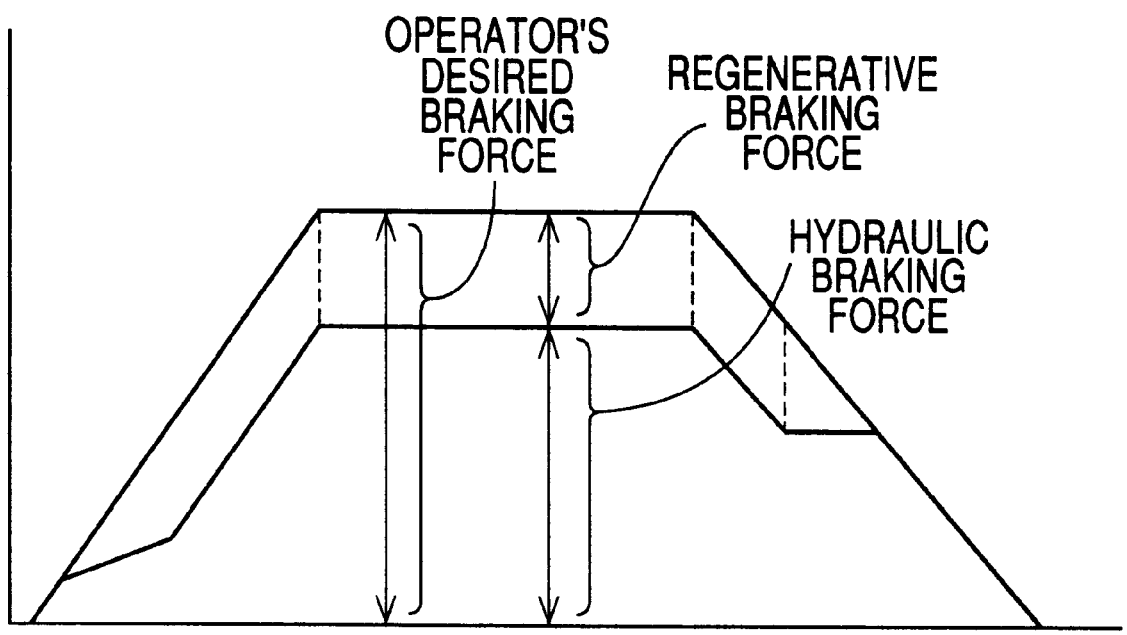
FIG. 3 is a graph schematically indicating an pressure control operation of a controller in the braking system of FIG. 1.

Referring to the graph of FIG. 3, there is schematically indicated a relationship among the operator's desired braking force (total braking force), the regenerative braking force generated by the regenerative braking system, and the hydraulic braking force generated by the hydraulic braking system. It will be understood from the graph that the hydraulic braking force and the regenerative braking force increase with an increase in the operator's desired braking force as obtained from the operating state of the brake operating member. In the example of FIG. 3, the regenerative braking force begins to increase a given time after the hydraulic braking force begins to increase. However, this arrangement is not essential. After the regenerative braking force has increased to a maximum value which is determined by the vehicle running speed, for example, the total braking force desired by the vehicle operator is increased by an increase of the hydraulic braking force only. Thus, the utilization of the regenerative braking force is maximized in the present arrangement, for braking the vehicle. Since the vehicle speed is gradually lowered with the total braking force being applied to the vehicle, the regenerative braking force is also gradually reduced. In the graph of FIG. 3, however, the regenerative braking force is indicated so as to be held constant, for simplicity of the explanation. When the operator's desired braking force is reduced as a result of reduction of the vehicle running speed, the regenerative braking force is reduced. Where the operating speed of the electric motor is reduced as a result of reduction of the vehicle running speed, a comparatively large electric energy may be required to obtain a sufficiently large regenerative braking force, or the control hunting of the regenerative braking force may be increased. To avoid these drawbacks, the regenerative braking force is reduced to zero. After the regenerative braking force has been zeroed, the hydraulic braking force is reduced with the operator's desired braking force such that the hydraulic braking force is substantially equal to the desired braking force.

As shown in FIG. 1, the present hydraulic braking system includes a master cylinder 12, a pump 14, and an accumulator 16 for storing a highly pressurized working fluid delivered from the pump 14. The master cylinder 12 and the pump 14 are supplied with the fluid from a master reservoir 18. The master cylinder 12 has two pressurizing chambers F and R. When a brake pedal 19 is operated, substantially the same hydraulic pressure is generated in the two pressurizing chambers F, R. To the pressurizing chamber R, there is connected a constant pressure source 20, so that a pressurized fluid is delivered from the constant pressure source 20 to the pressurizing chamber R upon operation of the brake pedal 19. This arrangement makes it possible to reduce the required operating stroke of the brake pedal 19.

The pressure of the fluid stored in the accumulator 16 is maintained by an operation of the pump 14 as needed, within a predetermined range, for example, between 17 MPa and 18 MPa (between 174 kgf/cm$^2$ and 184 kgf/cm$^2$). The accumulator 16 is provided with a pressure switch, so that the pump 14 is turned on and off in response to a switching operation (on and off states) of the pressure switch, with a given hysteresis. The pump 14 and the accumulator 16 cooperate to constitute a constant pressure source 20 which provides the working fluid having a substantially constant pressure.

The pressurizing chamber F of the master cylinder 12 is connected through a fluid passage 22 to a brake cylinder 24 for a front left wheel 23 of the vehicle and a brake cylinder 26 for a front right wheel 25 of the vehicle. The brake cylinders 24, 26 will be referred to as "FL wheel brake cylinder 24" and "FR wheel brake cylinder 261", respectively. A pressure sensor 28 is connected to a portion of the fluid passage 22, which portion is near the pressurizing chamber F. The pressure sensor 28 is provided to detect a fluid pressure Pmc in the fluid passage 22. This fluid pressure Pmc will be referred to as "master cylinder pressure Pmc". The fluid passage 22 has two branch portions connected to the respective FL and FR wheel brake cylinders 24, 26. These branch portions are connected to a fluid passage 40, which is connected a master reservoir 18. Normally open solenoid-operated shut-off valves 30, 32 are provided in the respective two branch portions of the fluid passage 22, while solenoid-operated shut-off valves 42, 44 are connected between the fluid passage 40 and the respective branch portions of the fluid passage 22. The shut-off valves 42, 44 serve as pressure-reducing valves in an anti-lock pressure control operation.

On the other hand, the pressurizing chamber R of the master cylinder 12 is connected through a fluid passage 48 to a brake cylinder 50 for a rear left wheel 49 of the vehicle and a brake cylinder 52 for a rear right wheel 51 of the vehicle. The brake cylinders 50, 52 will be referred to as "RL wheel brake cylinder 50" and "RR wheel brake cylinder 52", respectively. The fluid passage 48 has two branch portions connected to the respective RL and RR wheel brake cylinders 50, 52. To the fluid passage 48, there are connected a linear solenoid valve device 56, a normally open solenoid-operated shut-off valve 58 and a proportioning valve 60. The shut-off valve 58 serves as a pressure-increasing valve in the anti-lock pressure control operation. A pressure sensor 62 is connected to a portion of the fluid passage 48 between the master cylinder 12 and the linear solenoid valve device 56, while a pressure sensor 64 is connected to a portion of the linear solenoid valve device 56 and the shut-off valve 58. The fluid pressure detected by the pressure sensor 62 will be referred to as "input fluid pressure Pin", while the pressure detected by the pressure sensor 64 will be referred to as "output fluid pressure Pout1". In other words, the pressure sensors 62, 64 are provided to detect the input and output fluid pressures Pin and Pout1 on the opposite sides of the linear solenoid valve device 56.

The output signals of the pressure sensors 28, 62, 64 which represent the master cylinder pressure Pmc and the input and output fluid pressures Pin, Pout1 are applied to a controller 66. As described below, the controller 66 is adapted to control the linear solenoid valve device 56 on the basis of the output signal of the linear solenoid valve device 56. The fluid passage 40 is connected through a fluid passage 70 to a portion of the fluid passage 48 between the shut-off valve 58 and the proportioning valve 60. A solenoid-operated shut-off valve 72 is connected to the fluid passage 70. This shut-off valve 72 serves as a pressure-reducing valve in the anti-lock pressure control operation.

A fluid passage 76 is connected to a part of the fluid passage 48 between the linear solenoid valve device 56 and the solenoid-operated shut-off valve 58. The fluid passage 76 is provided to connect the linear solenoid valve device 56 to the FL and FR wheel brake cylinders 24, 26. A normally closed solenoid-operated shut-off valve 80 is provided in the fluid passage 76. Normally open solenoid-operated shut-off valves 84, 88 are connected between the respective wheel brake cylinders 24, 26 and a portion of the fluid passage 76 between the shut-off valve 80 and the wheel brake cylinders 84, 86. These shut-off valves 84, 88 serve as pressure-increasing valves in the anti-lock pressure control operation.

A pressure sensor 88 is connected to a portion of the fluid passage 76 between the shut-off valve 80 and the shut-off valves 84, 86. The fluid pressure detected by the pressure sensor 88 will be referred to as "output fluid pressure Pout2". The output signal of the pressure sensor 88 is applied to the controller 66. The output fluid pressure Pout2 is used to check if the output signal of the pressure sensor 64 is normal. That is, the controller 66 determines that the output of the pressure sensor 64 is abnormal, if the output fluid pressure Pout1 detected by the pressure sensor 64 when the shut-off valve 80 is open differs from the output fluid pressure Pout2 detected by the pressure sensor 88. When the shut-off valve 80 is open, the two pressure sensors 64, 88 communicate with each other, so that the output fluid pressures Pout1 and Pout2 must be substantially the same if the pressure sensors 64, 88 are both normally functioning. In the present embodiment, the controller 66 is adapted to activate a suitable indicator for informing the vehicle operator of any abnormality of the pressure sensor, when the controller 66 has determined the presence of the abnormality. However, the controller 66 may be adapted to inhibit its operation of controlling the linear solenoid valve device 56, as well as or rather than to active such an indicator.

The solenoid coils of the solenoid-operated shut-off valves 30, 32, 42, 44, 58, 72, 80, 84 are controlled according to control commands received from the controller 66.

A check valve 90 is provided in a by-pass passage which by-passes the normally open shut-off valve 58, and check valves 92, 94 are provided in respective by-pass passages which by-pass the respective solenoid-operated shut-off valves 84, 86. Each of these check valves 90, 92, 94 permits a flow of the fluid in a direction from the corresponding wheel brake cylinder 24, 26 or cylinders 50, 52 toward the master cylinder 12, but inhibits a flow of the fluid in the opposite direction. The check valves 90, 902, 94 allow the fluid to be rapidly returned from the wheel brake cylinders 24, 26, 50, 52 to the master cylinder 12 when the brake pedal 19 is released.

In the present embodiment, pressure sensors 110, 112 are provided to detect the fluid pressures in the respective FL and FR wheel brake cylinders 24, 26, while a common pressure sensor 114 is provided to detect the fluid pressure applied to the RL and RR wheel brake cylinders 50, 52.

Further, respective wheel speed sensors 116, 118, 120, 122 are provided to detect the rotating speeds of the respective four wheels 23, 25, 49, 51. The controller 66 monitors the slipping conditions of the wheels 23, 25, 49, 51 during brake application, on the basis of the output signals of the wheel speed sensors 116–122.

Figure 2:
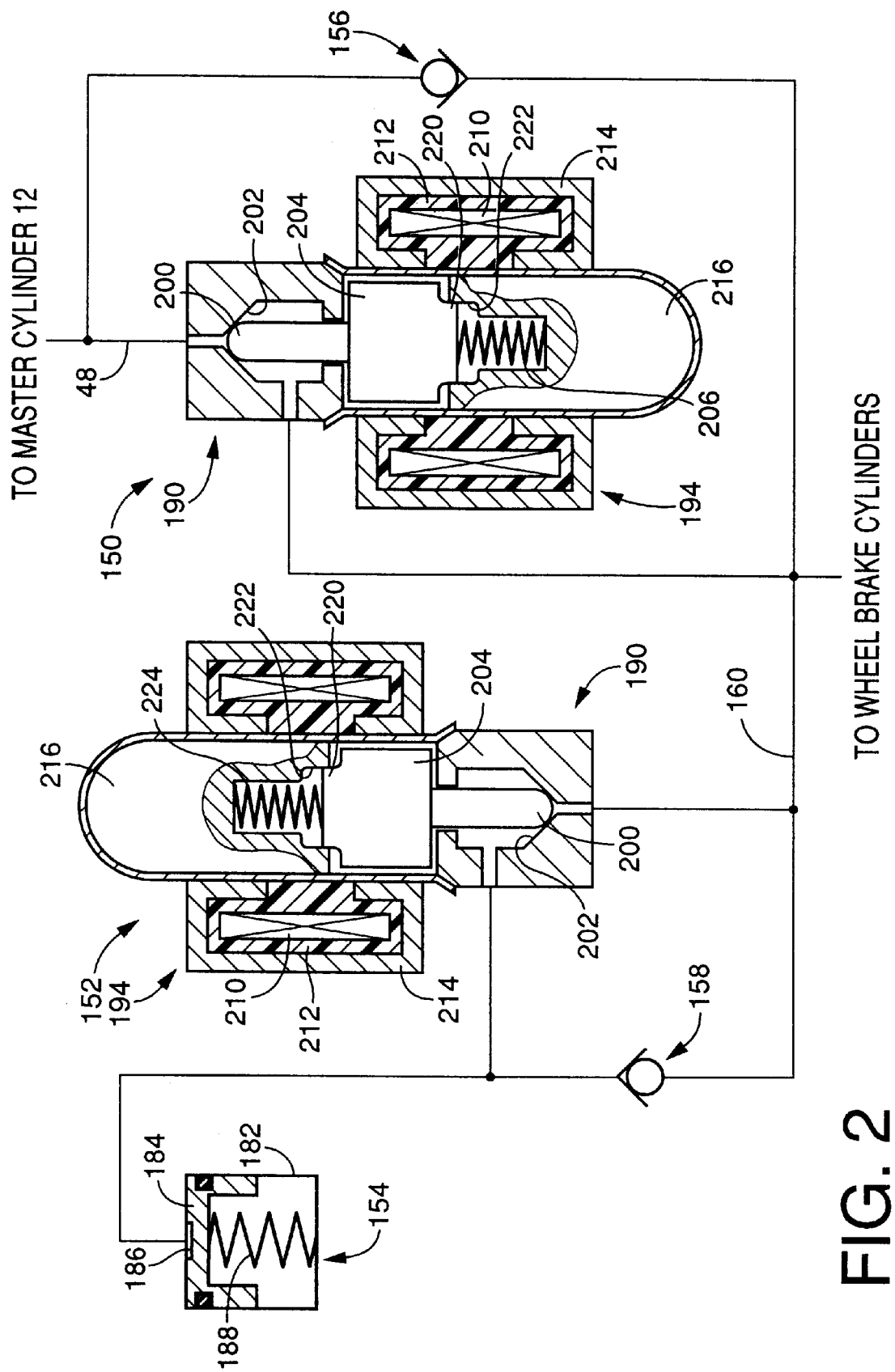
FIG. 2 is view schematically showing an arrangement of a linear solenoid valve device in the braking system of FIG. 1.

Referring to FIG. 2, there is schematically shown the arrangement of the linear solenoid valve device 56, which includes a pressure-increasing linear solenoid valve 150, a pressure-reducing linear solenoid valve 152, a pressure-reducing reservoir 154 and check valves 156, 158. The pressure-increasing linear solenoid valve 150 is provided in the fluid passage 48, and the pressure-reducing linear solenoid valve 152 is provided in a fluid passage 160 which connects the fluid passage 48 and the pressure-reducing reservoir 154. The check valve 156 is provided in a by-pass passage which by-passes the pressure-increasing linear solenoid valve 150. The check valve 156 permits a flow of the fluid in a direction from the wheel brake cylinders 24, 26, 50, 52 toward the master cylinder 12, and inhibits a flow of the fluid in the opposite direction. The check valve 158 is provided in a by-pass passage which by-passes the pressure-reducing linear solenoid valve 152. The check valve 158 permits a flow of the fluid in a direction from the pressure-reducing reservoir 154 toward the master cylinder 12, and inhibits a flow of the fluid in the opposite direction.

The pressure-reducing reservoir 154 includes a housing 182, and a piston 184 fluid-tightly and slidably received in the housing 182. The housing 182 and the piston 184 cooperate to define a fluid chamber 186 whose volume changes as the piston 184 is moved. The piston 184 is biased by biasing means in the form of a compression coil spring 188 in a direction of reducing the volume of the fluid chamber 186.

The fluid accommodated in the fluid chamber 186 is pressurized by an elastic force of the spring 188. However, the elastic force of the spring 188 is comparatively small, and the fluid pressure in the fluid chamber 186 based on the elastic force of the spring 188 is accordingly low and can be ignored, as compared with the pressures in the master cylinder 12 and wheel brake cylinders 24, 26, 50, 52 during brake application. Accordingly, the fluid discharged from the wheel brake cylinders 24, 26, 50, 52 so as to reduce the fluid pressures therein can be accommodated into the pressure-reducing reservoir 154, with the piston 184 being moved against the biasing force of the compression coil spring 188. In the present embodiment, the pressure-increasing and pressure-reducing linear solenoid valves 150, 152 are both brought to their open states immediately before termination of a braking operation, so that the fluid accommodated in the fluid chamber 186 of the reservoir 154 during the braking operation is returned to the master cylinder 12 through the linear solenoid valves 150, 152.

In the above arrangement wherein the linear solenoid valves 150, 152 are opened immediately before or upon termination of a braking operation, the fluid accommodated in the fluid chamber 186 can be substantially entirely returned to the master cylinder 12, even when the preset load or biasing force of the compression coil spring 188 is relatively small. In other words, the present arrangement makes it possible to reduce the required biasing force of the spring 188, while effectively preventing the fluid from remaining in the fluid chamber 186 after the braking operation. If a considerable amount of the fluid was left in the fluid chamber 186 after the braking operation, it would be difficult to reduce the fluid pressures in the wheel brake cylinders 24, 26, 50, 52 in the next braking operation.

The pressure-increasing linear solenoid valve 150 includes a seating valve 190 and an electromagnetic biasing device 194. The seating valve 190 includes a valve member 200, a valve seat 202, a biased member 204 movable with the valve member 200, and a spring 206 which functions as an elastic member for biasing the biased member 204 in a direction of moving the valve member 200 to be seated on the valve seat 202. The electromagnetic biasing device 194 includes a solenoid coil 210, a holder member 212 made of a resin material for holding the solenoid coil 210, a first magnetic path defining member 214 and a second magnetic path defining member 216. When an electric current flows through the solenoid coil 210 with a voltage being applied thereto at its opposite ends, a magnetic field is produced. Most of the magnetic flux passes the first and second magnetic path defining members 214, 216, the biased member 204, and an air gap between the second magnetic path defining member 216 and the biased member 204. By changing the voltage applied across the solenoid coil 210, the magnetic force acting between the biased member 204 and the second magnetic path defining member 216 changes accordingly. This magnetic force increases with an increase in the voltage applied across the solenoid coil 210. The relationship between the magnetic force and the voltage can be known. By continuously changing the voltage applied to the solenoid coil 210, the force biasing the biased member 204 can be changed accordingly. This biasing force is a magnetic force acting on the biased member 204 toward the second magnetic path defining member 216, and will be referred to as "electromagnetic drive force" which should be distinguished from the biasing force generated by the spring 206. The electromagnetic drive force acts on the biased member 204 in the direction opposite to the biasing direction of the spring 206, namely, in the direction for moving the valve member 200 away from the valve seat 202. The biased member 204 has a protrusion 220 extending toward the second magnetic path defining member 216, while the member 216 has a recess 222 which engages the protrusion 220. The length of engagement of these protrusion 220 and recess 222 in the direction of movement (axial direction) of the member 204 varies with a change in the relative axial position of the members 204, 216.

The magnetic reluctance of the magnetic path formed by the biased member 203 and the second magnetic path defining member 216 varies with a change in the relative axial position of the members 204, 216. Described in detail, the outer circumferential surface of the protrusion 220 of the biased member 204 and the inner circumferential surface of the recess 222 of the second magnetic path defining member 216 have respective portions which are opposed to each other with a small clearance therebetween. A change in the relative axial position will cause a change in the surface area of the mutually opposed portions of the outer and inner circumferential surfaces of the protrusion 220 and recess 222. If the members 204, 216 were simply disposed with their end faces opposed to each other with a small axial clearance therebetween, a decrease in the axial distance between the opposed end faces of the members 204, 216 as a result of their movements toward each other would cause an exponential decrease in the magnetic reluctance and an exponential increase in the magnetic force which acts between the members 204, 216. In the present pressure-increasing linear solenoid valve 150, however, the movements of the members 204, 216 toward each other will cause an increase in the above-indicated surface area of the opposed portions of the circumferential surfaces of the members 204, 216, and an increase in the magnetic flux passing the circumferential surfaces, while at the same time cause a decrease in the magnetic flux passing the clearance between the opposed end faces of the members 204, 216. As a result, the magnetic force (electromagnetic drive force) which biases the biased member 204 toward the second magnetic path defining member 216 can be held substantially constant irrespective of the relative axial position of the members 204, 216, provided the voltage applied to the solenoid coil 210 is not so high and is held constant. On the other hand, the biasing force of the spring 206 which biases the member 204 away from the second magnetic path defining member 216 increases with the movements of the members 204, 216 toward each other. Therefore, in the absence of a force which acts on the valve member 200 based on the fluid pressure difference, a movement of the biased member 204 toward the member 216 is terminated when the electromagnetic force becomes equal to the biasing force of the spring 206.

Basically, the pressure-reducing linear solenoid valve 152 is identical in construction with the pressure-reducing linear solenoid valve 150, except for a spring 224 functioning as the biasing member. The spring 224 has a biasing force different from that of the spring 206 of the pressure-increasing linear solenoid valve 150. The same reference numerals as used for the pressure-increasing linear solenoid valve 150 are used to identify the functionally corresponding elements of the pressure-reducing linear solenoid valve 152, and redundant description of these elements will not be provided.

As indicated in FIG. 3, the pressure-increasing linear solenoid valve 150 receives the biasing force Fp of the spring 206, the force Fd based on a difference between the fluid pressures on the opposite sides of the valve 150, and the electromagnetic drive force Fs generated by energization of the solenoid 210. The fluid pressure difference on the opposite sides of the valve 150 is a difference between the input and output pressures Pin and Pout1 detected by the respective pressure sensors 62, 64. The pressure-increasing linear solenoid valve 150 is opened with the valve member 200 moved away from the valve seat 202, when a sum of the force Fd and the electromagnetic drive force Fs becomes larger than the biasing force Fp of the spring 206. While the electromagentic drive force Fs is zero, the valve 150 is opened when the force Fd becomes larger than the biasing force Fp. This force Fd based on the fluid pressure difference will be referred to as "opening pressure difference" of the valve 150. In the present embodiment, the opening pressure difference of the valve 150 is set to be about 3 MPa (about 30.6 kgf/cm$^2$).

Like the pressure-increasing linear solenoid valve 150, the pressure-reducing linear solenoid valve 150 receives the biasing force Fp, the force Fd based on the fluid pressure difference, and the electromagnetic drive force Fs. The opening pressure difference of the pressure-reducing linear solenoid valve 152 is set to be larger than 18 MPa (about 184 kgf/cm$^2$), which is the maximum pressure of the fluid received from the constant pressure source 20. In this respect, it is noted that the biasing force of the spring 224 is higher than (about six times as high as) the biasing force of the spring 206. In the present hydraulic braking system, the maximum fluid pressure which acts on the valve member 200 of the pressure-reducing linear solenoid valve device 152 is the maximum pressure of the fluid pressurized by the pump 14 and accommodated in the accumulator 16. There exists substantially no possibility that the fluid pressure pressurized by the master cylinder 12 upon depression of the brake pedal 19 by the vehicle operator exceeds the maximum pressure in the accumulator 16. Namely, the depression of the brake pedal 19 will not generally cause a rise of the fluid pressure applied to the valve member 200 of the valve 152, by an amount larger than the opening pressure difference of the valve 152.

The difference between the fluid pressures on the opposite sides of the pressure-reducing linear solenoid valve 152 is a difference between the output pressure Pout1 and a fluid pressure Presin the pressure-reducing reservoir 154.

As shown in FIG. 1, a stroke simulator 230 is connected to the fluid passage 22, for permitting the brake pedal 126 to be depressed even while the solenoid-operated shut-off valves 30, 32 are held closed, that is, for preventing the brake pedal 126 from being locked at its non-operated position with its operating amount being substantially zero. The stroke simulator 230 is a fluid container whose volume changes with a movement of its plunger 232. The plunger 232 is biased by a spring 234 toward its non-operated position in which the volume of the stroke simulator 230 is the smallest or zero. The volume of the fluid accommodated in the stroke simulator 230 increases as the pressure (master cylinder pressure Pmc) of the fluid delivered from the front pressure portion F is increased to advance the plunger 232 away from its non-operated position against the biasing force of the spring 234. Thus, the stroke simulator 230 prevents locking of the brake pedal 126 or permits the operation of the brake pedal 126 even while the shut-off valves 30, 32 are held closed with the braking system 10 placed in the cooperative control mode. Accordingly, the vehicle operator who is depressing the brake pedal 126 in the cooperative braking mode would not be surprised with the otherwise possible locking of the brake pedal 126. The space of the stroke simulator 230 in which the spring 234 is disposed is held in communication with the fluid passage 40 through a fluid passage 236, so that the fluid which may leak into that space through a gap between the plunger 234 and the housing of the stroke simulator 230 is returned to the master reservoir 18, preventing reduction of the amount of the fluid within the braking system 10.

When the hydraulic braking system is normally operated in the cooperative control mode, the solenoid-operated shut-off valves 30, 32 are held closed, and the solenoid-operated shut-off valve 80 is held open, while the other solenoid-operated shut-off valves are placed in the states indicated in FIG. 1. That is, the FL and FR wheel brake cylinders 24, 26 are not supplied with the fluid delivered from the pressurizing chamber F of the master cylinder 12 through the fluid passage 22. Like the RL and RR wheel brake cylinders 50, 52, the FL and FR wheel brake cylinders 24, 26 are supplied with the fluid which is delivered from the pressurizing chamber R through the fluid passages 48, 76 and controlled by the linear solenoid valve device 56. Thus, the fluid pressures in all of the four wheel brake cylinders 24, 26, 50, 52 are controlled by the pressure-increasing and pressure-reducing linear solenoid valves 150, 152. When the fluid pressures in the wheel brake cylinders are reduced, the fluid is discharged from the wheel brake cylinder and is stored in the pressure-reducing reservoir 154.

When the hydraulic braking system is operated in both the cooperative control mode and the anti-lock control mode, the linear solenoid valve device 56 and the solenoid-operated shut-off valves are controlled by the controller 60. In principle, the linear solenoid valve device 56 is controlled so that the sum of the regenerative braking force and the hydraulic braking force is equal to the vehicle operator's desired braking force, while the solenoid-operated shut-off valves are controlled so that the amounts of slip of the wheels FL, FR, RL, RR during brake application are held within a predetermined optimum range. When it is required to rapidly reduce the fluid pressure in the wheel brake cylinder, the linear solenoid valve device 56 may be controlled, as described later. In the anti-lock control mode, the shut-off valves 42, 44, 58, 72, 84 are controlled as needed, independently of each other, while the shut-off valves 30, 32 are held closed and the shut-off valve 80 is held open. In the present embodiment, the fluid pressure in the RL, RR wheel brake cylinder 50, 52, the fluid pressure in the FL wheel brake cylinder 24 and the fluid pressure in the FR wheel brake cylinder 26 are controlled independently of each other. When the fluid pressure in each wheel brake cylinder 24, 26, 50, 52 is reduced, the fluid discharged from the wheel brake cylinder is returned to the master reservoir 18 through the shut-off valves 42, 44, 72. When it is required to rapidly reduce the fluid pressure, the fluid discharged from the wheel brake cylinder 50, 52 is returned to also the pressure-reducing reservoir 154 through the shut-off valve 58, or the fluid discharged from the wheel brake cylinder 24, 26 is returned to also the reservoir 154 through the shut-off valves 84, 86, 80. The anti-lock control mode will be described later in detail.

In the event of a failure of the controller 66 of the present hydraulic braking system to control any of the solenoid-operated shut-off valves and the linear solenoid valve device 56, the shut-off valves are placed in the states indicated in FIG. 1, and the solenoid coils 210 of the pressure-increasing and pressure-reducing valves 150, 152 are de-energized. In this event, the constant pressure source 20 may be adapted to be held in the operated state or non-operated state. Even if the constant pressure source 20 is held in its non-operated state upon failure of the controller 66, the master cylinder 12 is adapted such that pressurized fluids having substantially the same pressure are generated from the pressurizing chambers F, R of the master cylinder 12, like an ordinary master cylinder of tandem type. With the shut-off valves being placed in the operating states of FIG. 1, the fluid pressurized by the front pressure portion F is delivered to the FL and FR wheel brake cylinders 24, 26, while the fluid pressurized by the rear pressure portion R is delivered to the RL and RR wheel brake cylinders 50, 52 through the pressure-increasing linear solenoid valve 150. The fluid pressure to be applied to the FL and FR wheel brake cylinders 24, 26 is substantially the same as the pressure generated by the pressurizing chamber F. However, the fluid pressure to be applied to the RL and RR wheel brake cylinders 50, 52 is lower than the pressure generated by the pressurizing chamber R, by an amount equal to the opening pressure difference of about 3 MPa of the pressure-increasing linear solenoid valve 150. Thus, the pressure to be applied to the front wheel brake cylinders 24, 26 is different from the pressure to be applied to the rear wheel brake cylinders 50, 52. Since the front and rear wheel brake cylinders are all supplied with the pressurized fluid and since the pressure to be applied to the front wheel brake cylinders 24, 26 is not made lower than the pressure generated by the pressurizing chamber F, the failure of the controller 66 would not cause a considerable amount of reduction of the total braking force. It is further noted that the vehicle running stability during braking in the event of the failure of the controller 66 would not deteriorated by the reduction of the fluid pressure in the rear wheel brake cylinders 50, 52 with respect to the pressure generated by the pressurizing chamber R.

In the event of a failure of the constant pressure source 20 which disables the pressurizing chamber R to generate the pressurized fluid, the controller 66 is adapted to de-energize all of the solenoid-operated shut-off valves and the linear solenoid valve device 56. In this event, the hydraulic braking system 10 is operated in the same manner as in the case where the constant pressure source 20 is placed in the non-operated state due to a failure of the controller 66, as described above. However, since the controller 66 is normal, the controller 66 may be adapted to control the solenoid-operated shut-off valves and the linear solenoid valve device 56 in the normal manner. In this case, the required amount of operation of the brake pedal 126 is larger by an amount corresponding to the amount of the pressurized fluid which would be normally delivered from the constant pressure source 20 to the pressurizing chamber R of the master cylinder 12. To minimize the required operating amount of the brake pedal 126, in this case, it is desirable to provide a normally open solenoid-operated shut-off valve between the fluid passage 22 and the stroke simulator 230, so that this shut-off valve is closed upon a failure of the constant pressure source 20, to prevent the fluid from flowing into the stroke simulator 230.

The controller 66 is principally constituted by a computer incorporating a read-only memory (ROM), a random-access memory (RAM) and a processing unit (PU). The ROM stores various control programs including those for executing a main routine of FIG. 6, sub-routines of FIGS. 7, 10 and 17, and routines of FIGS. 18 and 20. The ROM also stores data tables such as a data table of FIG. 14.

Figure 5:
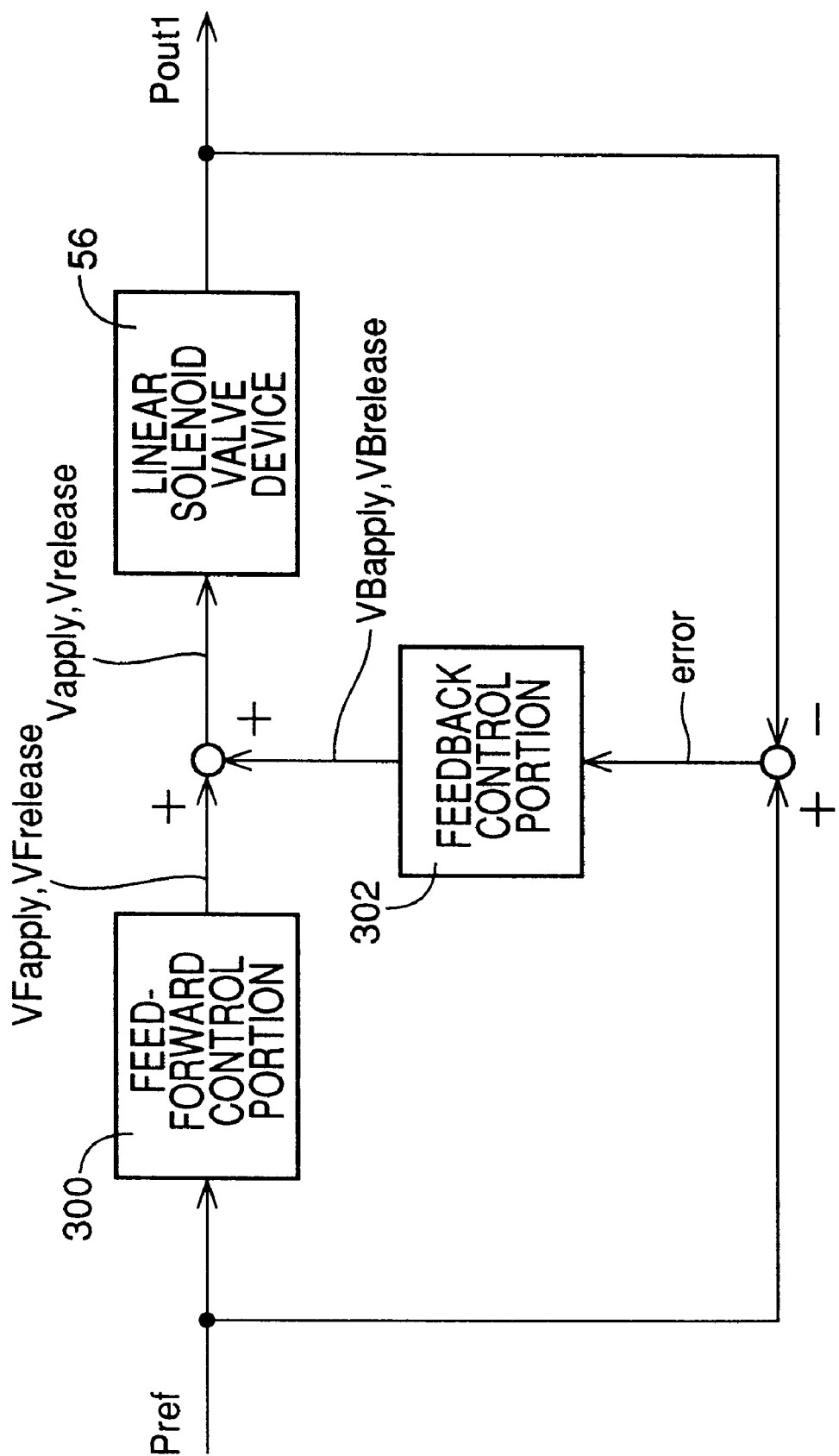
FIG. 5 is a block diagram showing functional portions of the controller.

Referring to the block diagram of FIG. 5, there are shown functional portions of the controller 66, which are assigned to control the linear solenoid valve device 56 for regulating the fluid pressures at the various portions of the hydraulic braking system. The controller 66 includes a feed-forward control portion 300 and a feedback control portion 302 for controlling the linear solenoid valve device 56. The feed-forward portion 300 is adapted to receive a desired fluid pressure Pref which is a target of the fluid pressure control by the linear solenoid valve device 56, which produces the output fluid pressure Pout1. In the present embodiment, the desired fluid pressure Pref is obtained by subtracting the fluid pressure corresponding to the braking force produced by the regenerative braking system, from the fluid pressure as detected by the pressure sensor 34, that is, from the master cylinder pressure Pmc which is considered to represent the braking force as desired by the vehicle operator. As described below, the controller 66 is adapted to effect a special control of the linear solenoid valve device 56 as needed, in a manner different from that by the feed-forward and feedback control portions 300, 302.

The feed-forward control portion 300 is assigned to calculate a feed-forward pressure-increasing voltage value VFapply and a feed-forward pressure-reducing voltage value VFrelease, on the basis of the desired fluid pressure Pref. The feedback control portion 302 is assigned to calculate a feedback pressure-increasing voltage value VBapply and a feedback pressure-reducing voltage value VBrelease which are used to zero a control error "error" or a difference between the desired fluid pressure Pref and the output fluid pressure Pout1. Thus, the controller 66 is adapted to effect both the feed-forward control and the feedback control of the output fluid pressure Pout1.

Referring to the flow chart of FIG. 6, there will be described the main routine executed by the controller 66 according to the control program stored in the ROM. The main routine is initiated with step S10, which is a sub-routine for calculating the feed-forward pressure-increasing voltage value VFapply and the feed-forward pressure-reducing voltage value VFrelease. This sub-routine in step S10 is executed by the feed-forward control portion 300, as described below in detail by reference to the flow chart of FIG. 7. Step S10 is followed by step S12, which is a sub-routine for calculating the feedback pressure-increasing voltage value VBapply and the feedback pressure-reducing voltage value VBrelease, on the basis of the control error "error" between the desired and output fluid pressures Pref and Pout1 indicated above. This sub-routine is executed by the feedback control portion 302, so as to zero the control error "error" by a generally implemented PID control (combination of proportional, integral and differential controls), or an I control (integral control). Then, the control flow goes to step S14, which is a sub-routine for calculating a pressure-increasing solenoid voltage Vapply to be applied to the solenoid coil 210 of the pressure-increasing linear solenoid valve 150 and a pressure-reducing solenoid voltage Vrelease to be applied to the solenoid coil 210 of the pressure-reducing linear solenoid valve 152. The sub-routine in step S14 is executed as described below in detail by reference to the flow chart of FIG. 17.

In the sub-routine in step S14, the pressure-increasing solenoid voltage value Vapply is a sum of the feed-forward and feedback pressure-increasing voltage values VFapply and VBapply. At least one of these voltage values VFapply and VBapply may be zero. In a certain condition, however, the solenoid voltage value Vapply is not controlled to be equal to the above-indicated sum, as described below in detail. Similarly, the pressure-reducing solenoid voltage value Vrelease is a sum of the feed-forward and feedback pressure-reducing voltage values VFrelease and VBrelease. At least one of these voltage values VFrelease and VBrelease may be zero. In a certain condition, however, the solenoid voltage value Vrelease is not controlled to be equal to the above-indicated sum, as described below in detail.

Step S14 is followed by step S15 to determine whether the rapid pressure reduction mode is selected during an anti-lock control operation of the braking system. If a negative decision (NO) is obtained in step S15, that is, the control flow goes to step S18, while skipping step S16. In step S18, the pressure-increasing and pressure-reducing solenoid voltages Vapply and Vrelease are applied to the solenoid coils 210 of the respective pressure-increasing and pressure-reducing linear solenoid valves 150, 152. If an affirmative decision (YES) is obtained in step S15, that is, if the rapid pressure reduction mode is selected during the anti-lock control operation, step S15 is followed by step S16 in which the pressure-increasing solenoid voltage Vapply is zeroed, and the pressure-reducing solenoid voltage Vrelease is set to be a maximum value Vmax (which will be described). In this case, the solenoid coil 210 of the pressure-increasing linear solenoid valve 150 is not energized, while the maximum pressure-reducing solenoid voltage Vmax is applied to the solenoid coil 210 of the pressure-reducing linear solenoid valve 150. That is, when the rapid pressure reduction mode is selected during an anti-lock control operation, the fluid discharged from the wheel brake cylinder 24, 26, 50, 52 in question is returned not only to the master reservoir 18 through the solenoid-operated shut-off valves 72, 42, 44, but also to the pressure-reducing reservoir 154 through the solenoid-operated shut-off valves 58, 84, 86.

The sub-routine in step S10 of FIG. 6 for calculating the feed-forward pressure-increasing and pressure-reducing voltage values VFapply and VFrelease will be described referring to the flow chart of FIG. 7. The sub-routine of FIG. 7 is initiated with step S20 to determine whether an amount of change dPref of a desired fluid pressure Pref (calculated as described below) during a predetermined time duration (6 ms in this embodiment, as described below by reference to an interruption routine of FIG. 10) is a positive value, that is, determine whether the desired fluid pressure is increasing. If an affirmative decision (YES) is obtained in step S20, the control flow goes to step S22 to determine whether a flag startFlag is set at "0". If an affirmative decision (YES) is obtained in step S22, the control flow goes to step S24 in which the desired fluid pressure Pref is set as an initial pressure-increasing variable Pinita, and the flag startFlag is set to "1". Step S24 is followed by step S40. If a negative decision (NO) is obtained in step S22, the control flow goes to step S24 while skipping step S24. The main routine of FIG. 6 includes an initialization step (not shown) in which the flag startFlag is initially reset to "0". If a negative decision (NO) is obtained in step S20, the control flow goes to step S26 to determine whether the amount of change dPref of the desired fluid pressure Pref is a negative value, that is, determine whether the desired fluid pressure Pref is being reduced. If an affirmative decision (YES) is obtained in step S26, the control flow goes to step S28 to determine whether the flag startFlag is set at "1". If an affirmative decision (YES) is obtained in step S28, the control flow goes to step S30 in which the desired fluid pressure Pref is set as an initial pressure-reducing variable Pinitr, and the flag startFlag is set to "1". Step S30 is followed by step S40. If a negative decision (NO) is obtained in step S26 or S28, the control flow goes to step S40, the control flow goes to step S40, while skipping step S30.

Step S40 is provided to to determine whether the pressure-reducing solenoid voltage Vrelease is a positive value, that is, determine whether the linear solenoid valve device 56 is placed in a pressure-reducing state (pressure-reducing operation). If an affirmative decision (YES) is obtained in step S40, the control flow goes to step S42 in which a feed-forward pressure-increasing voltage increment VFca is calculated according to the following equation (1):

$$VFca \leftarrow MAPa(Pin-Pout1) \qquad (1)$$

Figure 8:
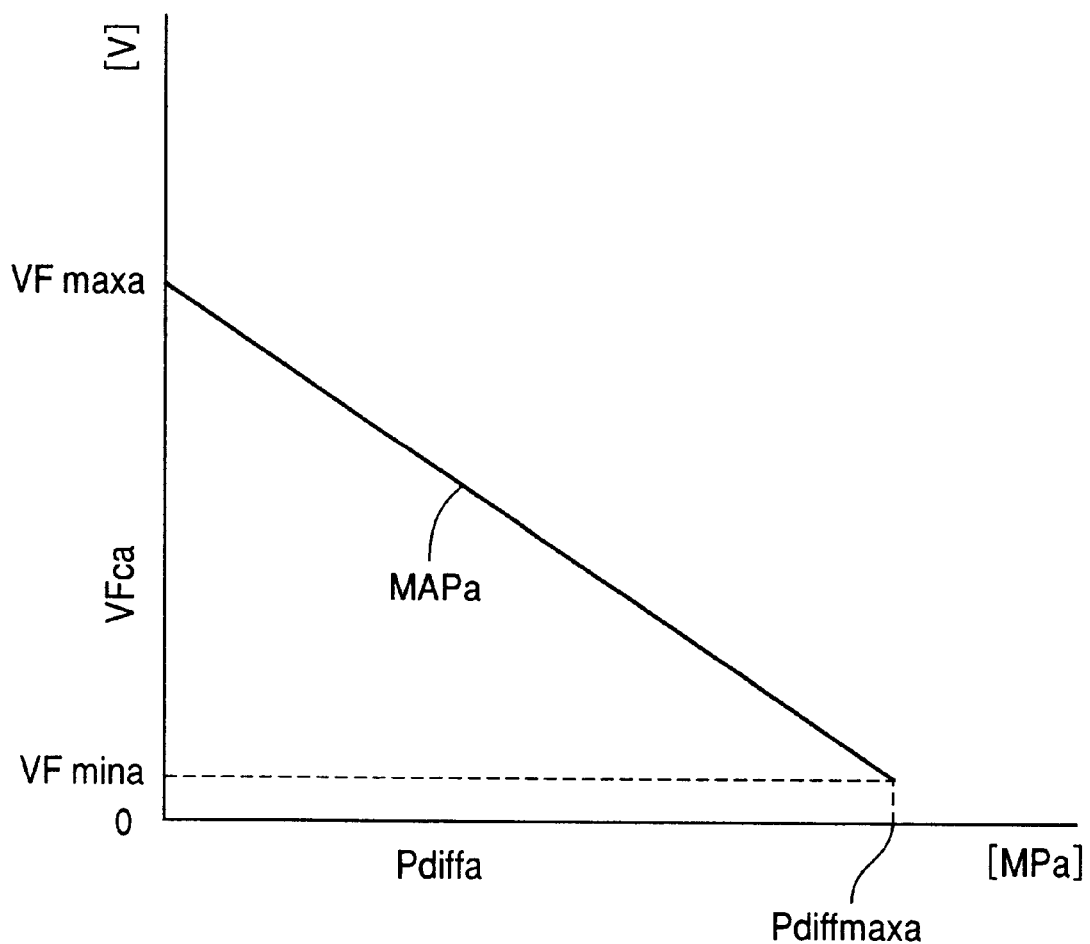
FIG. 8 is a graph indicating a function MAPa used in step S42 of the sub-routine of FIG. 7.

In the above equation, MAPa is a function which is multiplied by a factor (Pin−Pout1), to obtain the increment VFca. The factor (Pin−Pout1) is referred to as a pressure-increasing fluid pressure difference Pdiffa. An example of the function MAPa is indicated in the graph of FIG. 8. In this example, the function MAPa is determined so that the feed-forward pressure-increasing voltage increment VFca linearly decreases with an increase in the pressure-increasing fluid pressure difference Pdiffa. The function MAPa is further determined so that the feed-forward pressure-increasing voltage increment VFca is equal to a maximum feed-forward pressure-increasing voltage value VFmaxa when the pressure-increasing fluid pressure difference Pdiffa is zero, while the increment VFca is equal to a minimum feed-forward pressure-increasing voltage value VFmina when the difference Pdiff a is equal to a maximum difference value Pdiffmaxa. This maximum difference value Pdiffmaxa is equal to the opening pressure difference (=3 MPa) of the pressure-increasing linear solenoid valve 150. The maximum feed-forward pressure-increasing voltage value VFmaxa is determined such that the electromagnetic drive force Fs acting on the biased member 204 based on the magnetic field produced by the solenoid coil 210 of the linear solenoid valve 150 upon energization of the solenoid coil 210 by the maximum voltage value VFmaxa is equal to the biasing force Fp of the spring 206 acting on the biased member 204 when the valve member 200 is seated on the valve seat 202. Thus, the feed-forward pressure-increasing voltage increment VFca is calculated in step S42 in the process of a pressure reducing operation of the linear solenoid valve 56 (while the affirmative decision is obtained in step S40), so that the voltage increment VFca is used for the next pressure increasing operation of the valve 56.

If a negative decision (NO) is obtained in step S40, the control flow goes to step S44 to determine whether the pressure-increasing solenoid voltage Vapply is a positive value, that is, determine whether the linear solenoid valve device 56 is placed in a pressure-increasing state (pressure-increasing operation). If an affirmative decision (YES) is obtained in step S44, the control flow goes to step S46 in which a feed-forward pressure-reducing voltage increment VFcr is calculated according to the following equation (2):

$$VFcr \leftarrow MAPr(Pout1-Pres) \qquad (2)$$

Figure 9:
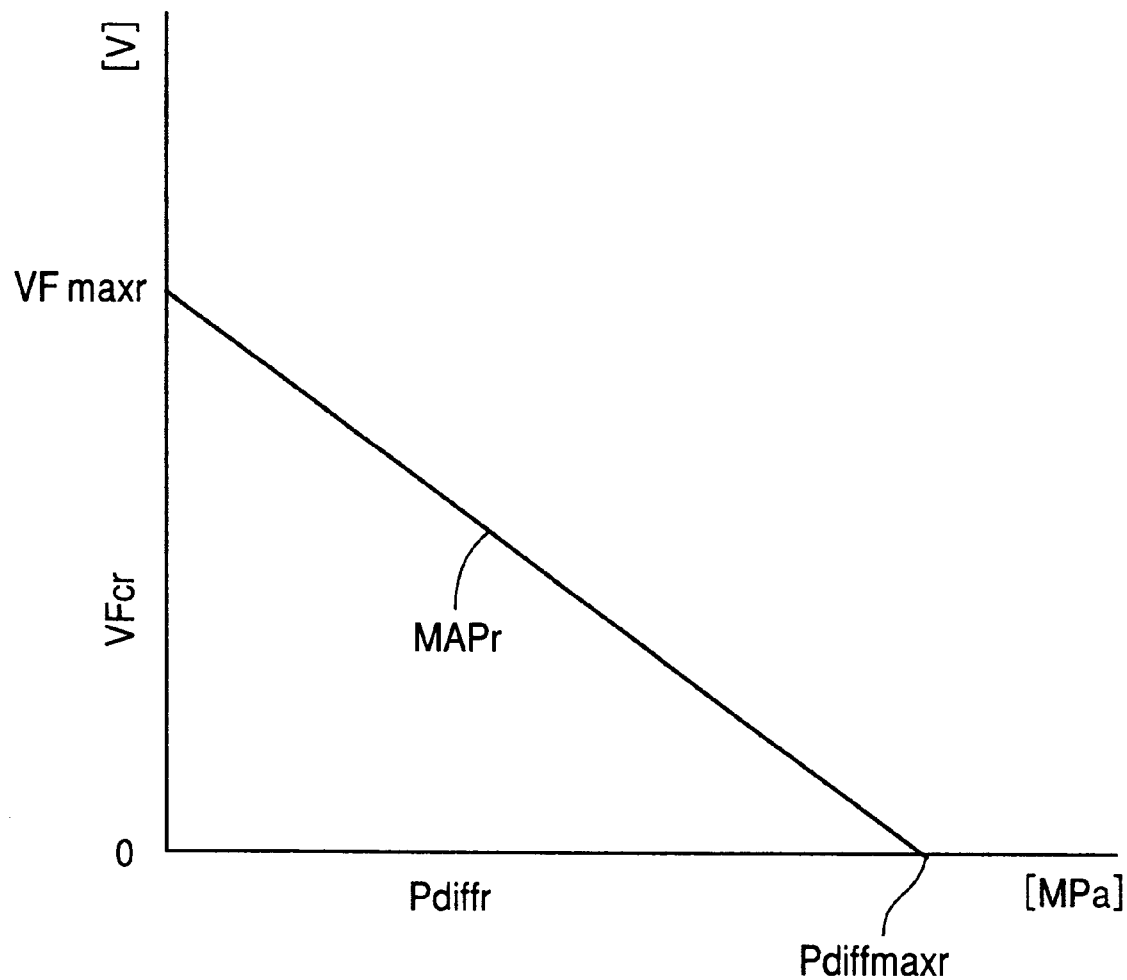
FIG. 9 is a graph indicating a function MAPr used in step S46 of the sub-routine of FIG. 7.

In the above equation, MAPr is a function which is multiplied by a factor (Pout1−Pres), to obtain the increment VFcr. The factor (Pout1−Pres) is referred to as a pressure-reducing fluid pressure difference Pdiffr. "Pres" represents the fluid pressure in the pressure-reducing reservoir 154, which is equal to the atmospheric pressure. An example of the function MAPr is indicated in the graph of FIG. 9. In this example, the function MAPr is determined so that the feed-forward pressure-reducing voltage increment VFcr linearly decreases with an increase in the pressure-reducing fluid pressure difference Pdiffr. The function MAPr is further determined so that the feed-forward pressure-reducing voltage increment VFcr is equal to a maximum feed-forward pressure-reducing voltage value VFmaxr when the pressure-reducing fluid pressure difference Pdiffr is zero, while the increment VFcr is equal to zero when the difference Pdiffr is equal to a maximum difference value Pdiffmaxr. This maximum difference value Pdiffmaxr is equal to the opening pressure difference (larger than 18 MPa) of the pressure-reducing linear solenoid valve 152. The maximum feed-forward pressure-reducing voltage value VFmaxr is determined such that the electromagnetic drive force Fs acting on the biased member 204 based on the magnetic field produced by the solenoid coil 210 of the linear solenoid valve 152 upon energization of the solenoid coil 210 by the maximum voltage value VFmaxr is equal to the biasing force Fp of the spring 220 acting on the biased member 204 when the valve member 200 is seated on the valve seat 202. Thus, the feed-forward pressure-reducing voltage increment VFcr is calculated in step S46 in the process of a pressure-increasing operation of the linear solenoid valve 56 (while the affirmative decision is obtained in step S44), so that the voltage increment VFcr is used for the next pressure reducing operation of the valve 56.

Steps S42 and S46 are followed by step S47. If a negative decision (NO) is obtained in step S44, the control flow goes to step S47 while skipping step S46. Step S47 is implemented to determine whether the desired fluid pressure change amount dpref is a positive value while the desired fluid pressure Pref is equal to or lower than a predetermined threshold Pth. If an affirmative decision (YES) is obtained in step S47, the control flow goes to step S48 in which an initial fluid flow increasing voltage VFcainc is set as the feed-forward pressure-increasing voltage increment VFca. A significance of this initial fluid flow increasing voltage VFcainc will be described later by reference to FIG. 15. Step S48 is followed by step S50. If a negative decision (NO) is obtained in step S47, the control flow goes to step S50 while skipping step S48. In step S48, the feed-forward pressure-increasing voltage value VFapply or feed-forward pressure-reducing voltage value VFrelease is calculated according to the following equation (3) or (4):

$$VFapply \leftarrow GAINa \cdot (Pref-Pinita) + VFca \qquad (3)$$

$$VFrelease \leftarrow GAINr \cdot (Pinitr-Pref) + VFcr \qquad (4)$$

In the above equations (3) and (4), "GAINa" and "GAINr" are coefficients, which are predetermined positive constants.

Referring next to the flow chart of FIG. 10, there will be described the interruption routine to calculate the above-indicated desired fluid pressure Pref and desired fluid pressure change amount dpref. The routine is initiated with step S80 in which the desired fluid pressure Pref is calculated by subtracting the fluid pressure corresponding to the present regenerative braking force, from the master cylinder pressure Pmc obtained from the output signal of the pressure sensor 34. Then, the control flow goes to step S82 to calculate the amount of change dPref of the desired fluid pressure Pref according to the following equation (6):

$$dPref \leftarrow Pref - prevPref \qquad (6)$$

Figure 10:
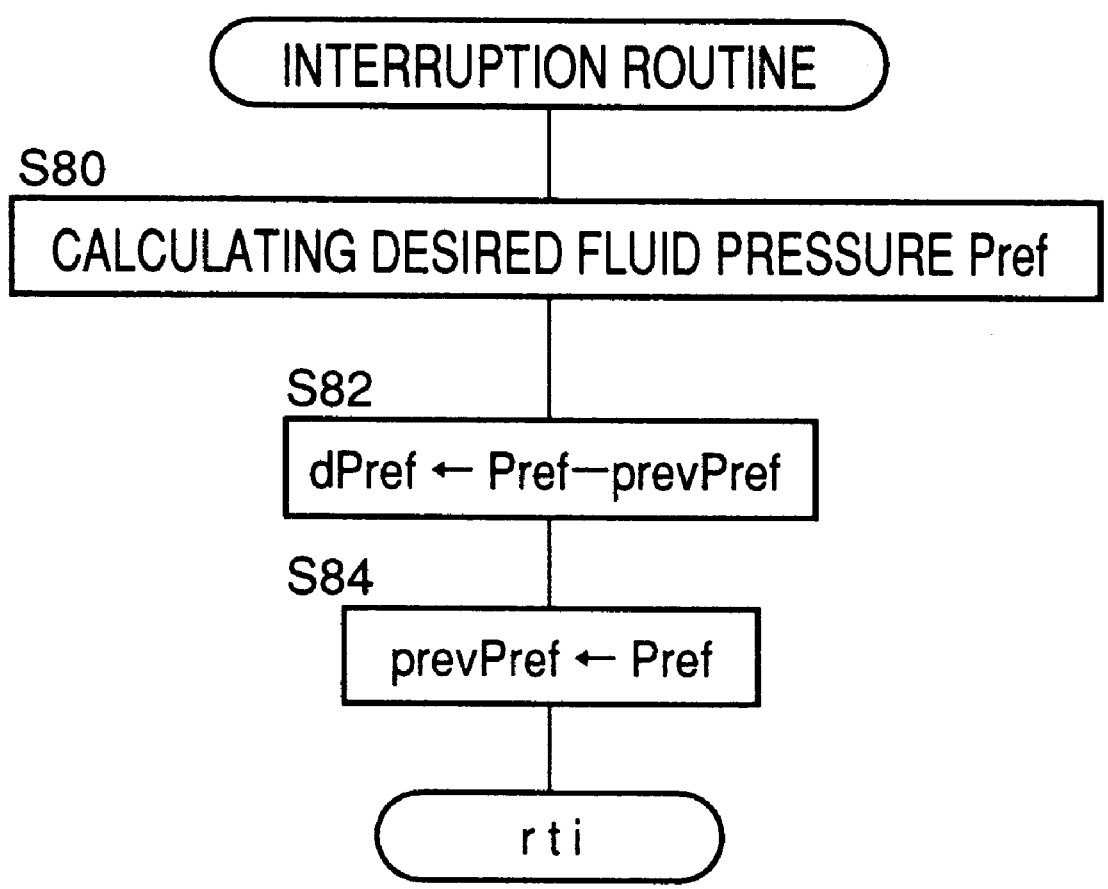
FIG. 10 is a flow chart illustrating an interruption routine executed to calculate desired fluid pressure value Pref and desired fluid pressure change amount dPref.

In the above equation (6), "prevpref" represents a previous value of the desired fluid pressure Pref, which was calculated in step S80 in the last cycle of execution of the interruption routine of FIG. 10. Step S82 is followed by step S84 in which the desired fluid pressure calculated in step S80 in the present cycle of execution of the interruption routine is set as the previous value prevPref of the desired fluid pressure Pref. The interruption routine of FIG. 10 is repeatedly executed with a cycle time of 6 ms during brake application to the vehicle with the brake pedal 126 being depressed. Thus, the desired fluid pressure Pref and the desired fluid pressure change amount dPref are calculated at the time interval of 6 ms during the brake application, and therefore the change amount dPref means a rate of change of the desired fluid pressure Pref.

The feed-forward pressure-reducing voltage value VFrelease is applied to the solenoid coil 210 of the pressure-reducing linear solenoid valve 152 so as to hold the linear solenoid valve 152 in the open state, namely, in the pressure reducing state, even after the pressure-reducing fluid pressure difference Pdiffr has been considerably reduced. Described more specifically, the force acting on the pressure-reducing linear solenoid valve 152 based on the fluid pressures so as to move the valve member 200 away from the valve seat 202 decreases with a decrease in the pressure-reducing fluid pressure difference Pdiffr. When the fluid pressure difference Pdiffr is comparatively large, the feed-forward pressure-reducing voltage value VFrelease that should be applied to the solenoid coil 210 of the valve 152 to hold the valve 152 in the open or pressure-reducing state is comparatively small. When the fluid pressure difference Pdiffr is comparatively small, the voltage value VFrelease that should be applied to the solenoid coil 210 to hold the valve 152 in the open state is comparatively large.

Figure 11:
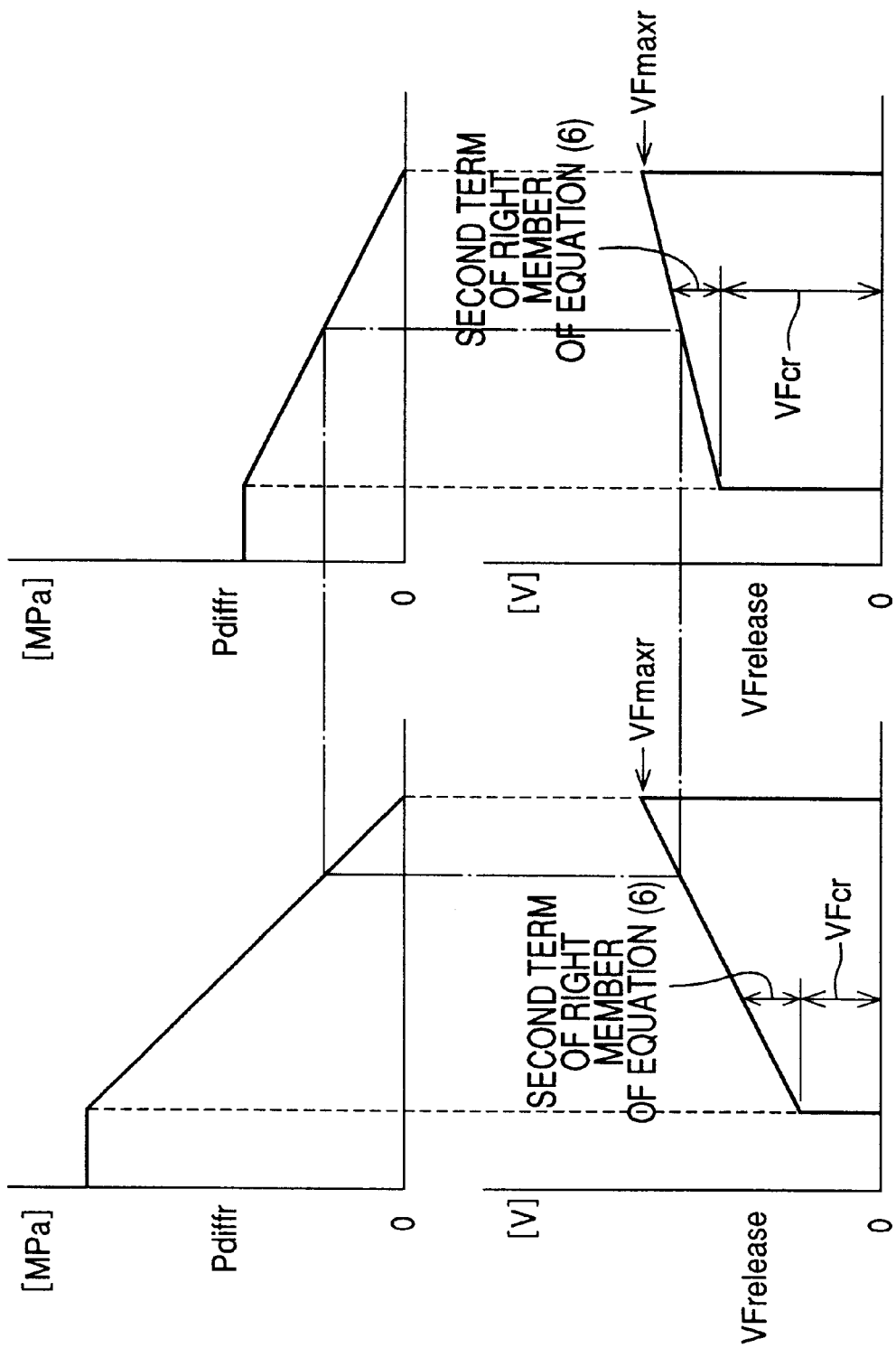
FIGS. 11a and 11b are graphs indicating two examples of fluid pressure reduction according to the voltage values VFapply and VFrelease calculated in the sub-routine of FIG. 7 (step S10 of the main routine of FIG. 6)

Graphs (a) and (b) in FIG. 11 show two examples of pressure reducing operation in which the initial values of the pressure-reducing fluid pressure difference Pdiffr are different. In these examples, the output fluid pressure Pout1 of the linear solenoid valve device 56 is reduced at respective rates, eventually to the atmospheric level. As indicated by one-dot chain lines in the graphs, the feed-forward pressure-reducing voltage value VFrelease is the same in the two examples when the pressure-reducing fluid pressure difference values Pdiffr in the two examples are equal to each other. When the pressure reducing operations are terminated, the fluid pressure difference values Pdiffr are zeroed, and the feed-forward pressure-reducing voltage values VFrelease are equal to the maximum value VFmaxr.

The feed-forward pressure-increasing voltage value VFapply has substantially the same significance as the feed-forward pressure-reducing voltage value VFrelease described above. However, it is noted that the fluid pressures Pin and Pout1 at the respective first and second ports 162, 166 of the pressure-increasing linear solenoid valve 150 vary during the brake application, while the fluid pressure of the pressure-reducing linear solenoid valve 152 on the side of the reservoir 154 is held constant (equal to the reservoir pressure Pres).

In the graphs of FIGS. 8 and 9, the functions MAPa and MAPr are determined such that the feed-forward pressure-increasing and pressure-reducing voltage increments VFca and VFcr change linearly with the pressure-increasing and pressure-reducing fluid pressure difference values Pdiffa, Pdiffr. That is, the functions MAPa and MAPr are represented by respective straight lines. The functions MAPa and MAPr are made linear since the pressure-increasing and pressure-reducing linear solenoid valves 150, 152 are operated within a predetermined voltage range in which the magnetic force acting on the biased member 204 is substantially proportional with the voltage applied to the solenoid coil 210. Generally, however, the magnetic force produced by a solenoid coil is proportional to a square of the voltage applied to the solenoid coil. If the magnetic force acting on the biased member 204 cannot be considered to be substantially proportional with the voltage applied to the solenoid coil 210, steps S40 through S46 in the sub-routine of FIG. 7 are eliminated, and step S50 is modified such that the feed-forward pressure-increasing voltage values VFapply and VFrelease are calculated according to the following equations (6) and (7), respectively, rather than the above-indicated equations (3) and (4):

$$VFapply \leftarrow GAINa' \cdot \sqrt{(Pdiffmaxa - Pdiffa)} + VFmaxa \quad (6)$$

$$VFrelease \leftarrow GAINr' \cdot \sqrt{(Pdiffmaxr - Pdiffr)} \quad (7)$$

Where the feed-forward pressure-increasing voltage value VFapply is calculated according to the equation (3), the feed-forward pressure-increasing voltage increment VFca may change during brake application, as indicated in FIG. 8. Actually, however, the pressure-increasing fluid pressure difference Pdiffa is usually comparatively small. Therefore, the accuracy of control of the fluid pressure by the linear solenoid valve 150 will not be significantly deteriorated even where the feed-forward pressure-increasing voltage increment VFca is fixed at a suitable value, for example, at the maximum feed-forward pressure-increasing voltage value VFmaxa.

Figure 12:
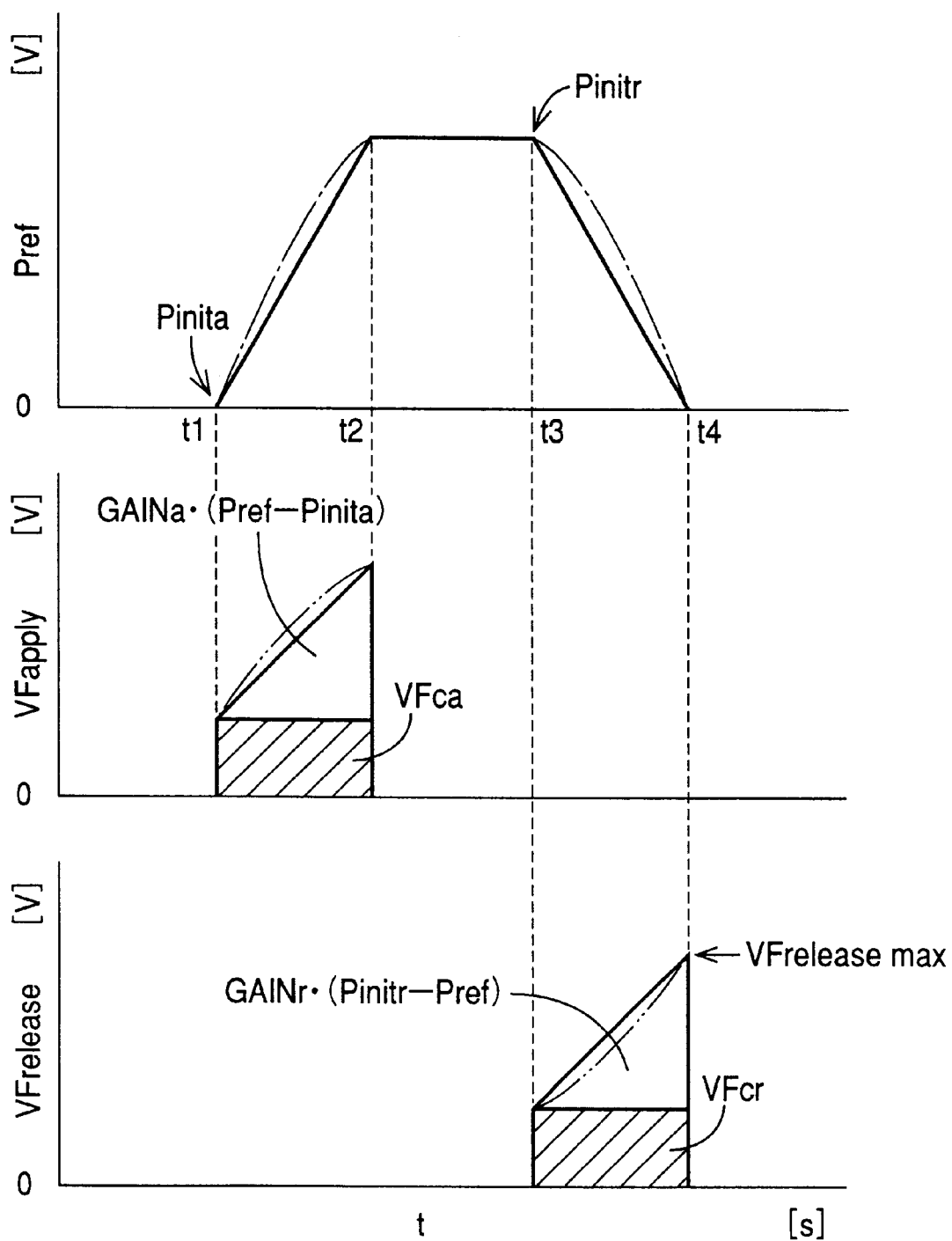
FIG. 12 is a graph indicating an example of a change in the desired fluid pressure Pref, and examples of changes in the feed-forward voltage values VFapply and VFrelease which are calculated in the sub-routine of FIG. 7, based on the change of the desired fluid pressure Pref.

Referring to the graphs of FIG. 12, there are qualitatively indicated an example of a change of the desired fluid pressure Pref, and examples of changes of the feed-forward pressure-increasing and pressure-reducing voltage values VFapply, VFrelease which are calculated on the basis of a change of the desired fluid pressure Pref. An increase in the desired fluid pressure Pref from zero is started at point of time t1. The desired fluid pressure Pref continues to increase during a period between the point of time t1 and a point of time t2, and is held constant during a period between the point of time t2 and a point of time t3. The desired fluid pressure Pref continues to decrease during a period between the point of time t3 and a point of time t4 at which the pressure Pref is zero. The feed-forward pressure-increasing voltage value VFapply increases from zero during the period t1–t2, and is held zero during the period t2–t4. On the other hand, the feed-forward pressure-reducing voltage value VFrelease increases from zero during the period t3–t4, and is held zero during the period t1–t3. Actually, these voltage values VFapply, VFrelease may be other than zero during the period t2–t3. Usually, the voltage values VFapply, VFrelease are zero while the desired fluid pressure Pref is held constant. The voltage values VFapply, VFrelease are not actually used during the time period t2–t3 even when those values are not zero. For this reason, the voltage values VFapply and VFrelease are indicated to be zero during the time period t2–t3, in the graphs of FIG. 12.

Where the desired fluid pressure Pref changes as indicated in FIG. 12, the value Pref at the point of time t1 is set as the initial pressure-increasing variable Pinita, since step S24 is implemented at the point of time t1, with the affirmative decision (YES) being obtained in both steps S20 and S22 in the sub-routine of FIG. 7. Further, the desired fluid pressure Pref at the point of time t3 is set as the initial pressure-reducing variable Pinitr, since step S30 is implemented at the point of time t3, with the negative and affirmative decisions being obtained in steps S20 and S26, respectively. In the graph of the feed-forward pressure-increasing voltage value VFapply in FIG. 12, the value of the second term (i.e., feed-forward pressure-increasing voltage increment VFca) of the above equation (3) is indicated by a hatched rectangular area, while the value of the first term (i.e., GAINa·(Pref−Pinita) of the equation (3) is indicated by a non-hatched triangular area. In the graph of the feed-forward pressure-reducing voltage value VFrelease, the value of the second term (i.e., feed-forward pressure-reducing voltage increment VFcr) of the above equation (4) is indicated by a hatched rectangular area, while the value of the first term (i.e., GAINr·(Pinitr−Pref) of the equation (4) is indicated by a non-hatched triangular area. If the desired fluid pressure Pref changes as indicated by one-dot chain lines in FIG. 12, the voltage values VFapply and VFrelease change as indicated by two-dot chain lines, since the values of the first terms of the equations (3) and (4) change as indicated by the two-dot chain lines, with the change of the desired fluid pressure Pref.

Although the feed-back control and the feed-forward control of the fluid pressure by the solenoid-operated linear solenoid valve device 56 permit satisfactory degrees of control stability and response, there is still a possibility that the linear solenoid valve device 56 suffers from frequent pressure-increasing and pressure-reducing operations, which result in a relatively large amount of electric energy consumption by the solenoid coils 310 of the pressure-increasing and pressure-reducing linear solenoid valves 150, 152, leading to a reduced amount of electric energy stored in the battery which is used for controlling the valve device 56 and for operating the electric motor. The reduction of the electric energy stored in the battery leads to a reduced distance of running of the hybrid vehicle by the electric motor. To prevent this undesirable possibility or drawback due to the frequent pressure-increasing and pressure-reducing operations, the linear solenoid valve device 56 is further adapted so as to be kept in the pressure-holding state as long as the output fluid pressure Pout1 of the valve device 56 is held within a predetermined uncontrolled band or zone defined by upper and lower limits which are relatively close to the desired fluid pressure Pref. That is, the number of alternate pressure-increasing and pressure-reducing operations of the valve device 56 can be reduced by holding the output fluid pressure Pout1 constant while the output fluid pressure Pout1 is relatively close to the desired value Pref. In this arrangement, however, an increase in the feedback control gain for improving the control response may cause a control delay, which may cause the valve device 56 to suffer from an undesired hunting with the output fluid pressure Pout1 oscillating by an amount larger than the width of the uncontrolled band, as indicated in FIG. 13. On the other hand, an increase in the width of the uncontrolled band or a decrease in the feedback control gain for preventing the hunting indicated above may result in lowering the accuracy of control of the fluid pressure (i.e., output fluid pressure Pout1). That is, the mere provision of the uncontrolled band for the output fluid pressure Pout1 does not permit sufficient reduction of the number of the alternate pressure-increasing and pressure-reducing operations of the linear solenoid valve device 56 while assuring a satisfactory degree of control accuracy of the fluid pressure by the valve device 56.

Figure 6:
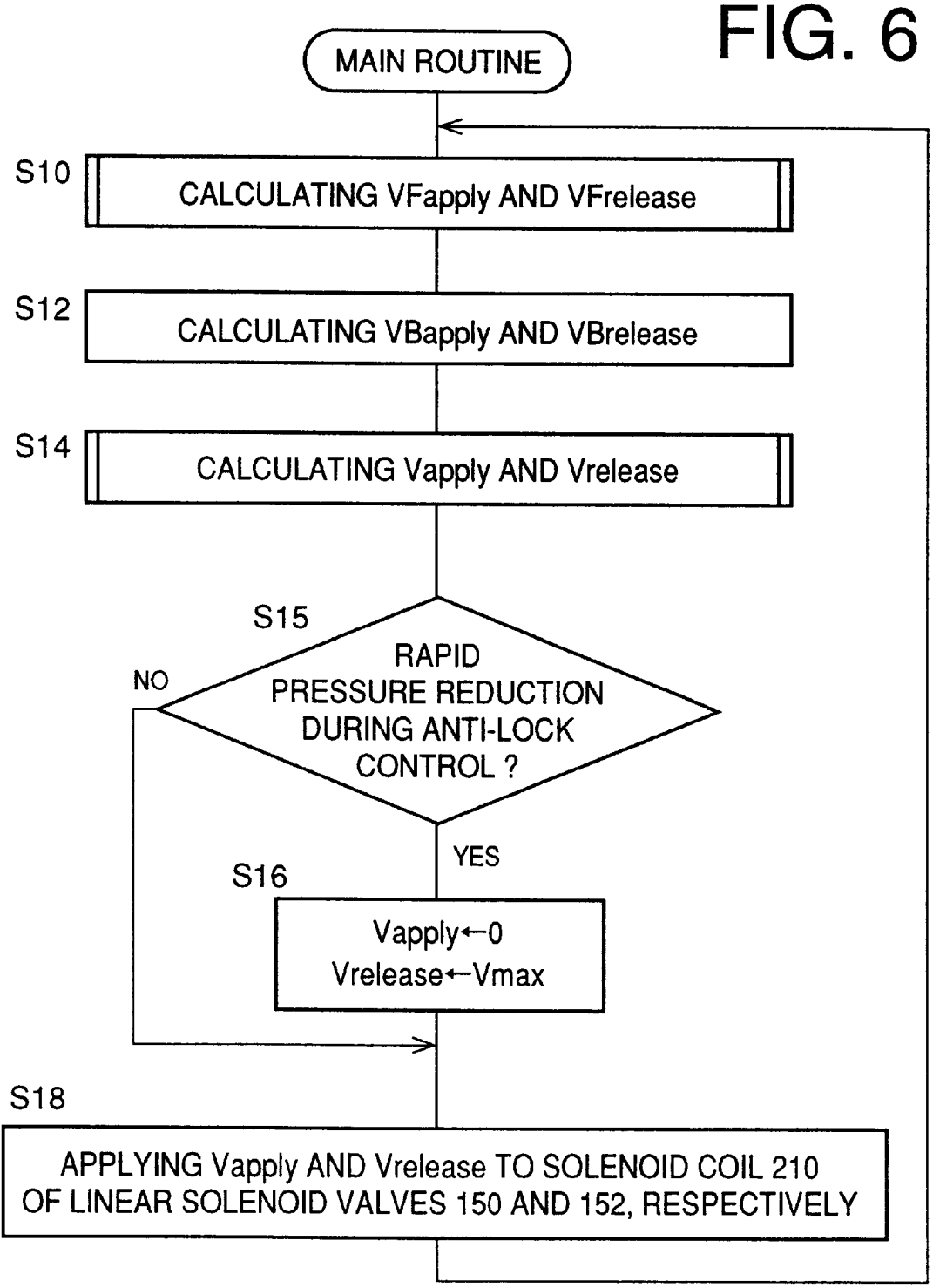
FIG. 6 is a flow chart illustrating an example of a main routine executed by the controller.
Figure 7:
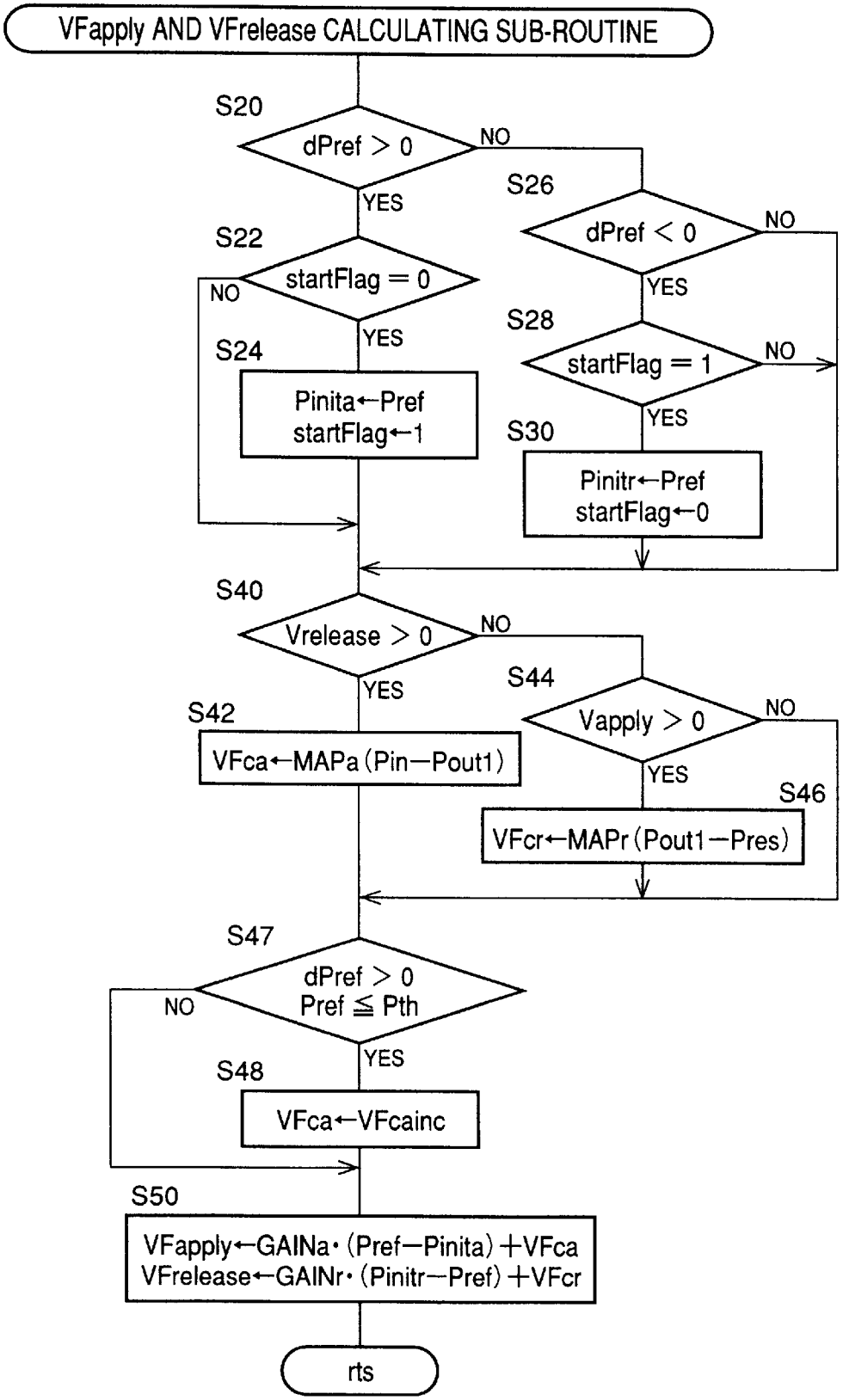
FIG. 7 is a flow chart illustrating a sub-routine to calculate feed-forward voltage values VFapply and VFrelease in step S10 of the main routine of FIG. 6.
Figure 14:
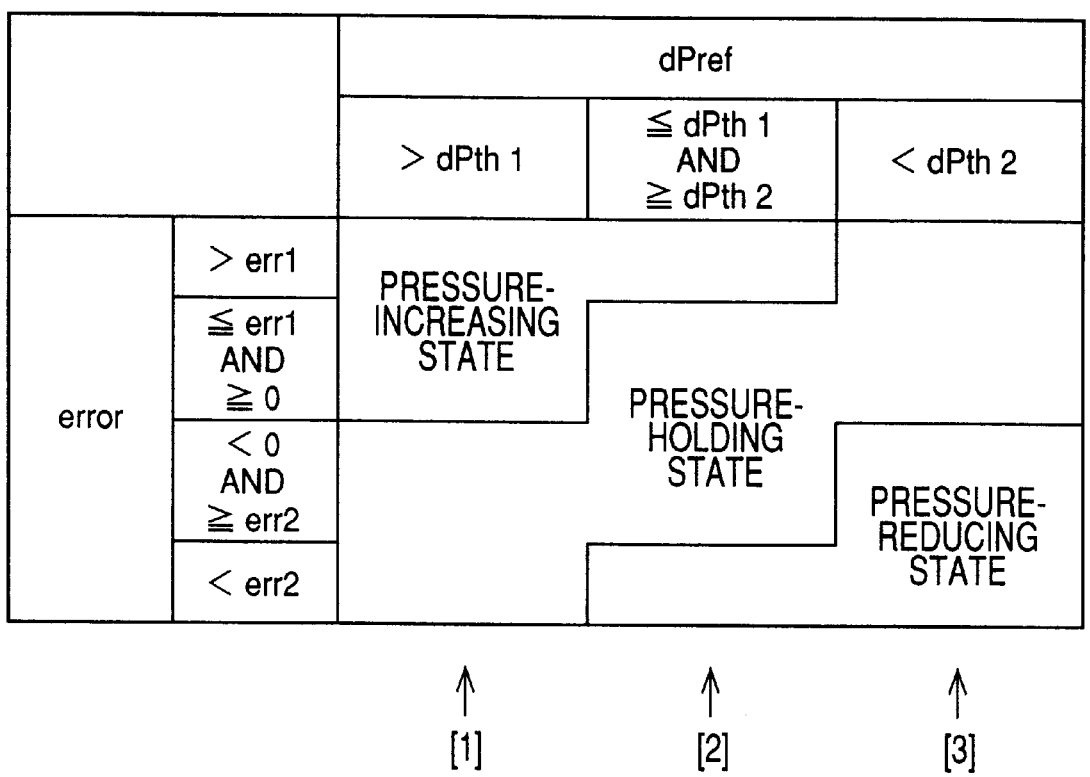
FIG. 14 is a view for explaining a concept of calculating solenoid voltage values Vapply and Vrelease in step S14 of the main outline of FIG. 6.

The controller 66 constructed according to the principle of the present invention is arranged to implement step S14 of the main routine of FIG. 6, for solving the drawback indicated above, namely, for controlling the solenoid-operated linear solenoid valve device 56 so as to prevent frequent pressure-increasing and pressure-reducing operations while assuring sufficiently high accuracy of control of the fluid pressure. FIG. 14 illustrates a concept of the processing operations in step S14 for calculating the pressure-increasing and pressure-reducing solenoid voltages Vapply and Vrelease to be applied to the solenoid coils 210 of the linear solenoid valve device 56. As indicated in FIG. 14, the operating state of the linear solenoid valve device 56 is determined on the basis of the control error "error" and the amount of change (rate of change) dPref of the desired fluid pressure Pref. Described more particularly, where the desired fluid pressure change amount dPref is a positive value larger than a first predetermined threshold dpth1 (positive value), as indicated at [1] in FIG. 14, the valve device 56 is placed in the pressure-increasing or pressure-holding state, depending upon whether the control error "error" is positive or negative, as indicated in FIG. 14. Where the desired fluid pressure change amount dPref is between the threshold dPth1 and a second predetermined threshold dPth2 (negative value), as indicated at [2] in FIG. 14, the valve device 56 is placed in the pressure-increasing state when the control error "error" is larger than a predetermined upper limit err1, placed in the pressure-reducing state when the control error "error" is smaller than a predetermined lower limit err2, and placed in the pressure-holding state when the control error "error" is between the upper and lower limits err1 and err2. Where the desired fluid pressure change amount or rate dPref is smaller than the second threshold dPth2, as indicated at [3] in FIG. 14, the valve device 56 is placed in the pressure-holding state or pressure-reducing state, depending upon whether the control error "error" is positive or negative, as indicated in FIG. 14.

In the braking condition indicated at [1] in FIG. 14, the desired fluid pressure Pref has a generally increasing tendency. In this braking condition [1], the valve device 56 is placed in one of the pressure-increasing and pressure-holding states, so that the output fluid pressure Pout1 of the valve device 1 coincides with the desired fluid pressure Pref. In the braking condition indicated at [3] in FIG. 14, the desired fluid pressure Pref has a generally reducing tendency. In this braking condition [3], the valve device 56 is placed in one of the pressure-reducing and pressure-holding states. In the braking condition [1] wherein the desired fluid pressure change amount dPref is larger than zero, the output fluid pressure Pout1 which may rise above the desired fluid pressure Pref will eventually coincide with the desired fluid pressure Pref since the desired fluid pressure Pref rises above the output fluid pressure Pout1 while the valve device 56 is held in the pressure-holding state to hold the output fluid pressure Pout1 constant. Thus, the valve device 56 is not required to be placed in the pressure-reducing state in the braking condition [1]. In the braking condition [3] wherein the desired fluid pressure change amount dpref is smaller than zero, the valve device 56 is not required to be placed in the pressure-increasing state, for a reason similar to that explained above with respect to the braking condition [1]. In the braking conditions [1] and [3], therefore, the numbers of the pressure-increasing and pressure-reducing operations of the valve device 56 according to the concept illustrated in FIG. 14 are considerably reduced as compared with the number of pressure-increasing and pressure-reducing operations in the conventional braking system. Accordingly, the electric energy required to be supplied to the solenoid coils 210 of the valve device 56 is reduced.

The upper and lower limits err1 and err2 are permissible maximum and minimum amounts of the control error "terror" when the valve device 56 is placed in the pressure-holding state. The control error "error" may be reduced by reducing the absolute values of these upper and lower limits err1 and err2. However, this causes an increase in the frequency of operations of the pressure-increasing and pressure-reducing linear solenoid valves 150, 152. On the other hand, decreasing the absolute values of the limits err1, err2 reduces the frequency of operations of the valves 150, 152, but causes an increase in the control error "error". Therefore, the upper and lower limits err1 and err2 must be determined by taking account of both of the operation frequency and control error "error" of the valves 150, 152.

While the controller 66 arranged to control the linear solenoid valve device 56 as shown in FIG. 14 permits reduction in the required electric power for controlling the valve device 56, the controller 66 is further arranged as described below, so as to (i) minimize a delay to provide a braking effect, (ii) minimize "brake dragging", (iii) evacuate the pressure-reducing reservoir 154, and (iv) reduce an abutting impact between the valve member 200 and the valve seat 202 of the seating valve 190 of each of the pressure-increasing and pressure-reducing linear solenoid valves 150, 152. The reduction of the above abutting impact is effected by reducing the seating velocity at which the valve member 200 is seated onto the valve seat 202.

Figure 15:
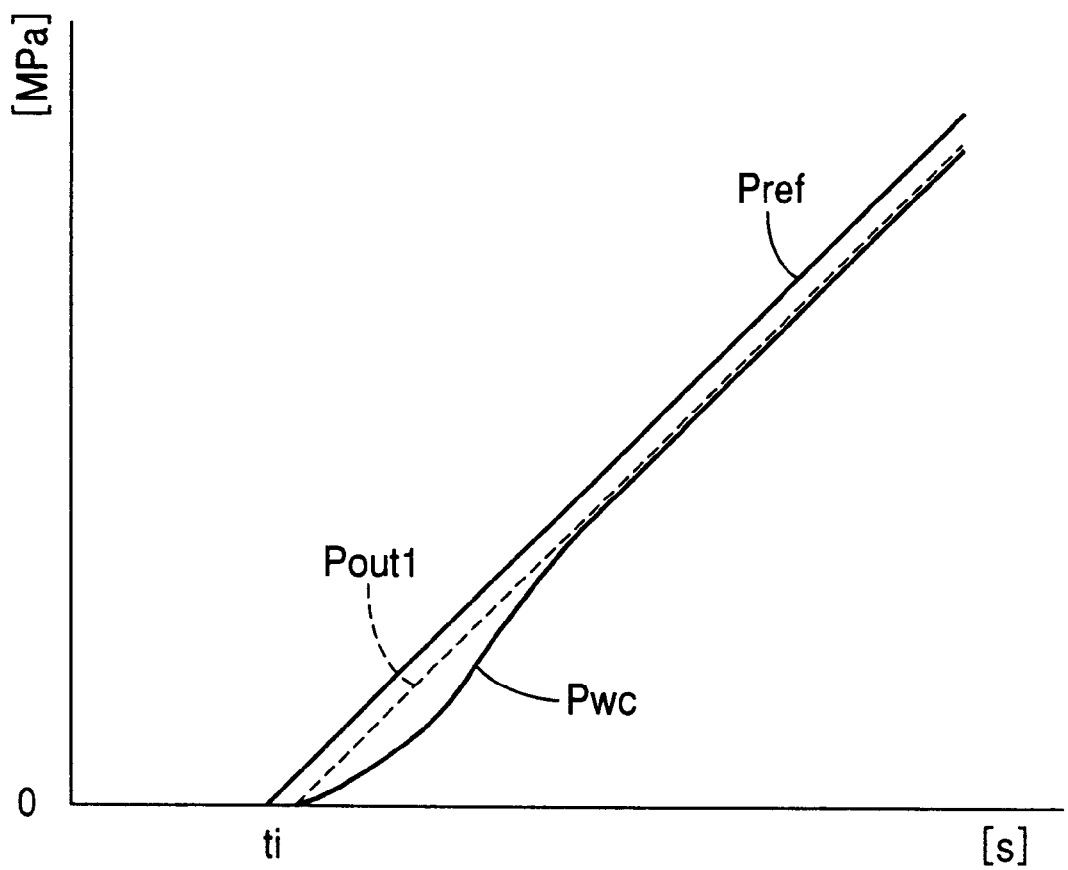
FIG. 15 is a graph for explaining a need of an initial increase of a rate of flow of the fluid into wheel brake cylinder.

The arrangement to minimize the delayed braking effect will be first explained. The graph of FIG. 15 shows a linear increase of the desired fluid pressure Pref from zero, as a result of depression of the brake pedal 126 initiated at a point of time ti (at which the desired fluid pressure Pref is zero). The graph also shows changes of the output fluid pressure Pout1 of the valve device 56 and a fluid pressure Pwc in the wheel cylinder 24, 36, 50, 52 (wheel brake cylinder pressure Pwc), as the desired fluid pressure Pref is increased. It will be understood from the graph that the wheel brake cylinder pressure Pwc tends to considerably deviate from the desired fluid pressure Pref immediately after the initiation of the depression of the brake pedal 126, even when the output fluid pressure Pout1 detected by the pressure sensor 64 changes accurately following the desired fluid pressure Pref. This tendency arises from a larger amount of the fluid required to be fed into the wheel brake cylinder per unit amount of increase of the wheel brake cylinder pressure in an initial period of the brake application, than in the other or subsequent period. In other words, the required rate of flow of the fluid through the conduit between the linear solenoid valve device 56 and the wheel brake cylinder 24, 26, 50, 52 in the initial period of the brake application is higher than in the subsequent period, so that there arises a large amount of deviation or difference of the wheel brake cylinder pressure Pwc from the output fluid pressure Pout1 of the valve device 56, in the initial period of the brake application. Further, the output fluid pressure Pout1 may not be accurately controlled following the desired fluid pressure Pref, if the pressure-increasing linear solenoid valve 150 is arranged such that the rate of flow of the fluid through the valve 150 in the subsequent period of the brake application is the same as that in the initial period.

In the view of the above analysis, the controller 66 is adapted such that the rate of flow of the fluid into the wheel brake cylinder is increased in an initial period of brake application. This increase is achieved by using the above-indicated initial fluid flow increasing voltage VFcainc as the the feed-forward pressure-increasing voltage increment VFca when the desired fluid pressure change amount dPref is a positive value and when the desired fluid pressure Pref is equal to or lower than the predetermined threshold Pth, as described before with respect to step S47 in the sub-routine of FIG. 7. The initial fluid flow increasing voltage VFcainc is a predetermined constant, which is larger than the voltage increment VFca as calculated according to the function MAPa of FIG. 8. When the initial fluid flow increasing voltage VFcainc is used, that is, where the affirmative decision (YES) is obtained in step S47, the pressure-increasing fluid pressure difference Pdiffa (Pin−Pout1) is relatively small, and the feed-forward pressure-increasing voltage increment VFca determined by the function MAPa is accordingly large. In view of this fact, the initial fluid flow increasing voltage VFcainc is determined to be larger than the maximum value VFmaxa of the feed-forward pressure-increasing voltage value VFmax. See FIG. 8. When the desired fluid pressure change amount dPref has become smaller than zero, or when the desired fluid pressure has become higher than the predetermined threshold Pth, that is, when the negative decision (NO) is obtained in step S47, the feed-forward pressure-increasing voltage increment VFca calculated according to the function MAPa is used in place of the initial fluid flow increasing voltage VFcainc. However, it is desirable to gradually change the increment VFca from the value VFcainc to the value as calculated according to the function MAPa, particularly when there exists a relatively large difference between the value VFcainc and the value VFca as calculated according to the function MAPa at the time the negative decision is obtained in step S47. In this respect, it is noted that a sudden change in the feed-forward pressure-increasing voltage increment VFca will cause a sudden change in the braking force produced by the a wheel brake cylinder.

Then, the arrangement to minimize the "brake dragging" will be described. The normal control of the valve device 56 does not assure complete zeroing of the output fluid pressure Pout1 upon termination of operation of the brake pedal 126. The output fluid pressure Pout1 which has not been zeroed will be referred to as "residual fluid pressure". The residual fluid pressure causes the wheel brake cylinder to provide a small residual braking effect even after complete releasing of the brake pedal 126. This phenomenon is generally called "brake dragging", which may be undesirably felt by the vehicle operator and cause an unnecessary wear of the brake pads and energy consumption. Therefore, it is desirable to prevent the brake dragging by eliminating the residual fluid pressure. The residual fluid pressure can be eliminated by bringing a portion of the fluid passage between the valve device 56 and the RL and RR wheel brake cylinders 50, 52, into communication with a fluid passage leading to the master cylinder 12, when the brake pedal 126 has been returned to the non-operated position, or a position close to the non-operated position. To this end, the controller 66 is adapted to apply the maximum voltage Vmax to the solenoid coil 210 of the pressure-increasing linear solenoid valve 152 for a predetermined time duration At for communication of the wheel brake cylinder with the master cylinder 12 to eliminate the residual fluid pressure, when the desired fluid pressure Pref has been lowered below a predetermined threshold δ while the valve device 56 remains in the pressure reducing or holding state. The threshold δ is a relatively small value. Thus, the pressure-increasing solenoid voltage Vapply to be applied to the solenoid coil 210 of the pressure-increasing linear solenoid valve 150 for the purpose of eliminating the residual fluid pressure is not equal to the sum of the feed-forward and feedback pressure-increasing voltage values VFapply and VBapply determined by the feed-forward and feedback control portions 200, 302, but is the maximum voltage Vmax. Namely, the pressure-increasing solenoid voltage Vapply to eliminate the residual fluid pressure is not determined by the feed-forward and feedback control portions 300, 302. Similarly, the pressure-increasing solenoid voltage Vapply to evacuate the reservoir 154, and the pressure-increasing and pressure-reducing solenoid voltages Vapply and Vrelease to reduce the abutting impact or seating velocity of the seating valve 190 are not determined by the feed-forward and feedback control portions 300, 302.

In the present embodiment, the elimination of the residual fluid pressure and the evacuation of the pressure-reducing reservoir 154 are effected concurrently by applying the maximum voltage Vmax to the solenoid coil 210 of the pressure-reducing linear solenoid valve 152 for the predetermined time duration At. When the pressure-increasing and pressure-reducing linear solenoid valves 250, 152 are open, the pressure-reducing reservoir 154 is communicated with the master cylinder 12, and the fluid in the reservoir 154 can be substantially entirely returned to the master cylinder 12 without flowing through the check valves 156, 158, even if the biasing force of the compression coil spring 188 of the reservoir 154 is relatively small. Since the fluid pressure in the master cylinder 12 immediately before termination of a braking operation is almost equal to the atmospheric pressure, the fluid can be discharged from the reservoir 154 toward the master cylinder 12 until the fluid pressure in the reservoir 154 has been lowered to a level almost equal to the atmospheric pressure. Thus, the amount of the fluid remaining in the reservoir 154 is almost zeroed immediately before termination of a braking operation, so that the fluid pressures in the wheel brake cylinders 24, 26, 50, 52 can be efficiently reduced during the next braking operation. In addition, the present arrangement permits a more rapid return of the fluid from the reservoir 154 to the master cylinder 12 through the linear solenoid valves 150, 152, than when the fluid is returned to the master cylinder 12 through the check valves 158, 156. Further, the present arrangement assures the return of the fluid from the reservoir 154 to the master cylinder 12 with higher stability, even when the fluid has a relatively low fluidity due to a relatively high viscosity at a relatively low temperature. It is also noted that the concurrent elimination of the residual fluid pressure in the wheel brake cylinders and evacuation of the reservoir 154 permits higher control efficiency than where the elimination and the evacuation are effected at different times.

Further, the above arrangement makes it possible to reduce the required biasing force of the compression coil spring 188 of the pressure-reducing reservoir 154, and accordingly makes it easier for the reservoir 154 to accommodate the fluid discharged from the wheel brake cylinders 24, 26, 50, 52 during reduction of the fluid pressures in these wheel brake cylinders. If the preset load of the spring 188 is made larger than the opening pressure difference of the check valves 158, 156, the fluid can be substantially entirely returned from the fluid chamber 186 of the reservoir 154 to the master cylinder 12 through the check valves 158, 156, even with the linear solenoid valve 152 placed in the closed state. In this case, however, the fluid discharged from the wheel brake cylinders may not be accommodated in the fluid chamber 186. In the present embodiment wherein the linear solenoid valves 150, 152 are opened to return the fluid from the reservoir 154 to the master cylinder 12 without flowing through the check valves 158, 156, the fluid accommodated in the fluid chamber 186 of the reservoir 154 can be substantially entirely and rapidly returned to the master cylinder 12. Accordingly, the required biasing force of the compression coil spring 188 can be reduced.

Figure 16:
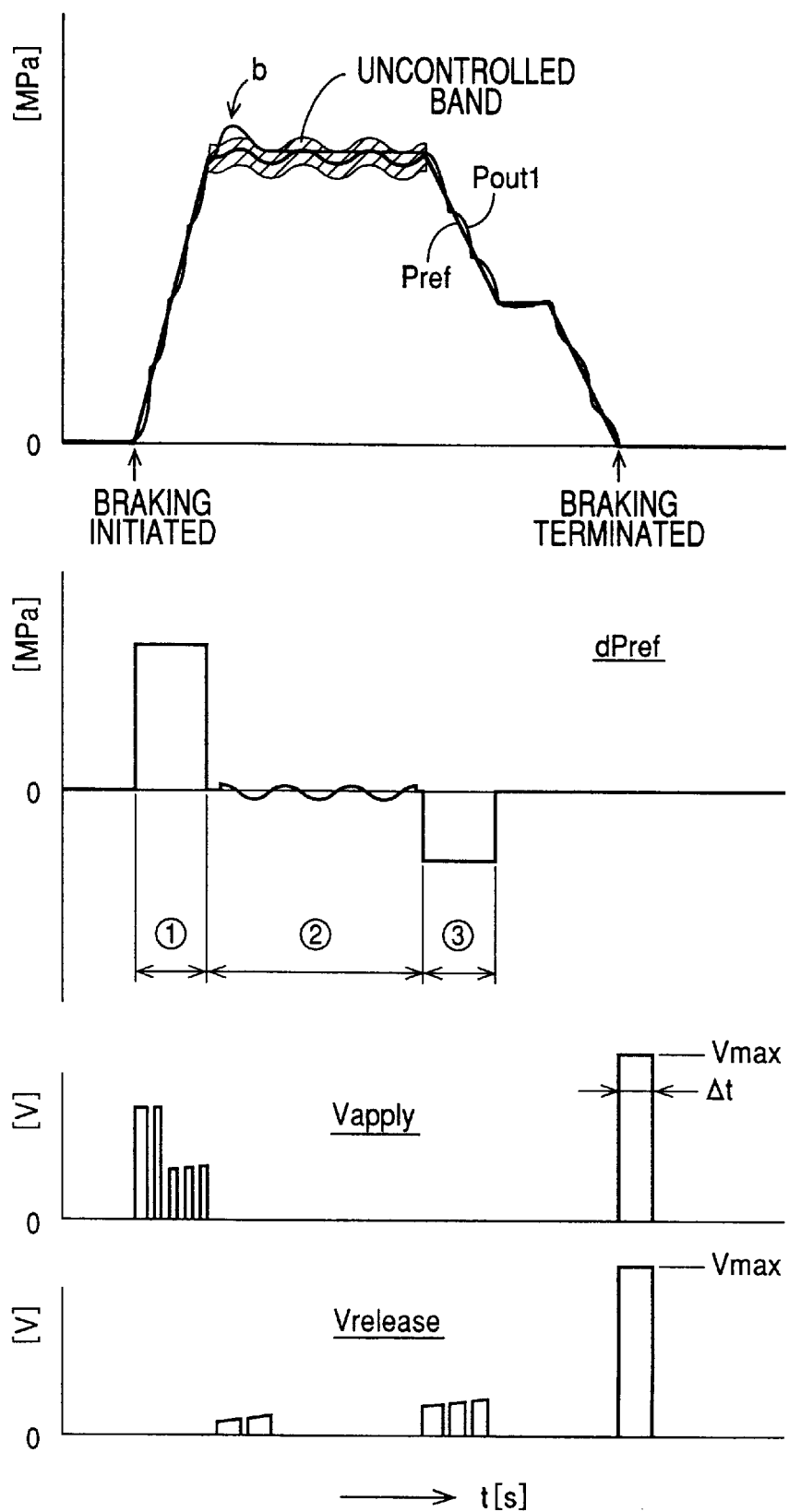
FIG. 16 is a graph schematically illustrating an example of a change in the desired fluid pressure Pref when the controller controls the linear solenoid valve device according to the concept of FIG. 14 and so as to to effect an initial increase of the fluid flow rate and removal of residual fluid pressure from the wheel brake cylinder, and examples of consequent changes in the output fluid pressure Pout1, desired fluid pressure change amount dPref and solenoid voltage values Vapply and Vrelease.

The graph of FIG. 16 shows changes of the desired fluid pressure Pref, output fluid pressure Pout1, desired fluid pressure change amount dpref, pressure-increasing solenoid voltage Vapply and pressure-reducing solenoid voltage Vrelease, when the linear solenoid valve device 56 is controlled according to the concept of FIG. 14 and so as to effect the initial increase of the flow rate of the fluid into the wheel brake cylinder in question, to eliminate the residual fluid pressure or brake dragging, and to evacuate the pressure-reducing reservoir 154. In the braking condition [1] indicated in FIG. 16, the valve device 56 is placed in the pressure-increasing state. In an initial portion of the brake application, that is, while the desired fluid pressure Pref is equal to or lower than the threshold Pth, the pressure-increasing solenoid voltage Vapply is made higher than in the subsequent portion of the brake application (in which the desired fluid pressure Pref is higher than the threshold Pth), as a result of the use of the initial fluid flow increasing voltage VFcainc, so as to minimize the deviation of the output fluid pressure Pout1 (the wheel brake cylinder pressure Pwc) from the desired fluid pressure Pref due to insufficient rate of flow of the fluid into the wheel brake cylinder immediately after the initiation of the brake application. In the braking condition [2] indicated in FIG. 16, the valve device 56 is held in the pressure-holding state as long as the output fluid pressure Pout1 remains within an uncontrolled band indicated by hatching in FIG. 16. However, at a point of time indicated by "b", the output fluid pressure Pout1 rises above the upper limit of the uncontrolled band due to an overshoot of the pressure increasing operation, resulting in an increase in the absolute value of the control error "error" so that the valve device 56 is placed in the pressure-reducing state. In the braking condition [3] also indicated in FIG. 16, the desired fluid pressure Pref decreases, and the output fluid pressure Pout1 is lowered with the valve device 56 placed alternately in the pressure-reducing and pressure-holding states. When the operating speed of the electric motor is lowered as a result of a decrease in the vehicle running speed, the regenerative braking force is zeroed, and the hydraulic braking pressure is made substantially equal to the desired braking force.

When the desired fluid pressure Pref has been lowered to the threshold value δ or lower immediately before the termination of the brake application (complete releasing of the brake pedal 126), the pressure-increasing and pressure-reducing solenoid voltages Vapply and Vrelease are raised to the maximum value Vmax, to eliminate the residual fluid pressure (to zero the wheel brake cylinder pressure Pwc) and to evacuate the pressure-reducing reservoir 154. Since the maximum voltage Vmax is applied as the voltage Vapply to the solenoid coil 210 of the pressure-increasing linear solenoid valve 150, the fluid can be rapidly returned from the wheel brake cylinders to the master cylinder 12. Where the desired fluid pressure Pref is held constant at a relatively high level with the change amount dPref being kept zero, there remains some control error "error" between the desired fluid pressure Pref and the output fluid pressure Pout1. Upon termination of the brake application with the desired fluid pressure Pref being zeroed, however, the output fluid pressure Pout1 is zeroed as a result of the elimination of the residual fluid pressure, so that the control error "error" is not left.

Since the maximum voltage Vmax is applied as the pressure-reducing solenoid voltage Vrelease to the pressure-reducing linear solenoid valve 152, the fluid stored in the reservoir 154 is returned to the master cylinder through the pressure-increasing and pressure-reducing linear solenoid valves 150, 152. Since the fluid pressure in the master cylinder 12 immediately before termination of a braking operation is almost equal to the atmospheric pressure, the fluid accommodated in the reservoir 154 can be almost entirely and rapidly returned to the master cylinder 12. The time required for returning the fluid from the reservoir 154 to the master cylinder 12 through the linear solenoid valves 150, 152 is shorter than the time required for returning the fluid through the check valves 158, 156 only.

Then, the arrangement to reduce the seating velocity of the seating valves 190 of the linear solenoid valves 150, 152 to reduce the abutting impact will be described. As described above, the voltage to be applied to the solenoid coil 210 of the seating valve 190 is either higher than zero, or zero. Where the linear solenoid valve device 56 is placed in the pressure increasing state according to the concept of FIG. 14, the pressure-increasing solenoid voltage Vapply for the linear solenoid valve 150 is made larger than zero, while the pressure-reducing solenoid voltage Vrelease for the linear solenoid valve 152 is zeroed. Where the valve device 56 is placed in the pressure reducing state, the pressure-reducing solenoid voltage Vrelease for the valve 152 is made larger than zero, while the pressure-increasing solenoid voltage Vapply for the valve 150 is zeroed. Where the valve device 56 is placed in the pressure holding state, the solenoid voltages Vapply and Vrelease are both zeroed. When the operating state of the valve device 56 is changed from the pressure increasing or reducing state to the pressure holding state, that is, when the voltage Vapply, Vrelease is zeroed while the valve member 200 is spaced apart from the valve seat 202, the valve member 200 is moved by the biasing force of the spring 206, 224 toward the valve seat 202, at an increasing velocity, so that the valve member 200 is seated onto the valve seat 202 at a relatively high abutting velocity, causing a considerably large impact between the valve member 200 and the valve seat 202. Consequently, a considerably abutting noise is generated upon seating of the valve member 200 onto the valve 202, and the durability of the seating valve 190 is relatively low. To solve this problem, the controller 66 is adapted such that the voltage to be applied to the solenoid coil 210 when the valve device 56 is switched from the pressure increasing or reducing state to the pressure holding state is not immediately zeroed, but the voltage is maintained at a value larger than zero, for a predetermined time during at least a portion of the time of movement of the valve member 200 toward the valve seat 202.

Figure 19:
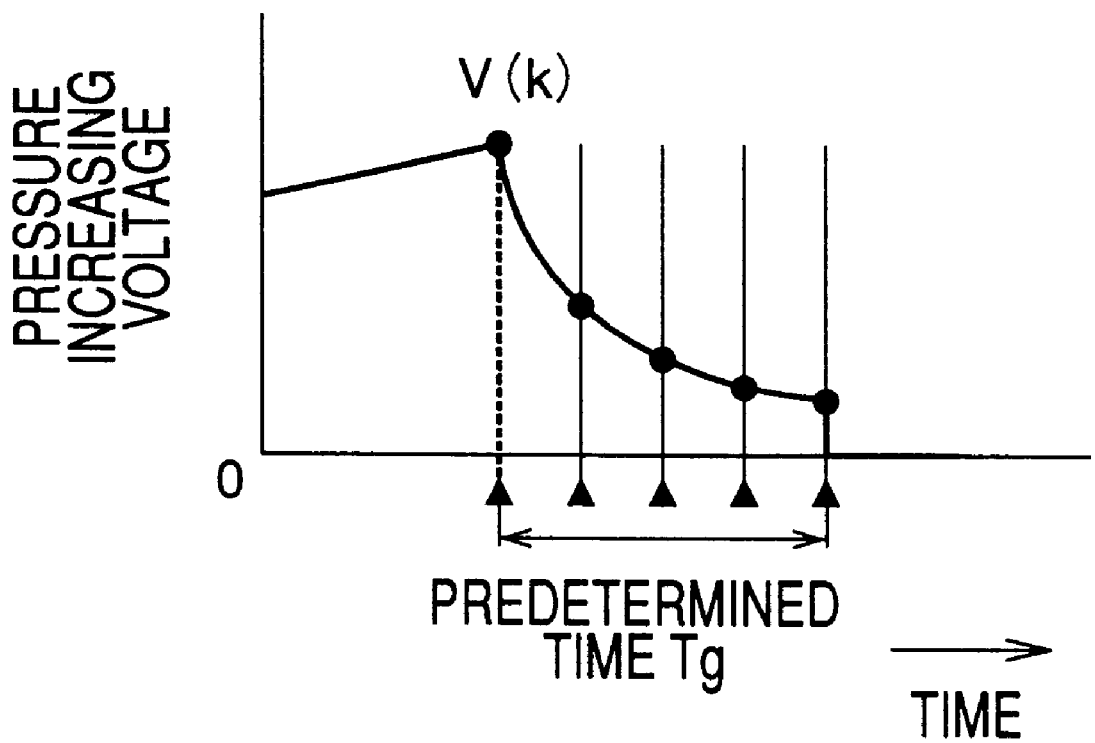
FIG. 19 is view indicating reduction of a voltage applied to the solenoid as a result of the processing in the step S124.

In the case of the pressure-increasing linear solenoid valve 150, the pressure-increasing solenoid voltage Vapply is maintained at a value obtained according to the following equation (8), for a predetermined time duration Tg, as indicated in the graph of FIG. 19:

$$V(k)=\alpha \cdot V(k) \qquad (8)$$

In the above equation (8), a is a constant smaller than one. The voltage value V(k) used in each control cycle is obtained by multiplying the voltage value used in the last control cycle, by the constant α, so that the voltage value Vapply is exponentially reduced.

Since the voltage is exponentially reduced, the valve member 200 does not abut on the valve seat 202 at a high velocity, but is seated on the valve seat 202 in a relatively short time so that the amount of the fluid which flows between the valve member 200 and the valve seat 202 is minimized, so as to reduce the deterioration of the control accuracy of the fluid pressure in the wheel brake cylinder in question.

The voltage (which is reduced depending upon the constant α and may be referred to as "seating velocity reducing voltage) and the time duration during which the voltage is applied to the solenoid coil 210 are determined so as to minimize the seating velocity while reducing the deterioration of the control accuracy of the fluid pressure of the wheel brake cylinder. The pressure-reducing solenoid voltage Vrelease of the pressure-reducing linear solenoid valve 152 is also determined according to the above equation (8) so that the voltage Vrelease is exponentially lowered.

Figure 17:
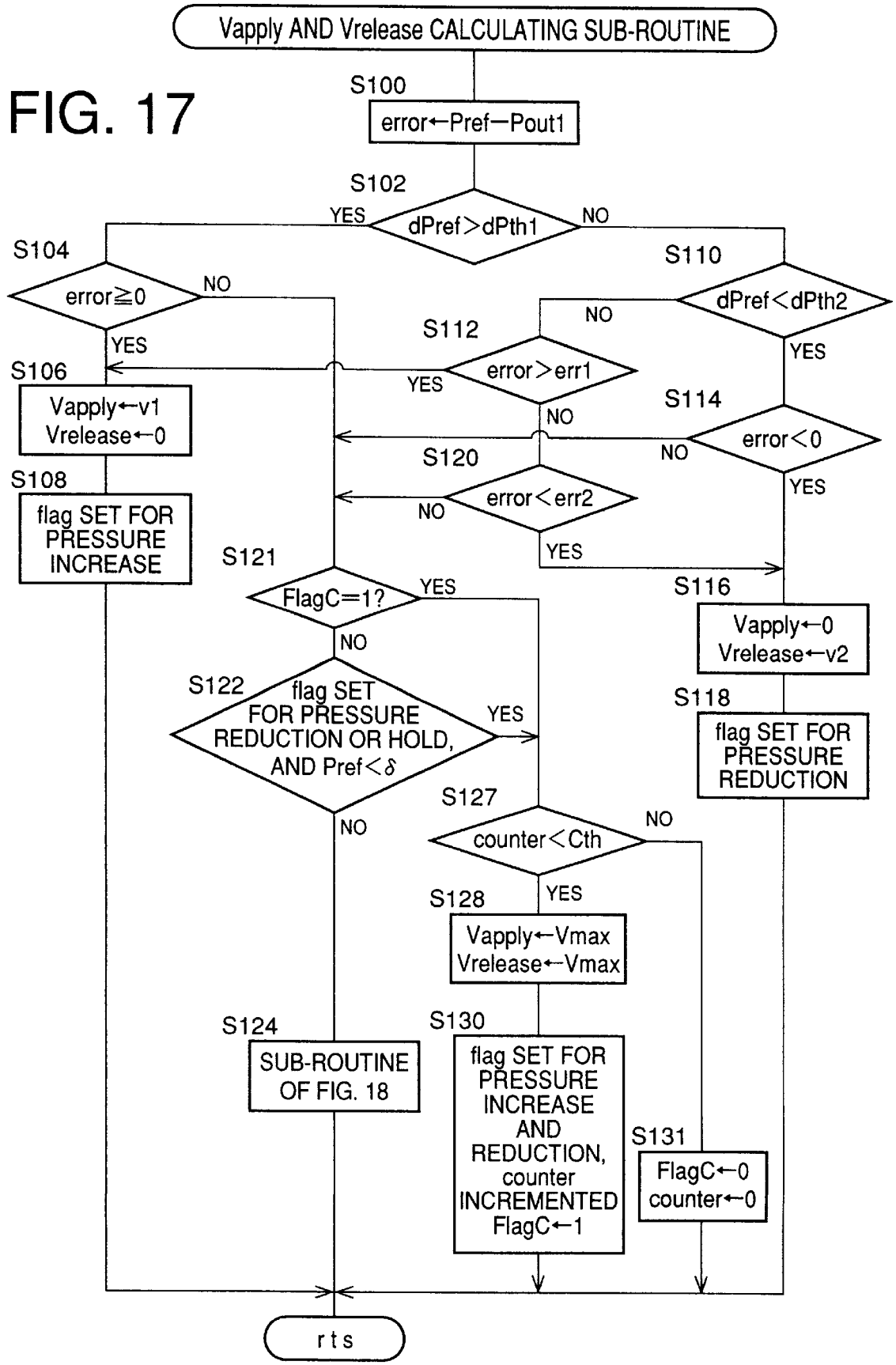
FIG. 17 is a flow chart illustrating a sub-routine executed in step S14 of the main routine of FIG. 6, to calculate the solenoid voltage values Vapply and Vrelease.

Referring to the flow chart of FIG. 17, thee will be described the sub-routine executed in step S14 of the main routine of FIG. 6, to calculate the pressure-increasing and pressure-reducing solenoid voltages Vapply and Vrelease. The sub-routine of FIG. 17 is formulated according to the concept illustrated in FIG. 14, and so as to effect the initial increase of the fluid flow rate, the elimination of the residual fluid pressure and the evacuation of the pressure-reducing reservoir 154, which have been described above. The sub-routine of FIG. 17 is initiated with step S100 in which the control error "error" is calculated as Pref–Pout1. Step S100 is followed by step S102 to determine whether the change amount dPref of the desired fluid pressure Pref is larger than the first predetermined threshold dPth1. If an affirmative decision (YES) is obtained in step S102, the control flow goes to step S104 to determine whether the control error "error" is zero or a positive value. If an affirmative decision (YES) is obtained in step S104, the control flow goes to step S106 in which a voltage v1 is set as the pressure-increasing solenoid voltage Vapply, while the pressure-reducing solenoid voltage Vrelease is zeroed. The voltage v1 is a sum of the feed-forward pressure-increasing voltage value VFapply calculated in step S50 of the sub-routine of FIG. 7 and the feedback pressure-increasing voltage value VBapply calculated in step S14 of the main routine of FIG. 6. Step S106 is followed by step S108 in which a pressure control variable "flag" is set to a value indicative of the pressure-increasing state of the valve device 56. Thus, one cycle of execution of the sub-routine of FIG. 17 is terminated. Steps S106 and S108 for placing the valve device 56 in the pressure-increasing state where the change amount dPref is larger than the first threshold dpth1 while the control error "error" is equal to or larger than zero correspond to the pressure increasing operation in the braking condition [1] indicated in FIG. 14. The pressure increasing operation is also effected where a negative decision (NO) is obtained in steps S102 and S110 and an affirmative decision (YES) is obtained in step S112. Step S110 is provided to determine whether the desired fluid pressure change amount dpref is smaller than the second predetermined threshold dPth2. Step S112 is provided to determine whether the control error "error" is larger than the predetermined upper limit err1. Steps S106 and S108 for placing the valve device 56 in the pressure-increasing state where the change amount dPref is smaller than the second threshold dPth2 corresponds to the pressure increasing operation in the braking condition [2] indicated in FIG. 14.

The pressure control variable "flag" is set at one of four values of the operating state of the valve device 56, namely, "1" indicative of the pressure-increasing state, "2" indicative of the pressure-reducing state, "3" indicative of the pressure-holding state, and "4" indicative of the pressure-increasing and pressure-reducing states. When the variable "flag" is set at "1", it means that the pressure-increasing solenoid voltage Vapply to be applied to the solenoid coil 210 of the pressure-increasing linear solenoid valve 150 is larger than zero, but does not necessarily mean that the fluid pressure in the wheel brake cylinder in question is actually being increased. Similarly, the variable "flag" set at "2" means that the pressure-reducing solenoid voltage Vrelease to be applied to the solenoid coil 210 of the pressure-reducing linear solenoid valve 150 is larger than zero, but does not necessarily mean that the fluid pressure in the wheel brake cylinder is actually being reduced. Accordingly, when the variable "flag" is set at "4", it means that the voltages Vapply and Vrelease to be applied to the solenoid coils 210 of the pressure-increasing and pressure-reducing linear solenoid valves 150, 152 are both larger than zero. When the variable "flag" is set at "3", it means that the voltages Vapply and Vrelease are both zero.

If an affirmative decision (YES) is obtained in step S110 and also in the following step S114, the control flow goes to step S116 in which the pressure-increasing solenoid voltage Vapply is zeroed while a voltage v2 is set as the pressure-reducing solenoid voltage Vrelease. The voltage v2 is a sum of the feed-forward pressure-reducing voltage value VFrelease calculated in step S50 of the sub-routine of FIG. 7 and the feedback pressure-reducing voltage value VBrelease calculated in step S12 of the main routine of FIG. 6. Then, the control flow goes to step S118 in which the pressure control variable "flag" is set to a value indicative of the pressure-reducing state of the valve device 56. Thus, one cycle of execution of the sub-routine of FIG. 17 is terminated. Steps S116 and S118 for placing the valve device 56 in the pressure-reducing state where the change amount dpref is smaller than the second threshold dPth2 while the control error "error" is smaller than zero correspond to the pressure reducing operation in the braking condition [3] indicated in FIG. 14. The pressure reducing operation is also effected when a negative decision (NO) is obtained in step S112 while an affirmative decision (YES) is obtained in the following step S120, which is provided to determine whether the control error "error" is smaller than the lower limit err2. Steps S116 and s118 for placing the valve device 56 in the pressure-reducing state where the change amount dPref is not smaller than the second threshold dPth2 while the control error "error" is smaller than the lower limit err2 correspond to the pressure reducing operation in the braking condition [2] indicated in FIG. 14.

Figure 18:
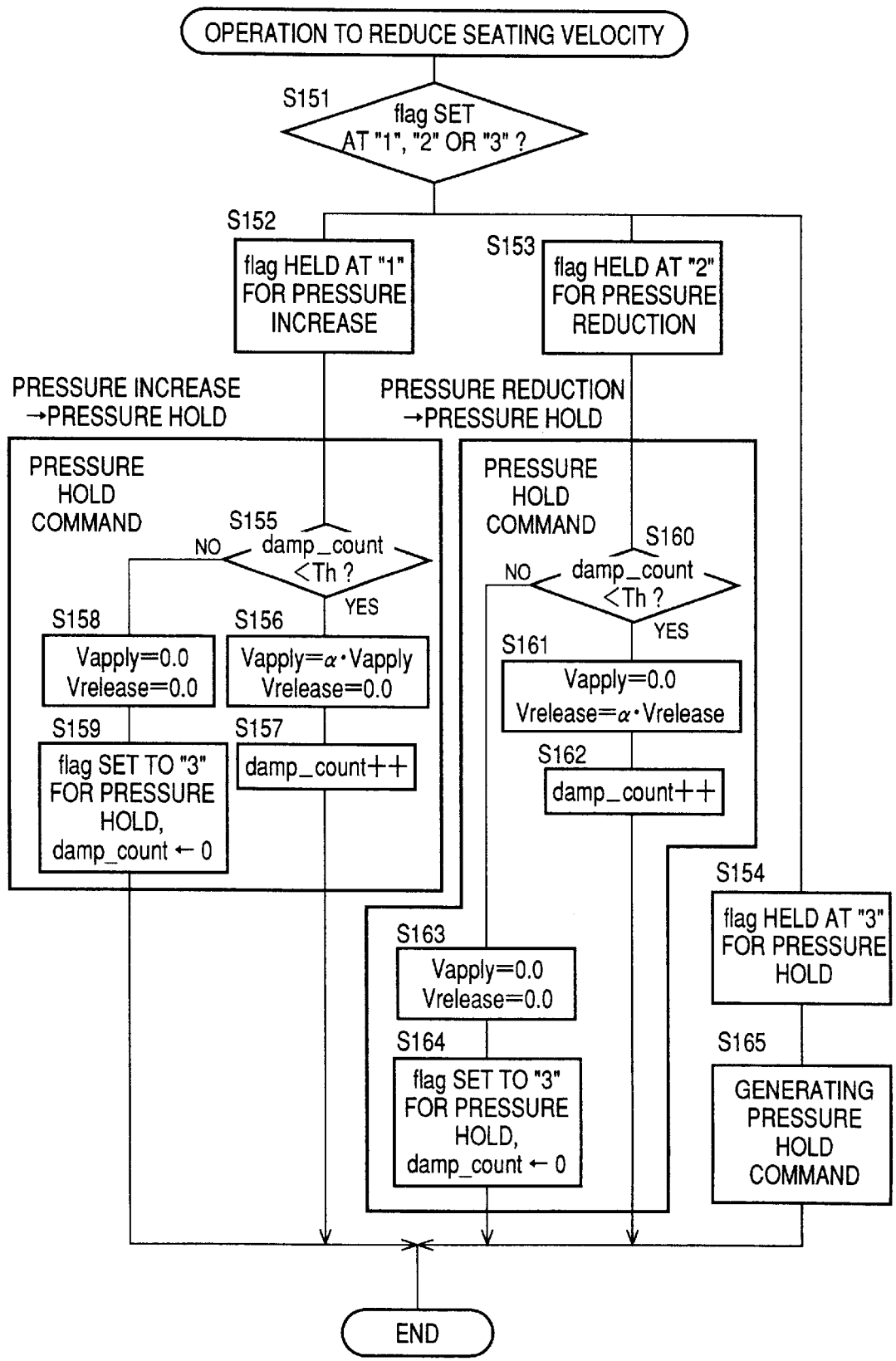
FIG. 18 is a flow chart illustrating an example of an operation to reduce seating velocity of a seating valve of the linear solenoid valve device, in step S124 of the sub-routine of FIG. 17.

If a negative decision (NO) is obtained in step S104, S114 or S120, it means that valve device 56 should be placed in the pressure-holding state. In this case, the control flow goes to step S121 to determine whether a variable FlagC is set at "1". Immediately after the initiation of the brake application, a negative decision (NO) is obtained in step S121, and the control flow goes to step S122 to determine whether the pressure control variable "flag" is set at the value indicative of the pressure-reducing or pressure-holding state of the valve device 56 while the desired fluid pressure Pref is lower than the threshold 6. If a negative decision (NO) is obtained in step S122, the control flow goes to step S124 in which the sub-routine of FIG. 18 is executed, as described below, to reduce the seating velocity of the seating valve 190 when the linear solenoid valve 150, 152 is closed. If an affirmative decision (YES) is obtained in step S122, the control flow goes to step S127 and the subsequent steps, to effect the elimination of the residual fluid pressure in the wheel brake cylinder and the evacuation of the reservoir 154. Step S127 is provided to determine whether the variable "counter" is smaller than a predetermined threshold Cth, which determines the predetermined time duration Δt during which the valve device 56 is controlled so as to eliminate the residual fluid pressure (brake dragging) and evacuate the reservoir 154. When step S127 is implemented for the first time, an affirmative decision (YES) is obtained in step S127, and the control flow goes to step S128 in which the pressure-increasing and pressure-reducing solenoid voltages Vapply and Vrelease are raised to the maximum value Vmax. Step S128 is followed by step S130 in which the variable "flag" is set to the value "4" indicative of the pressure-increasing and pressure-reducing states of the valve device 56, and the variable "counter" is incremented. Further, the variable FlagC is set to "1" in step S130, to indicate that the elimination of the residual fluid pressure and the evacuation of the reservoir 154 have been initiated. Thus, one cycle of execution of the sub-routine of FIG. 17 is terminated. Steps S127, S128 and S130 are repeatedly implemented since an affirmative decision (YES) is obtained in step S121. When the predetermined time duration Δt has passed after the variable FlagC has been set to "1", a negative decision (NO) is obtained in step S127, and the control flow goes to step S131 in which the variable FlagC and the variable "counter" are both reset to "0". Thus, one cycle of execution of the sub-routine of FIG. 17 is terminated.

Referring next to the flow chart of FIG. 18, there will be described the sub-routine formulated to close the linear solenoid valve 150, 152 so as to reduce the seating velocity of the seating valve 190.

The sub-routine of FIG. 18 is initiated with step S151 to determine whether the pressure control variable "flag" is set at "1" indicative of the pressure-increasing state, "2" indicative of the pressure-reducing state or "3" indicative of the pressure-holding state. When the sub-routine of FIG. 18 (step S124 in the sub-routine of FIG. 17) is executed, it means that the linear solenoid valve 150, 152 should be placed in the pressure-holding state in the present cycle of execution of the sub-routine of FIG. 17. Therefore, the determination in step S151 is a determination as to which one of the pressure-increasing, pressure-reducing and pressure-holding states was selected in the last cycle of execution of the sub-routine of FIG. 17. If the variable "flag" is set at "1" indicative of the pressure-increasing state, the control flow goes to step S152. If the variable "flag" is set at "1" indicative of the pressure-reducing state, the control flow goes to step S152. If the variable "flag" is set at "3" indicative of the pressure-holding state, the control flow goes to step S154. When the variable "flag" is set at "4" and the variable flagc is set at "1", and the control flow will not go to step S124 (the sub-routine of FIG. 18 will not be executed).

When the variable "flag" is set at "1" indicative of the pressure-increasing state, the variable "flag" is held at "1" in step S152. Although the pressure-increasing linear solenoid valve 150 should be eventually placed in the pressure-holding state or closed, the variable "flag" is held at "1" for the pressure-increasing state. If the variable "flag" was set to "3" indicative of the pressure-holding state, the voltage Vapply to be applied to the solenoid coil 210 of the linear solenoid valve 150 would be zeroed, resulting in abrupt seating of the valve member 200 onto the valve seat 202 with a considerably large abutting impact therebetween. Step S152 is followed by step S155 to determine whether the content of a time counter damp_count is smaller than a predetermined value Th. This value Th corresponds to a time duration during which the pressure-increasing solenoid voltage Vapply is gradually reduced toward zero by repeated implementation of the next step S156. Initially, an affirmative decision (YES) is obtained in step S155, and the control flow goes to step S156 in which the present value of the pressure-increasing solenoid voltage Vapply is calculated by multiplying the last value (used in the last cycle of execution of the sub-routine of FIG. 18) by the predetermined constant a smaller than "1", as described above. Then, the control flow goes to step S157 to increment the time counter damp_count. With the repeated implementation of steps S155–S57, the voltage Vapply is not abruptly reduced to zero, but is gradually or slowly reduced to zero for the predetermined time corresponding to the predetermined value Th. In the present embodiment, the pressure-increasing solenoid voltage Vapply is exponentially reduced as indicated in FIG. 19, such that the rate of reduction of the velocity of the valve member 200 is gradually reduced with the time.

When the predetermined time has passed after repeated implementation of steps S155–S157, a negative decision (NO) is obtained in step S155, and the control flow goes to step S158 to zero the voltage Vapply and to step S159 to set the pressure control variable "flag" to "3" indicative of the pressure-holding state and reset the time counter damp_count. As a result, the pressure-increasing linear solenoid valve 150 is closed with its valve member 200 being seated onto the valve seat 202. Thus, the voltage Vapply is gradually reduced to zero so that the velocity of the valve member 200 at which the valve member 200 is seated onto the valve seat 202 is sufficiently lower according to the principle of the present invention, than in the case where the Vapply is rapidly zeroed immediately after the determination that the linear solenoid valve 150 should be closed. Accordingly, the abutting impact of the valve member 200 upon its seating onto the valve seat 202 is significantly reduced according to the principle of the present invention. It is noted that when the pressure-holding state is selected following the pressure-increasing state, that is, when step S158 is implemented, the pressure-reducing solenoid voltage Vrelease is held zero.

If the pressure control variable "flag" is set at "2" indicative of the pressure-reducing state, the control flow goes to step S153 in which the variable "flag" is held at "2". Although the pressure-reducing linear solenoid valve 150 should be eventually placed in the pressure-holding state or closed, the variable "flag" is held at "2" for the pressure-reducing state. If the variable "flag" was set to "3" indicative of the pressure-holding state, the voltage Vrelease to be applied to the solenoid coil 210 of the linear solenoid valve 152 would be zeroed, resulting in abrupt seating of the valve member 200 onto the valve seat 202. Step S153 is followed by steps S160–S162 in which the pressure-reducing solenoid voltage Vrelease is gradually reduced for the predetermined time, by multiplying the last voltage value by the predetermined constant a smaller than "1". When the predetermined time has passed after repeated implementation of steps S160–S162, a negative decision (NO) is obtained in step S160, and the control flow goes to steps S163 and S164 to zero the voltage Vrelease, set the pressure control variable if "flag" to "3" indicative of the pressure-holding state and reset the time counter damp_count. As a result, the pressure-reducing linear solenoid valve 152 is closed with its valve member 200 being seated onto the valve seat 202. Thus, the voltage Vrelease is gradually reduced to zero so that the velocity of the valve member 200 at which the valve member 200 is seated onto the valve seat 202 is sufficiently low.

If the pressure control variable "flag" is set at "3" indicative of the pressure-holding state, the control flow goes to step S154 to hold the variable "flag" at "3" and to S165 to zero the pressure-increasing and pressure-reducing solenoid voltages Vapply and Vrelease. Since the variable "flag" is set at "3", the step S154 is not essential.

As described above, the pressure-increasing solenoid voltage Vapply is gradually reduced to reduce the seating velocity and abutting impact of the valve member 200 of the pressure-increasing linear solenoid valve 150 upon its seating onto the valve seat 202, when the pressure-holding state is selected following the pressure-increasing state. Further, the pressure-reducing solenoid voltage Vrelease is gradually reduced to reduce the seating velocity and abutting impact of the valve member 200 of the pressure-reducing linear solenoid valve 152 upon its seating onto the valve seat 202, when the pressure-holding state is selected following the pressure-reducing state.

In the present embodiment wherein the pressure-increasing, pressure-reducing and pressure-holding states of the valve device 56 are selected according to the concept indicated in the table of FIG. 14, the valve device 56 is not switched between the pressure-increasing and pressure-reducing states. Therefore, the sub-routine of FIG. 18 is executed only when the pressure-holding state is selected. If the valve device 56 is not controlled according to the concept of FIG. 14, the pressure-increasing state may be changed to the pressure-reducing state, or vice versa. In this case, the solenoid voltages Vapply and Vrelease may be controlled so as to reduce the abutting impact between the valve member 200 and the valve seat 202. When the pressure-reducing state is selected following the pressure-increasing state, the pressure-increasing solenoid voltage Vapply is exponentially reduced, and the pressure-reducing solenoid voltage Vrelease is set to v2. Further, the pressure control variable "flag" is set to "1" indicative of the pressure-increasing and pressure-reducing states. When the predetermined time has passed, the variable "flag" is set to "2" indicative of the pressure-reducing state. When the pressure-increasing state is selected following the pressure-reducing state, the pressure-reducing solenoid voltage Vrelease is similarly exponentially reduced, and the pressure-increasing solenoid voltage Vapply is set to v1. Further, the pressure control variable "flag" which has been set to "4" is set to "1" indicative of the pressure-increasing state when the predetermined time has passed. Where a high control response is desired upon switching of the operating state of the valve device 56 between the pressure-increasing and pressure-reducing states, namely, where it is desired to rapidly increase or reduce the fluid pressure in the wheel brake cylinder, the control of the solenoid voltages Vapply and Vrelease to reduce the seating velocity or abutting impact of the seating valve 190 may not be implemented, or may be stopped as needed.

There will next be described an anti-lock brake pressure control operation of the present braking system.

An anti-lock brake pressure control operation of the present hydraulic braking system is performed in most cases while the hydraulic braking system is operated in the cooperative control mode, namely, is operated in cooperation with the regenerative braking system. In the anti-lock pressure control mode, each of the solenoid-operated shut-off valves 42, 44, 58, 72, 84, 86 is selectively placed in the open or closed state, for controlling the fluid pressures in the wheel brake cylinders 24, 26, 50, 52 so as to maintain the amounts of slip of the wheels 23, 25, 49, 51 in a predetermined optimum range, while the pressure-increasing and pressure-reducing solenoid voltages Vapply and Vrelease applied to the solenoid coils 210 of the pressure-increasing and pressure-reducing linear solenoid valves 150, 152 of the linear solenoid valve device 56 are controlled so that the output pressure Pout1 detected by the pressure sensor 64 coincides with the desired fluid pressure Pref.

To reduce the fluid pressures in the wheel brake cylinders 24, 26, 50, 52, the solenoid-operated shut-off valves 42, 44, 72 are switched to the open state to cause the fluid to be discharged from the wheel brake cylinders and returned to the master reservoir 18. When the fluid pressure in the wheel brake cylinders should be rapidly reduced, the fluid discharged from the wheel brake cylinders is also returned to the pressure-reducing reservoir 154 through the solenoid-operated shut-off valves 58, 85, 86 and the pressure-reducing linear solenoid valve 152. Since the fluid discharged from the wheel brake cylinders can be returned to the master reservoir 18 and the pressure-reducing reservoir 154 through not only the pressure-reducing solenoid-operated valves 72, 42, 44 but also the pressure-increasing solenoid-operated shut-off valves 58, 84, 86, the rate of discharge flow of the fluid from the wheel brake cylinders can be sufficiently high, so that the fluid pressure in the wheel brake cylinders can be rapidly reduced at a high rate so as to effectively prevent an increase in the slipping tendency of the wheels.

Rapid reduction of the fluid pressure in the wheel brake cylinder is required, for example, in a case where the friction coefficient of the road surface is lowered after the hydraulic braking system is activated when the friction coefficient of the road surface is relatively high. During running of the vehicle on the road surface having a high friction coefficient, the brake pedal 19 may be depressed with a considerable large force. In this case, the fluid pressure in the wheel brake cylinders is raised to a considerably high level. If the friction coefficient of the road surface is subsequently lowered, the fluid pressure in the wheel brake cylinders is excessively high with respect to the relatively low friction coefficient. In this case, the vehicle wheels braked have excessively large amounts of slip, and the fluid pressures in the wheel brake cylinders should be rapidly reduced. The necessity to effect rapid reduction of the fluid pressure in a given wheel brake cylinder is detected when the fluid pressure is higher than a predetermined upper limit while the braking system is operated in the anti-lock brake pressure control mode or after the predetermined condition for initiating the anti-lock brake pressure control operation is satisfied. It is also noted that the amount of reduction of the rotating speed of a given wheel increases with a difference of the actual fluid pressure in the corresponding wheel brake cylinder from an optimum value which is determined by the specific friction coefficient of the road surface. In this respect, the necessity to effect the rapid reduction of the fluid pressure may be detected when the amount of reduction of the rotating speed of the wheel is larger than a predetermined upper limit. In the present embodiment, the necessity of reduction of the fluid pressure in the wheel brake cylinder is detected if the amount of reduction of the rotating speed of the wheel exceeds the predetermined upper limit. The fluid pressures in the wheel brake cylinders are detected based on the output signals of the pressure sensors 110, 112, 114.

In the present embodiment, the amount of reduction of the rotating speed of the wheel is obtained as a difference between the two rotating speed values in the last and present control cycles. Since the cycle time is constant, this difference may be considered to represent the rate of reduction of the wheel rotating speed, that is, the deceleration value of the wheel. The thus obtained wheel deceleration value is compared with a predetermined threshold to determine whether rapid reduction of the fluid pressure in the wheel brake cylinder is necessary. The amount of reduction of the rotating speed of the wheel for a relatively long time period may be obtained and compared with a predetermined threshold. In the former case, the rapid reduction of the fluid pressure can be effected immediately after the necessity to do so is detected, and the vehicle can be braked with high stability. In the latter case, rapid reduction of the fluid pressure which in fact is not necessary can be effectively avoided.

The fluid pressure in the wheel brake cylinder can be rapidly reduced by applying the maximum voltage Vmax as the pressure-reducing solenoid voltage Vrelease and zeroing the pressure-increasing solenoid voltage Vapply. This control is effected independently of the cooperative control mode in cooperation of the regenerative braking system. That is, the pressure-increasing and pressure-reducing solenoid voltages Vapply and Vrelease may be different from those determined in the cooperative control mode. In this case, the rapid reduction of the fluid pressure is necessarily effected in preference to the control in to the cooperative control mode. Since the rapid reduction does not last for a long time, it has only a small influence on the fluid pressure control in the cooperative control mode.

The anti-lock brake pressure control operation is initiated when the predetermined anti-lock control initiating condition is satisfied, and terminated when the predetermined anti-lock control terminating condition is satisfied. The anti-lock control initiating condition is satisfied when the wheel deceleration value Gw is equal to or larger than a predetermined upper limit G1 and when an amount of slip $\Delta V$ of the wheel is larger than a predetermined upper limit $\Delta V1$. The anti-lock control terminating condition is satisfied when the brake pedal 19 is released or when an estimated vehicle running speed Vso is lower than a predetermined lower limit or anti-lock control terminating value. The anti-lock brake pressure control operation is also terminated when the number of pressure-increasing pulses generated has reached a predetermined value, where a duty-ratio-control pressure increase mode is established to increase the fluid pressure. The predetermined upper limit $\Delta V1$ indicated above is equal to ($\Delta VSN+\Delta VR$), that is, equal to a sum of an initial wheel slip amount $\Delta VSN$ and a reference wheel slip amount $\Delta VR$. The initial wheel slip amount $\Delta VSN$ is an amount of slip of the wheel when the wheel deceleration value Gw has increased to the predetermined upper limit G1. The reference wheel slip amount $\Delta VR$ is an amount of slip of the wheel which is determined according to the following equation, on the basis of the estimated vehicle running speed Vso when the wheel deceleration value Gw has increased to the upper limit G1.

$$\Delta VR = A \cdot V_{SO} + B$$

wherein A and B are constants.

In the anti-lock brake pressure control operation, the duty-ratio-control pressure increase mode, the pressure hold mode and the pressure reduction mode are selectively established on the basis of the wheel deceleration value Gw and the wheel slip amount $\Delta V$. The pressure reduction is selected when the wheel deceleration value Gw is equal to or larger than the predetermined upper limit G1 while the wheel slip amount $\Delta V$ is larger than the predetermined upper limit $\Delta V1$. The pressure hold mode is selected when the wheel deceleration value Gw is smaller than a predetermined threshold G2 while the wheel slip amount $\Delta V$ is larger than the predetermined upper limit $\Delta V1$. The duty-cycle-control pressure increase mode is selected when the wheel slip amount $\Delta V$ is equal to or smaller than the predetermined upper limit $\Delta V1$ while the wheel deceleration value Gw is smaller than the predetermined threshold G2.

Figure 20:
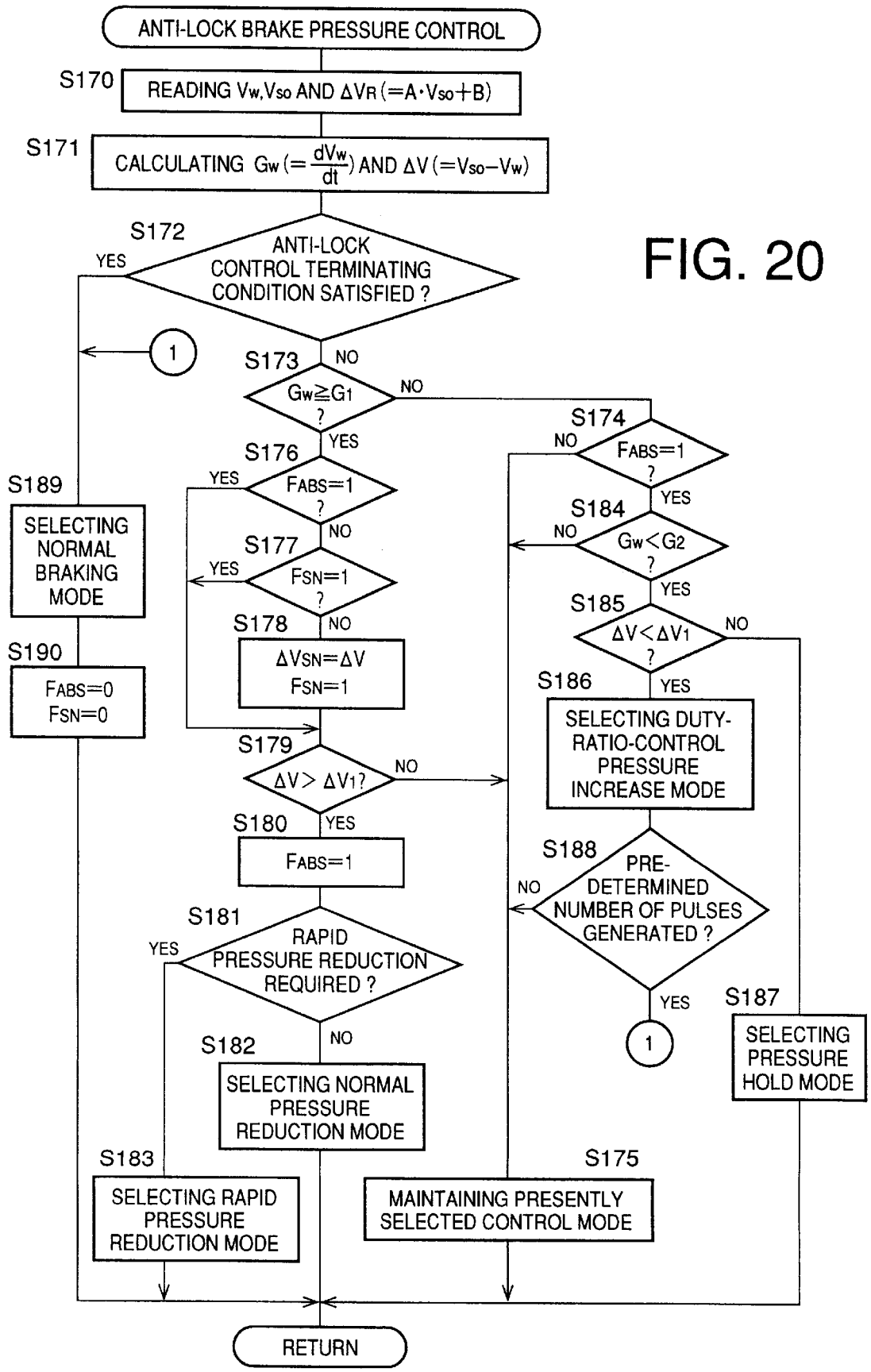
FIG. 20 is a flow chart illustrating an anti-lock brake pressure control routine executed by the above-indicated controller.

The anti-lock brake pressure control operation is performed according to a routine of FIG. 20 illustrated in the flow chart of FIG. 20.

The anti-lock brake pressure control routine of FIG. 20 is initiated with step S170 to read various parameters such as the rotating speeds Vw of the wheels, estimated vehicle running speed Vso and reference slip amount ΔVR. The vehicle running speed Vso is estimated according to a suitable routine not shown, on the basis of the highest one of the wheel speeds Vw, and the reference wheel slip amount WVR is obtained on the basis of the estimated vehicle running speed Vso. Step S170 is followed by step S171 to calculate the deceleration value Gw of each wheel and the amount of slip ΔV of each wheel. Then, step S172 is implemented to determine whether the predetermined anti-lock control terminating condition is satisfied. If a negative decision (NO) is obtained in step S172, the control flow goes to step S172 to determine whether the wheel deceleration value Gw is equal to or larger than the predetermined upper limit G1. If a negative decision (NO) is obtained in step S173, the control flow goes to step S174 to determine whether an ANTI-LOCK CONTROL flag $F_{ABS}$ is set at "1". This flag $F_{ABS}$ is set at "1" while the anti-lock brake pressure control operation is effected. If a negative decision (NO) is obtained in step S174, the control flow goes to step S175 in which the presently established control mode is maintained. Since the wheel deceleration value Gw is not so large, the anti-lock brake pressure control operation is not initiated, and the hydraulic braking system is placed in the normal braking mode.

When the wheel deceleration value G2 has been increased to the upper limit G1 while the anti-lock brake pressure control operation is not effected, that is, when an affirmative decision (YES) is obtained in step S172 and a negative decision (NO) is obtained in step S176, the initial wheel slip amount ΔVSN indicated above is determined in step S178 if it has not been determined, that is if a negative decision (NO) is obtained in step S177. The initial wheel slip amount ΔVSN is the wheel slip amount when the wheel deceleration G1 has increased to the upper limit G1. The initial wheel slip amount ΔVSN once determined in step S178 is maintained throughout the anti-lock brake pressure control operation. A SLIP AMOUNT DETERMINATION flag $F_{SN}$ is set to "1" after the initial wheel slip amount ΔVSN has been determined in step S178.

Step S178 is followed by step S179 to determine whether the wheel slip amount ΔV is larger than the predetermined upper limit ΔV1, which is equal to the sum of the initial wheel slip amount ΔVSN and the reference wheel slip amount ΔVR. When step S179 is implemented for the first time, the wheel slip amount ΔV is equal to the initial wheel slip amount ΔVSN, and a negative decision (NO) is obtained in step S179. In this case, the control flow goes to step S175 in which the presently established control mode is maintained, and the anti-lock brake pressure control operation is not initiated.

Step S179 is implemented also when the affirmative decision (YES) in steps S173 and S177 while the negative decision (NO) is obtained in step S176. If the wheel slip amount ΔV has exceeded the predetermined upper limit ΔV1 as a result of deterioration of the slipping condition of the wheel in question, an affirmative decision (YES) is obtained in step S179, and the control flow goes to step S180 to set the ANTI-LOCK CONTROL flag to "1", and to step S181 to determine whether rapid reduction of the fluid pressure in the appropriate wheel brake cylinder is required. If a negative decision (NO) is obtained in step S181, the control flow goes to step S182 to select the normal pressure reduction mode. If an affirmative decision (YES) is obtained in step S181, the control flow goes to step S183 to select the rapid pressure reduction mode.

When the normal pressure reduction mode is selected in step S182, the appropriate pressure-reducing solenoid shut-off valve 72, 42, 44 is opened, so that the fluid is discharged from the wheel brake cylinder and returned to the master reservoir 154 through the shut-off valve 72, 42, 44. When the rapid pressure reduction mode is selected in step S183, the affirmative decision (YES) is obtained in step S15 of the main routine of FIG. 6, and the control flow goes to step S16 in which the pressure-increasing solenoid voltage Vapply is zeroed, while the pressure-reducing solenoid voltage Vrelease is made equal to the maximum value Vmax. Then, step S18 is implemented to control the valve device 56 according to the voltage values Vapply and Vrelease, and open the pressure-reducing solenoid shut-off valve 72, 42, 44 and the pressure-increasing solenoid shut-off valve 58, 84, 86. As a result, the fluid is discharged from the wheel brake cylinder and returned to the master reservoir 18 through the shut-off valve 72, 42, 44 and to the pressure-reducing reservoir 154 through the shut-off valve 58, 84, 86. In this arrangement in which the fluid discharged from the wheel brake cylinder is returned to both of the master reservoir 18 and the pressure-reducing reservoir 154, the fluid pressure in the wheel brake cylinder in question is rapidly reduced.

When the wheel deceleration value Gw is reduced to be smaller than the predetermined upper limit G1 as a result of a decrease in the wheel slip amount ΔV owing to the fluid pressure reduction, the negative decision (NO) is obtained in step S173, and the control flow goes to step S174. In this case, the affirmative decision (YES) is obtained in step S174, and the control flow goes to step S184 to determine whether the wheel deceleration value Gw is smaller than the predetermined threshold G2. If an affirmative decision (YES) is obtained in step S184, the control flow goes to step S185 to determine whether the wheel slip amount ΔV is smaller than the predetermined upper limit ΔV1. Depending upon the decisions made in steps S184 and S185, the presently selected control mode (normal or rapid pressure reduction mode) is maintained, or the pressure hold mode or the duty-ratio-control pressure increase mode is selected. As described above, the duty-ratio-control pressure increase mode is selected in step S186 when the wheel deceleration value Gw is smaller than the threshold G2 and when the wheel slip amount ΔV is smaller than the predetermined upper limit ΔV1. The pressure hold mode is selected in step S187 when the wheel slip amount ΔV is equal to or larger than the upper limit ΔV1. In the other cases, the presently selected control mode is maintained.

When the number of pressure-increasing pulses generated in the duty-ratio-control pressure increase mode in step S186 has reached the predetermined value, an affirmative decision (YES) is obtained in step s188, and the control flow goes to step S189 to restore the braking system to the normal braking mode, that is, to terminate the anti-lock brake pressure control operation, and then to step S190 to reset the ANTI-LOCK CONTROL $F_{ABS}$ flag and the SLIP AMOUNT DETERMINATION flag $F_{SN}$ to "0". These steps S189 and S190 are also implemented when the predetermined anti-lock control terminating condition is satisfied, that is, if the affirmative decision (YES) is obtained in step S172.

It will be understood from the foregoing explanation of the present embodiment of this invention that the solenoid-operated biasing device 194 functions as a valve driving device which generates a drive force acting on the valve member 200 of the seating valve 190 in a first direction for moving the valve member 200 away from the valve seat 204. This drive force cooperates with the force based on the fluid pressure difference across the seating valve 190, to place the seating valve 190 in the open position. The above-indicated first direction or the biasing direction of the solenoid-operated biasing device 194 as the valve driving device is opposite to a second direction in which the valve member 200 is moved toward the valve seat 202 by the biasing force of the spring 202 (224) to place the seating valve 190 in the closed position. The solenoid-operated biasing device or valve drive device 194 may be referred to as "an electromagnetic driving device" or "an electrically operated driving device".

It will also be understood that a portion of the controller 66 assigned to implement steps S10, S12, S14 and S16 of the main routine of FIG. 6 constitutes a seating valve control device for controlling the seating valve 190. It will further be understood that a portion of the controller 66 assigned to implement step S124 of the sub-routine of FIG. 17 constitutes abutting velocity reducing means for reducing the velocity at which the valve member 200 is seated onto the valve member 204. The seating velocity reducing means may be referred to as "abutting noise reducing means", "abutting impact reducing means", "seating velocity reducing drive force generating means" and "seating velocity reducing voltage applying means". It will also be understood that a portion of the controller 66 assigned to implement steps S156 and S161 for exponentially reducing the solenoid voltages Vapply and Vrelease constitutes gradual drive force reducing means for reducing the valve drive force such that a rate of reduction of the seating velocity of the seating valve 190 is gradually reduced. The gradual drive force reducing means may be referred to as "drive force damping means" and "voltage damping means".

It will be understood that a portion of the controller 66 assigned to implement steps S127–S31 constitutes reservoir evacuating means for evacuating the pressure-reducing reservoir 154, and that the pressure-increasing and pressure-reducing linear solenoid valves 150, 154 constitute a control valve device, while the pressure-reducing reservoir 154 functions as a reservoir for accommodating the fluid.

It will further be understood that the linear solenoid valves 150, 152 provide operating state changing means for changing the operating state of the braking system and that a portion of the controller 66 assigned to implement steps S181, S183, S15, S16 and S18 constitutes rapidly pressure reducing means for rapidly reducing the fluid pressure in the wheel brake cylinder. The rapid pressure reducing means includes valve switching means for placing the pressure-reducing linear solenoid valve 152 in the open state.

In the first embodiment of FIGS. 17–19, the seating velocity of the seating valves 190 of the pressure-increasing and pressure-reducing linear solenoid valves 150 152 is gradually reduced for the predetermined time, by multiplying the solenoid voltages Vapply and Vrelease used in the last control cycle, by the predetermined constant α. This constant α is the same for the solenoid voltages Vapply and Vrelease. However, different constant values a may be used in steps S156 and S161 for the respective solenoid voltages Vapply and Vrelease. Since the biasing force of the spring 224 of the pressure-reducing linear solenoid valve 152 is larger than that of the spring 204 of the pressure-increasing linear solenoid valve 150, it is desirable that the pressure-reducing solenoid voltage Vrelease be higher than the pressure-increasing solenoid voltage Vapply, so that the seating velocity of the valve 152 is the same as that of the valve 150. In other words, it is desirable that the constant α for the voltage Vrelease be larger than that for the voltage Vapply, so that the voltage Vrelease is higher than the voltage Vapply.

Figure 25:
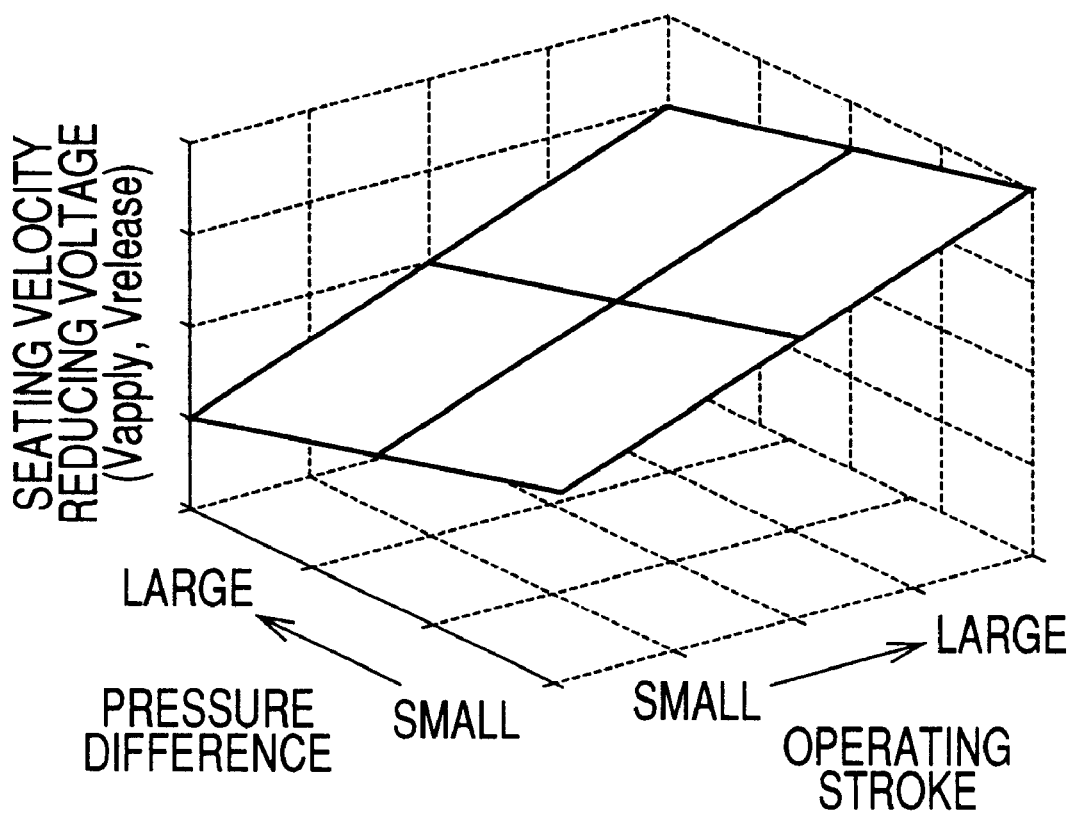
FIG. 25 is a view showing a data map for obtaining a solenoid voltage for reducing the seating velocity on the basis of an operating stroke and a pressure difference which are utilized in step S274 of FIG. 23.
Figure 26:
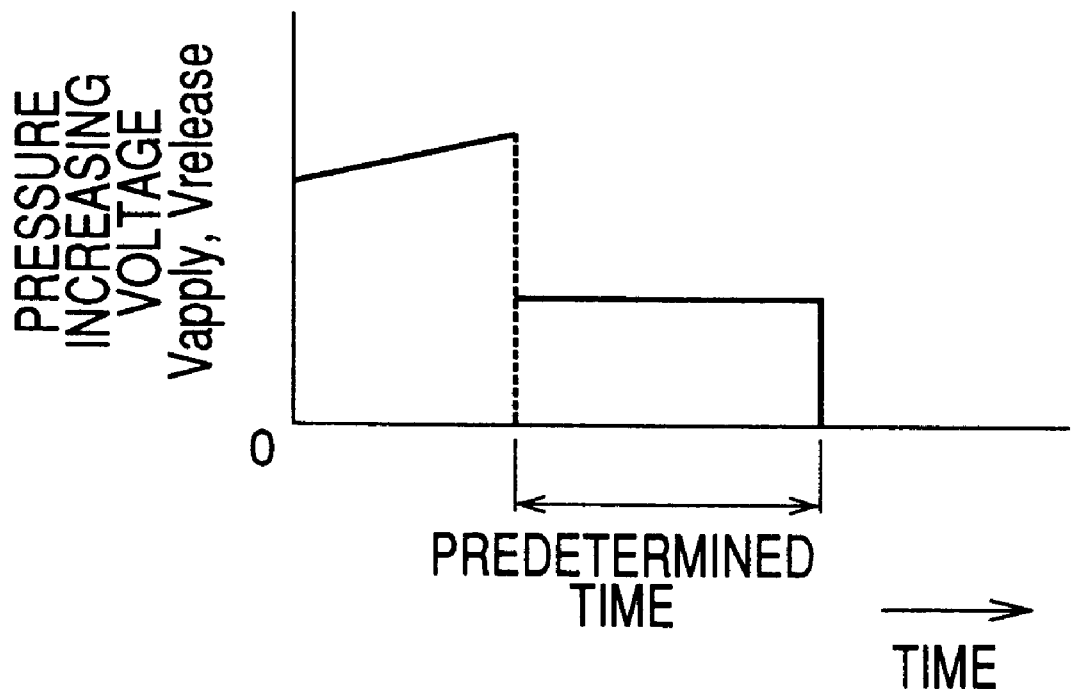
FIG. 26 is a view showing an example of reduction of a solenoid voltage as a result of the operation of FIG. 23.

Further, the predetermined constant voltages Vapply and Vrelease may be applied to the seating valves 190 of the valves 150, 152, for a predetermined time after the pressure holding state is selected following the pressure increasing or reducing state, as indicated in the graph of FIG. 26. In this case, the constant voltage Vapply, Vrelease of each valve 150, 152 is determined on the basis of a distance between the valve member 200 and the valve seat 202, namely, an operating stroke x of the valve member 200, and on the basis of the pressure difference force Fd based on a pressure difference Pdiffa, Pdiffr across the seating valve 190. For instance, the constant voltage Vapply is determined according to a data map as indicated in FIG. 25, which is formulated such that the voltage Vapply, Vrelease increases with an increase in the operating stroke x and with a decrease in the pressure difference force Fd (pressure difference Pdiffa, Pdiffr).

Figure 21:
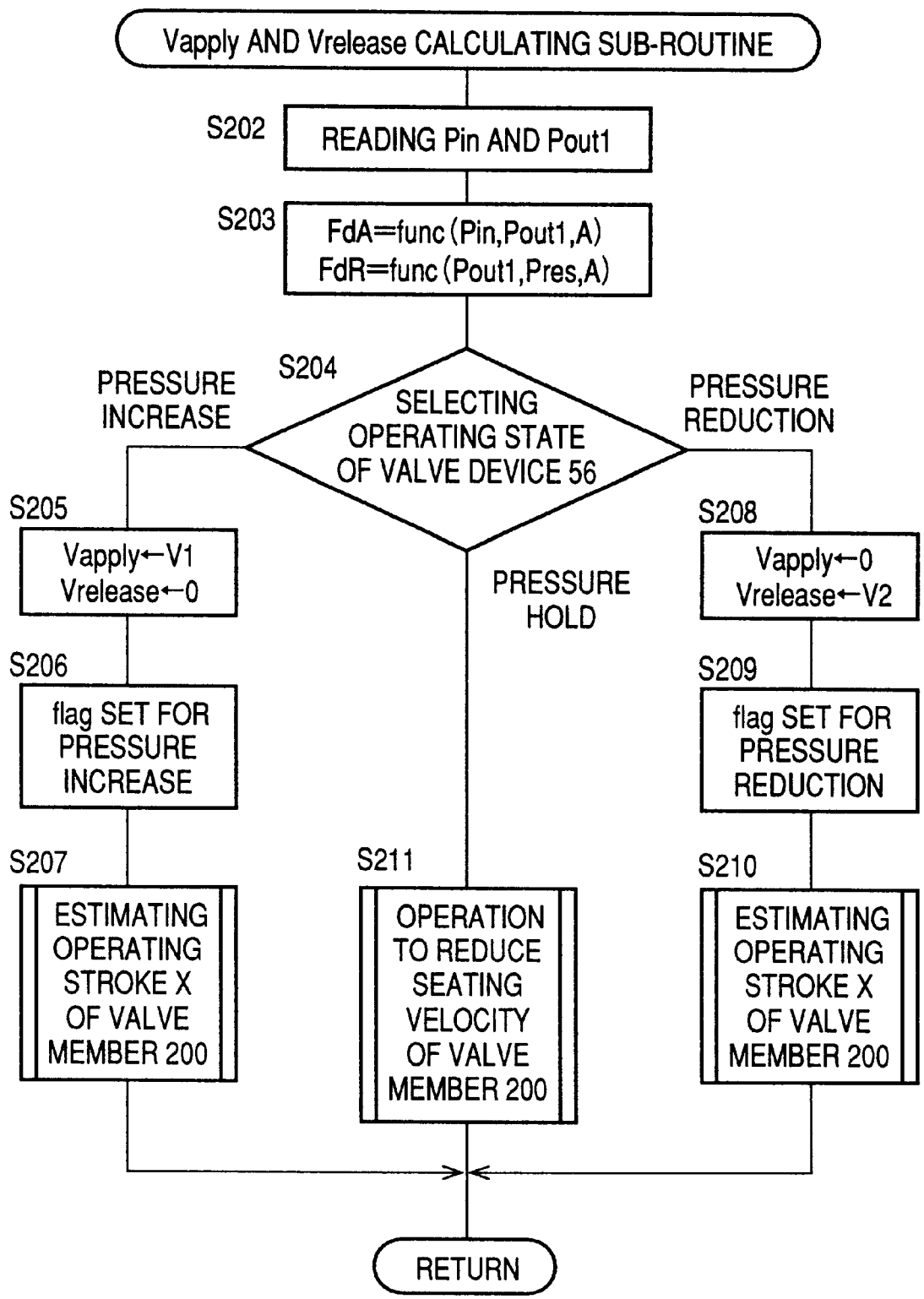
FIG. 21 is a flow chart illustrating a sub-routine executed in step S14 of the main routine of FIG. 6, in a hydraulically operated braking system according to another embodiment of this invention.

The above modification is achieved in a second embodiment of this invention, wherein a sub-routine illustrated in the flow chart of FIG. 21 is executed in place of the sub-routine of FIG. 17. The sub-routine of FIG. 21 is initiated with steps S202 and S203 to read the input and output fluid pressures Pin and Pout1 detected by the pressure sensors 62, 64, and calculate the pressure difference forces FdA and FdR based on the pressure differences Pdiffa, Pdiffr across the respective seating valves 190 of the valves 150, 152.

The pressure difference force FdA of the pressure-increasing linear solenoid valve 150 is obtained on the basis of the input fluid pressure Pin, output fluid pressure Pout1 and a pressure-receiving area A of the seating valve 190. The pressure difference force FdR is obtained on the basis of the output fluid pressure Pout1, pressure Pres in the pressure-reducing reservoir 154, and pressure-receiving surface A of the seating valve 190. Step S203 is followed by step S204 to select one of the pressure increasing, reducing and holding states of the valve device 56, according to the concept of FIG. 14.

If the pressure increasing state is selected, the control flow goes to step S205 to set the voltage Vapply to v1 and zero the voltage Vrelease, and S206 to set the pressure control variable "flag" to "1" indicative of the pressure increasing state. Step S207 is then implemented to estimate the operating stroke x of the valve member 200.

If the pressure reducing state is selected, the control flow goes to steps S208, S209 and S210 to zero the voltage Vapply, set the voltage Vrelease to v2, set the variable "flag" to "2" indicative of the pressure reducing state, and estimate the operating stroke x.

If the pressure holding state is selected, the control flow goes to step S211 in which an operation to reduce the seating velocity of the seating valve 190 is implemented.

Figure 4:
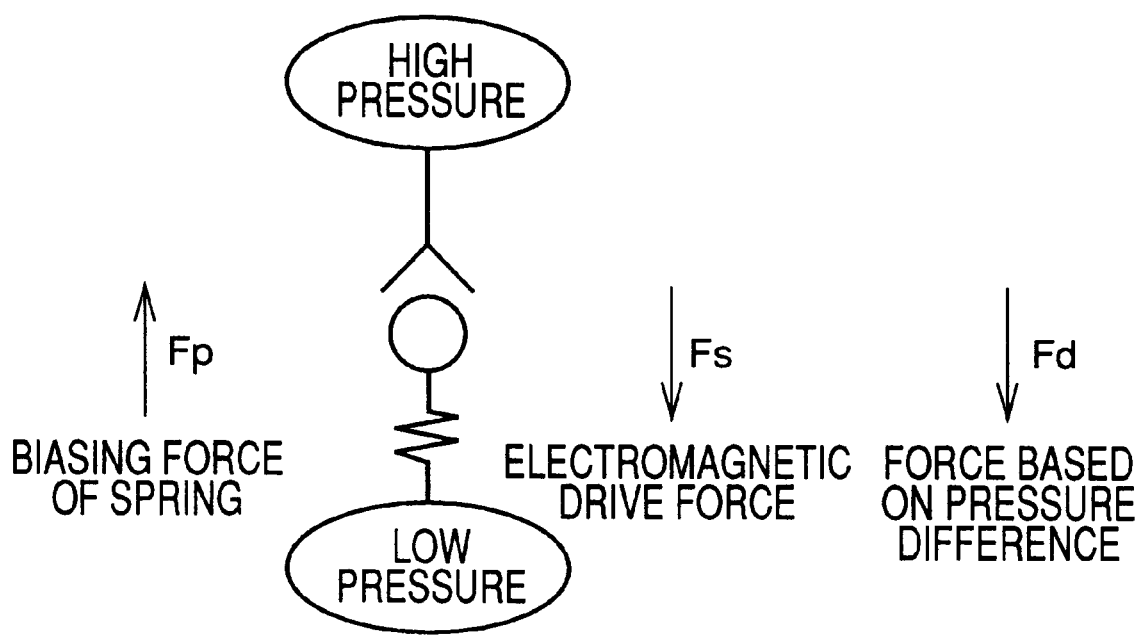
FIG. 4 is a view schematically showing the linear solenoid valve device of FIG. 2.
Figure 22:
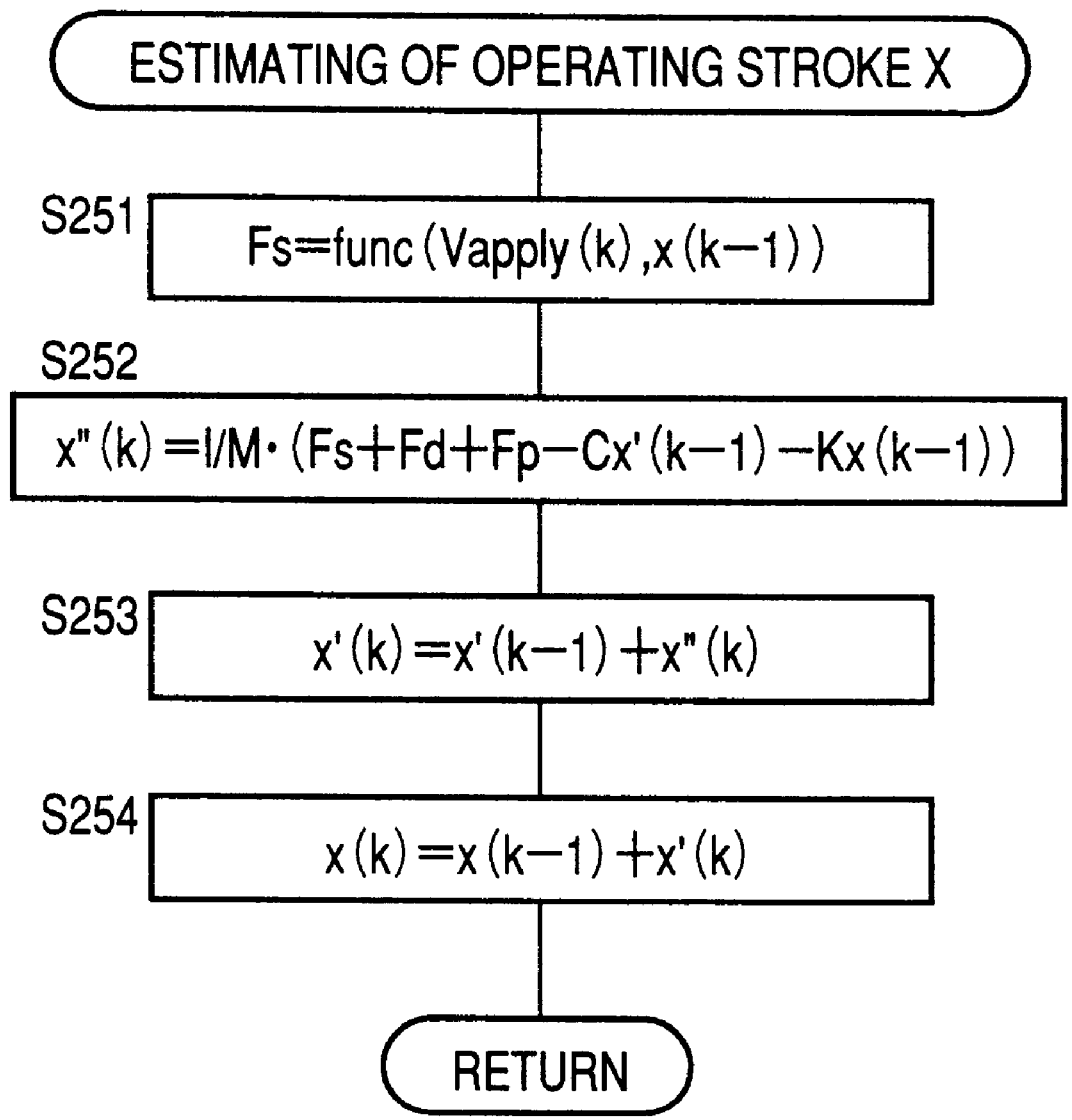
FIG. 22 is a flow chart illustrating an example of an operation in step S207 of the sub-routine of FIG. 21.

The operating stroke of the valve member 200 of the seating valve 190 of the pressure-increasing linear solenoid valve 150 is estimated according to a routine illustrated in the flow chart of FIG. 22. The operating stroke x of the seating valve 190 and the forces acting thereon have a relationship represented by the following equation (10), as is apparent from FIG. 4.

$$Mx''+Cx'+Kx=Fs+Fd+Fp+Ff \quad (10)$$

Figure 24:
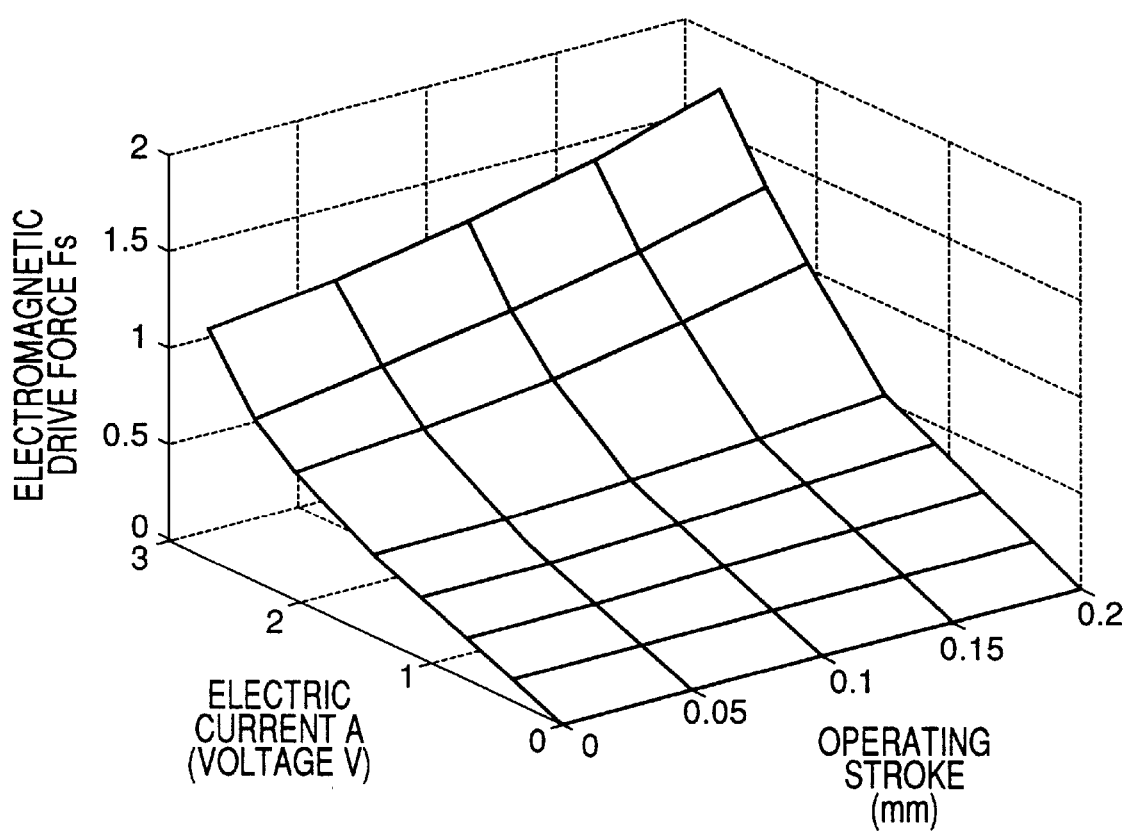
FIG. 24 is a view showing a data map for obtaining an electromagnetic biasing force on the basis of an operating stroke and a solenoid voltage which are utilized in step S251 of FIG. 22.

The operating stroke x is estimated according to the above equation (10), wherein M, C, K, Fs, Fd, Fp and Ff represent the following:

M=Mass of the valve member 200 of the seating valve 190,
C=Damping coefficient of the seating valve 190,
K=Modulus of elasticity of spring 206, Fs=Electromagnetic drive force of biasing device 194,
Fd=Pressure difference force Fd,
Fp=Biasing force of the spring 206,
Ff: Fluid force Since the fluid force Ff is very small as compared with the other forces, this fluid force Ff is considered to be zero. As described previously, the pressure difference force Fd and the electromagnetic drive force Fs act on the valve member 200 in the direction opposite to the biasing direction of the spring 206. The pressure difference force Fd, more precisely, FdA is obtained in step S203, and the biasing force Fp of the spring 206 is obtained on the basis of the operating stroke x(k−1) estimated in the last control cycle. The electromagnetic drive force Fs is estimated according to a data map as indicated in the graph of FIG. 24, on the basis of the operating stroke x(k−1) and the pressure-increasing solenoid voltage Vapply. The mass M, damping coefficient C and modulus of elasticity K are known values.

The routine of FIG. 22 is initiated with step S251 to estimate the electromagnetic drive force Fs. When step S207 of FIG. 21 is implemented for the first time, the operating stroke x(k−1) in the last control cycle is zero. A velocity x'(k−1) and an acceleration x"(k−1) in the last control cycle are also zero. As described below, these values x, x', x" are initially set to zero when the pressure holding state is selected (when the voltage Vapply is zero). That is, these values x, x', x" are zeroed when the brake pedal 19 is released. Step S251 is followed by step S252 to obtain the acceleration x" according to the above equation. Then, step S253 is implemented to obtain the velocity x'(k) in the present control cycle, by adding the acceleration x" (k) obtained in the present control cycle to the velocity x'(k−1) in the last control cycle. Step S253 is followed by step S254 to obtain the operating stroke x(k) in the present control cycle, by adding the present velocity x'(k) to the last operating stroke x(k−1).

The operating stroke x of the valve member 200 of the pressure-reducing linear solenoid valve 150 is obtained similarly. In this case, the voltage Vrelease rather than Vapply is used to obtain the operating stroke x.

Figure 23:
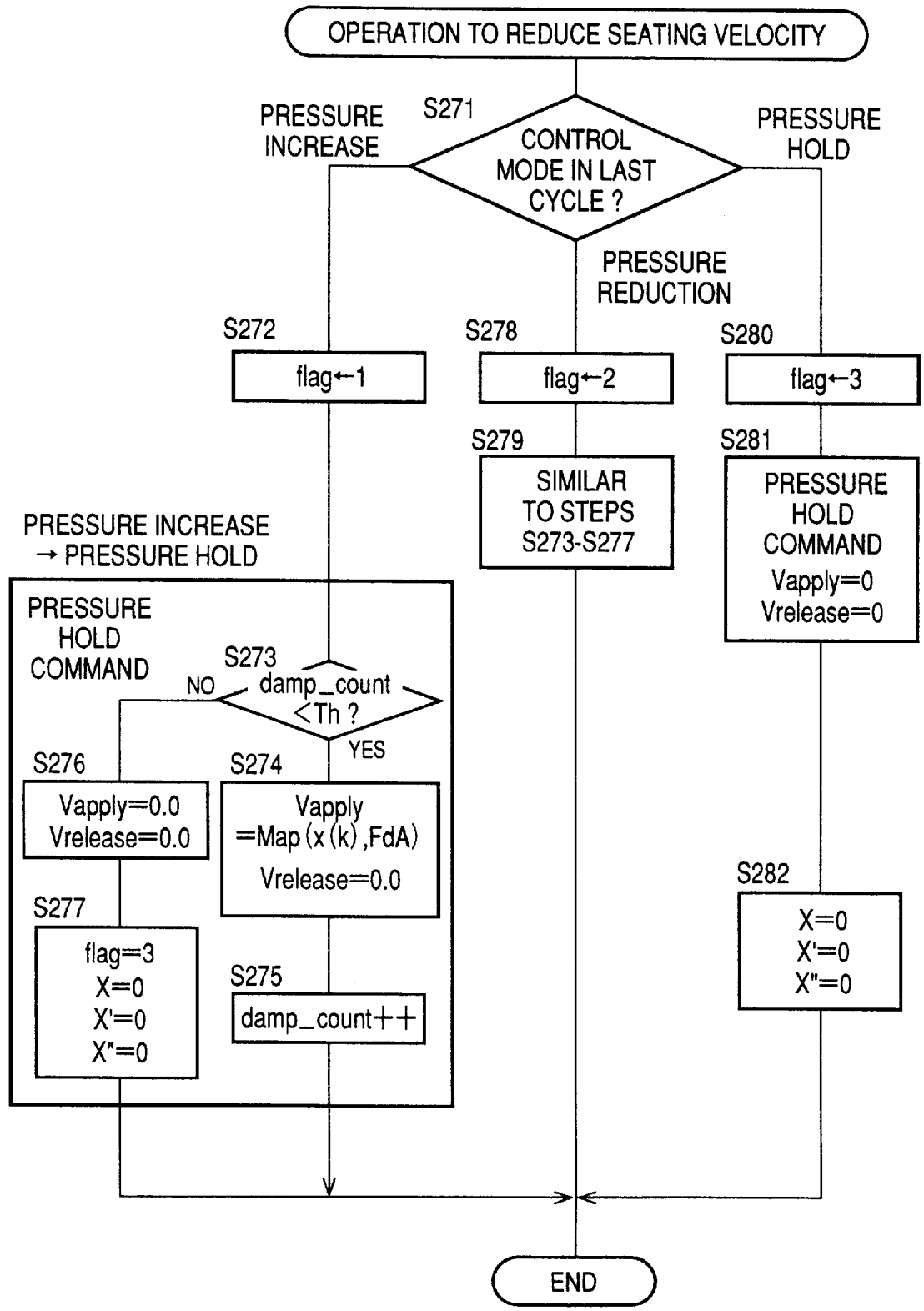
FIG. 23 is a flow chart illustrating an example of an operation to reduce the seating velocity of the seating valve of the linear solenoid valve device, in step S211 of the sub-routine of FIG. 21.

Like step S124 of FIG. 17 in the first embodiment, step S211 of the routine of FIG. 21 to reduce the seating velocity of the seating valve 190 is implemented when the pressure increasing or reducing state is changed to the pressure holding state. In the present second embodiment, step S211 is implemented as indicated in the flow chart of FIG. 23, which includes step S274 implemented when the pressure increasing state is changed to the pressure holding state. In step S274, the pressure-increasing solenoid voltage Vapply applied to the solenoid coil 210 of the seating valve of the valve 150 so as to reduce the seating velocity is determined on the basis of the operating stroke x estimated according to the sub-routine of FIG. 22 and the pressure difference force Fd, according to the data map of FIG. 25. The thus determined constant voltage Vapply (higher than zero) is applied to the solenoid coil 210 for the predetermined time, that is, until the negative decision (NO) is obtained in step S273. When the predetermined time has passed after the initiation of application of the constant voltage Vapply, steps S276, S277 are implemented to zero both of the pressure-increasing and pressure-reducing solenoid voltages Vapply, Vrelease and set the pressure control variable "flag" to "3" indicative of the pressure holding state. In step S277, the operating stroke x, velocity x' and acceleration x" are zeroed, since the valve member 200 has been seated on the valve seat 202 with the voltages Vapply, Vrelease being zeroed.

When the pressure holding state is selected, too, the operating stroke x, velocity x' and acceleration x" are zero.

Where the pressure reducing state is changed to the pressure holding state, step S279 is implemented. This step S279 consists of steps similar to steps S273–S277. In this case, the constant voltage Vrelease is determined on the basis of the operating stroke x(k) and the pressure difference force FdR.

In the first and second embodiments described above, the voltages Vapply, Vrelease so as to reduce the seating velocity of the seating valves 190 are applied to the solenoid coil 210 for a predetermined time between a moment immediately after the pressure holding state is selected following the pressure increasing or reducing state and a moment immediately before the valve member 200 is seated onto the valve seat 202. However, the application of the seating velocity reducing voltage Vapply, Vrelease may be initiated a predetermined time after the pressure holding state is selected, that is, a predetermined time after the movement of the valve member 200 toward the valve seat 202 to close the seating valve 190 is initiated. Further, the seating velocity reducing voltage may be applied intermittently at different times during the movement of the valve member 200. In any case, the application of the seating velocity reducing voltage must be terminated immediately before the abutting contact of the valve member 200 with the valve seat 202.

Figure 27:
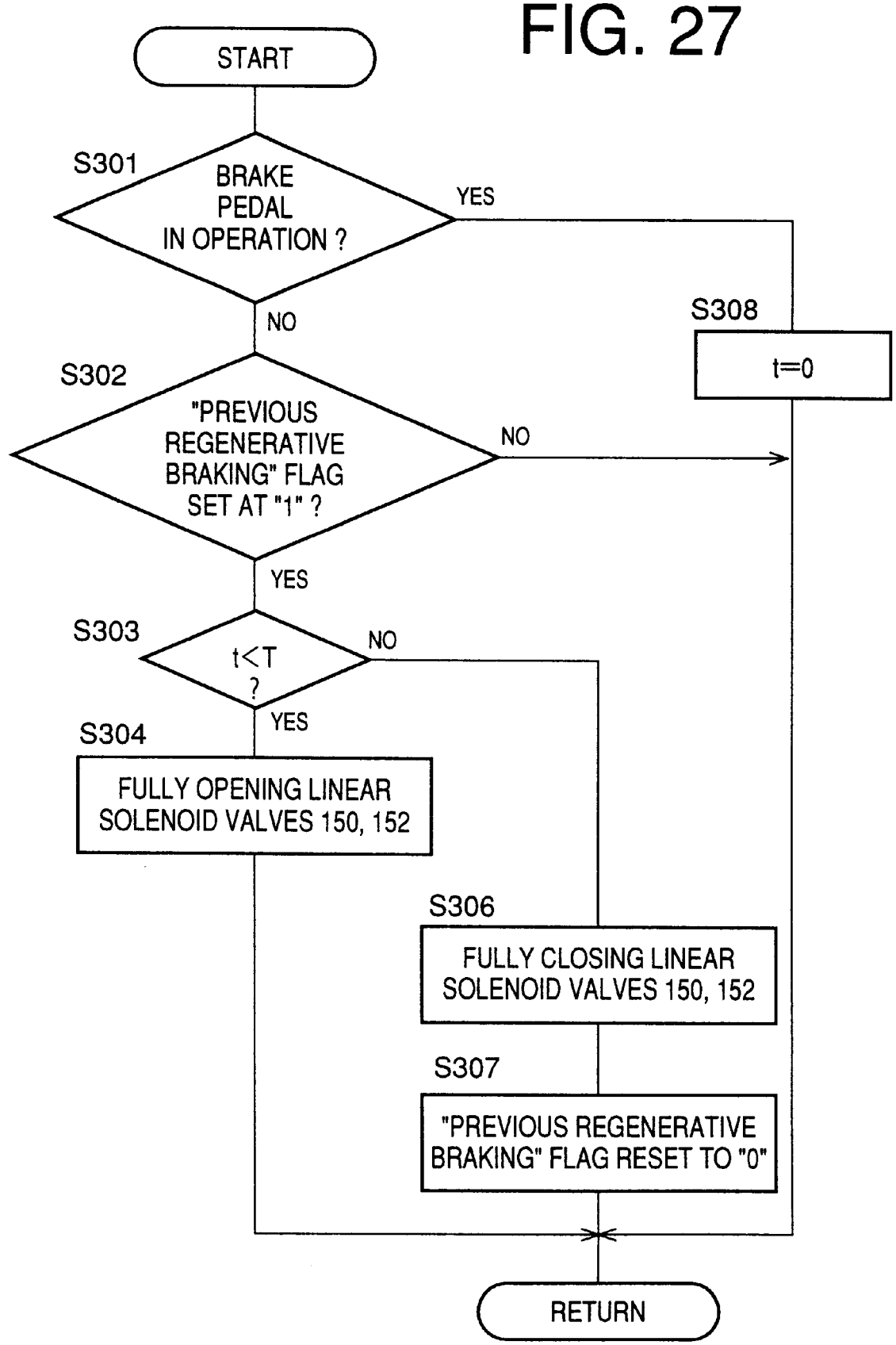
FIG. 27 is a flow chart illustrating a reservoir evacuating routine executed in a braking system according to a further embodiment of this invention, when brake pedal is not in operation.

In the first embodiment, the elimination of the residual fluid pressures in the wheel brake cylinders and the evacuation of the pressure-reducing reservoir 154 are effected immediately before termination of a braking operation. However, the above elimination and evacuation may be effected after the termination of the braking operation, or may be effected at different times. In the latter case, the elimination of the residual fluid pressure is effected immediately before the termination of the braking operation, and the evacuation of the reservoir 154 is effected after the termination.

Where the residual fluid pressure is eliminated immediately before termination of a braking operation and the reservoir 154 is evacuated after the termination, the evacuation may be effected as indicated in the flow chart of FIG. 27. According to a routine of this flow chart according to a third embodiment of this invention, the reservoir 154 is evacuated by opening both of the pressure-increasing and pressure-reducing linear solenoid valves 150, 152 while the hydraulic braking system is not in operation. The routine of FIG. 27 does not require the pressure control variable "flag" to be set to "4" since the valves 150, 152 are opened while the hydraulic braking system in not in operation, but requires the use of a PREVIOUS REGENERATIVE BRAKING flag which is not required in the sub-routine of FIG. 17. The PREVIOUS REGENERATIVE BRAKING flag set at "1" indicates that the regenerative braking system was operated during the last braking operation of the hydraulic braking system, that is, indicates that the hydraulic braking system was operated in the cooperative control mode in cooperation with the regenerative braking system. In the present embodiment, the PREVIOUS REGENERATIVE BRAKING flag is set to "1" when the solenoid voltages Vapply and Vrelease have been determined to be higher than zero during the last braking operation. If the solenoid voltages Vapply, Vrelease have not been determined to be higher than zero, this flag is reset to "0". The flag is also reset when the operation to eliminate the residual fluid pressure has been completed. According to the routine of FIG. 27, the pressure-reducing reservoir 154 is evacuated after a braking operation in which the hydraulic braking system is operated in the cooperative control mode, that is, when the PREVIOUS REGENERATIVE BRAKING flag is set at "1". In this respect, it is noted that there is a high possibility that some amount of the fluid is left in the reservoir 154 where the last braking operation was performed in the cooperative control mode. The reservoir 154 is not evacuated where the flag is set at "0", since there is a low possibility of the fluid remaining in the reservoir 154 in this case.

The routine of FIG. 27 is initiated with step S201 to determine whether the hydraulic braking system is in operation with the brake pedal 19 being depressed. If a negative decision (NO) is obtained in step S301, the control flow goes to step S302 to determine whether the PREVIOUS REGENERATIVE BRAKING flag is set at "1". If an affirmative decision (YES) is obtained in step S302, the control flow goes to steps S303 and S304 in which the maximum voltage Vmax is applied as the solenoid voltages Vapply and Vrelease to the pressure-increasing and pressure-reducing linear solenoid valves 150, 152, for a predetermined time T, so that these valves 150, 152 are opened, to return the fluid from the reservoir 154 to the master reservoir 18 (master cylinder 12) through the open valves 152, 150. When the predetermined time T has passed, that is, if a negative decision (NO) is obtained in step S303, the control flow goes to step S306 in which the linear solenoid valves 150, 152 are closed with the solenoid voltages Vapply, Vrelease being zeroed. Step S306 is followed by step S307 in which the PREVIOUS REGENERATIVE BRAKING flag is reset to "0". Accordingly, the operation to evacuate the reservoir 154 is performed only once. A time counter to measure a time t during which the valves 150, 152 are held open Step S303 is used in step S303 to determine whether the time t is less than the predetermined time T. This time counter is reset to "0" in step S308 when an operation of the hydraulic braking system is initiated.

Although the routine of FIG. 27 is adapted to evacuate the reservoir 154 once while the braking system is not in operation, the reservoir 154 may be evacuated two or more times. In this case, step S307 may be modified not to reset the PREVIOUS REGENERATIVE BRAKING flag to "0" and to reset the time counter to "0".

Figure 28:
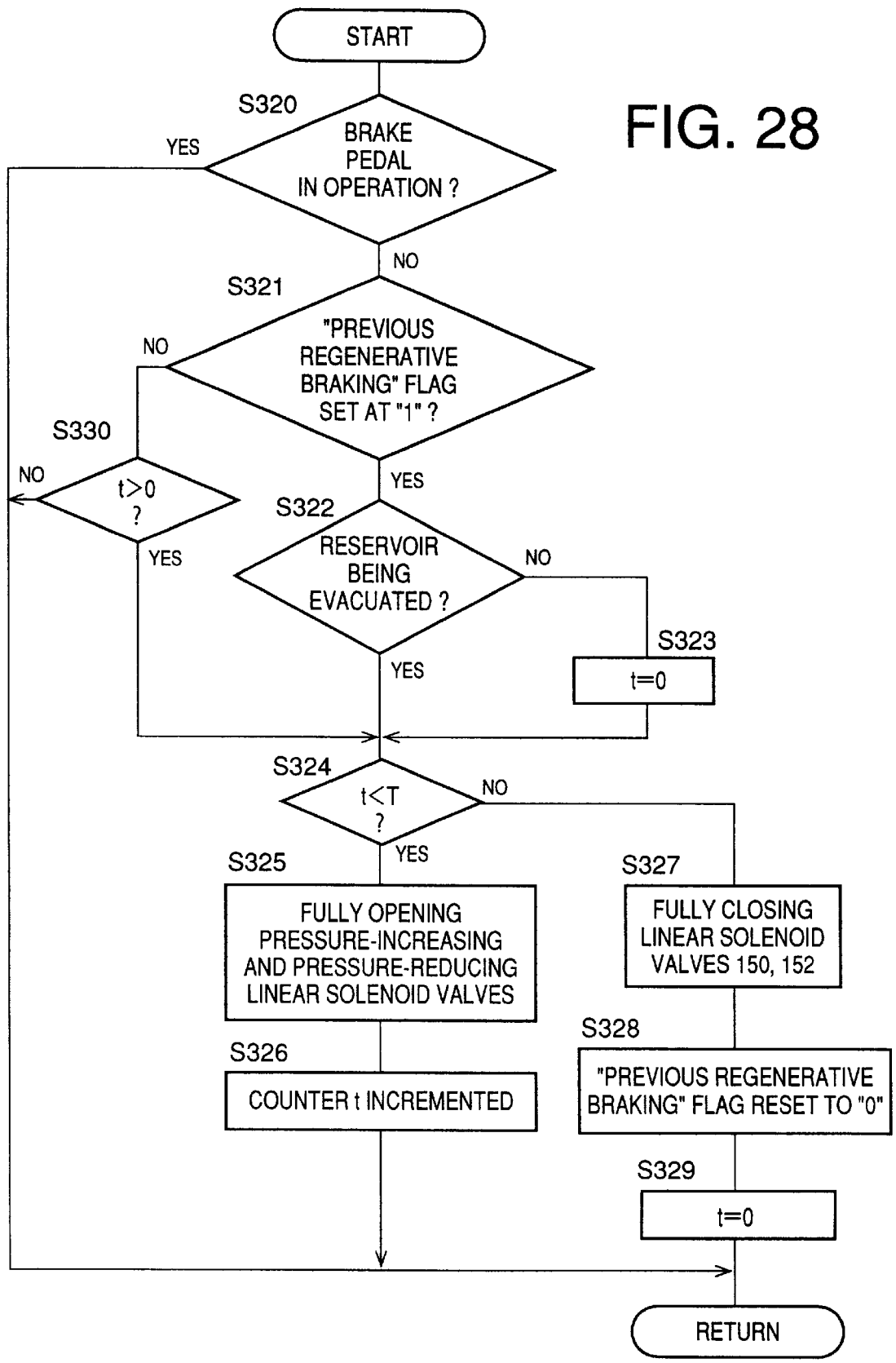
FIG. 28 is a flow chart illustrating a reservoir evacuating routine executed in a braking system according to a still further embodiment of this invention, when brake pedal is not in operation.

Further, the reservoir 154 may be evacuated as illustrated in the flow chart of FIG. 28, according to a fourth embodiment of this invention. A routine of FIG. 28 is arranged to interrupt the evacuation of the reservoir 154 when the brake pedal 19 is depressed, and to resume the evacuation after the releasing of the brake pedal 19 so that the evacuation is effected for a remaining portion of the predetermined evacuation time.

The routine of FIG. 28 is initiated with steps S320 and S321 to determine whether the hydraulic braking system is in operation and whether the PREVIOUS REGENERATIVE BRAKING flag is set at "1". If a negative decision (NO) and an affirmative decision (YES) are obtained in steps S320 and S321, respectively, the control flow goes to step S322 to determine whether the reservoir 154 is being evacuated, that is, whether the linear solenoid valves 150, 152 are open with the solenoid voltages Vapply and Vrelease being equal to Vmax. If an affirmative decision (YES) is obtained in step S322, steps S324–S326 are repeatedly implemented to evacuate the reservoir 154 for the predetermined time T. If a negative decision (NO) is obtained in step S322, the control flow goes to step S323 to reset the time counter to "0", and steps S324–S326 are repeatedly implemented to evacuate the reservoir 154 for the predetermined time T. The time counter is incremented in step S326 to measure the time t during which the valves 150, 152 are open with the solenoid voltages Vapply and Vrelease being equal to Vmax. If the predetermined time T has passed, steps S327–S329 are implemented to close the linear solenoid valves 150, 152, reset the PREVIOUS REGENERATIVE BRAKING flag and the time counter to "0".

If the brake pedal 19 is depressed while the reservoir 154 is being evacuated, an affirmative decision (YES) is obtained in step S320, and steps S324–S326 are not implemented, that is, the evacuation of the reservoir 154 is interrupted, and the time counter is not incremented.

When the brake pedal 19 is subsequently released, that is, when the affirmative decision (YES) is subsequently obtained in step S320, step S32 is implemented to determine whether the PREVIOUS REGENERATIVE BRAKING flag is set at "1". If the braking system was operated in the cooperative control mode in cooperation with the generative braking system, that is, if the affirmative decision (YES) is obtained in step S321, the control flow goes to step S322 to determine whether the reservoir 154 is being evacuated. Since the reservoir 154 is not being evacuated, in this case, the control flow goes to step S323 to reset the time counter, and then steps S324–S326 are repeatedly implemented to hold the valves 150, 152 open for the predetermined time T, that is, until a negative decision (NO) is obtained in step S324. If the hydraulic braking system was not operated in the cooperative control mode, the negative decision (NO) is obtained in step S321, and the control flow goes to step S330 to determine whether the content of the time counter is larger than zero. If an affirmative decision (YES) is obtained in step S330, steps S324–S326 are repeatedly implemented to evacuate the reservoir 154 for only the remaining time (=T−t). Thus, the electric energy required to evacuate the reservoir 154 is saved. If the reservoir 154 was evacuated for the predetermined time T, a negative decision (NO) is obtained in step S330, steps S324–S326 are not implemented.

The use of the PREVIOUS REGENERATIVE BRAKING flag is not essential. That is, the reservoir 154 may be evacuated even when the regenerative braking system was not operated in the last braking operation. In this respect, it is noted that some amount of the fluid remains in the reservoir 154 due to leakage of the fluid from the pressure-reducing linear solenoid valve 150 or check valve 158 even when the hydraulic braking system was not operated in cooperation with the regenerative braking system.

The evacuation of the reservoir 154 is desirable particularly where the storage capacity of the reservoir 154 is relatively small. However, the evacuation is effective even where the reservoir 154 has an ordinary storage capacity, as in the illustrated embodiments.

In the illustrated embodiments, the necessity to effect rapid reduction of the fluid pressure in the wheel brake cylinder in the anti-lock brake pressure control operation is detected on the basis of both the wheel brake cylinder pressure and the amount of reduction of the wheel speed (deceleration of the wheel). However, the necessity may be detected on the basis of at least one of the wheel brake cylinder pressure and the wheel acceleration.

The fluid pressure in the wheel brake cylinder may be rapidly reduced by using a pressure transfer device which has a cylinder and a piston cooperating with the cylinder to define a pair of fluid chambers and which is disposed between the wheel brake cylinder and pressure-increasing and pressure-reducing solenoid-operated shut-off valves. These shut-off valves are connected to one of the fluid chambers of the pressure transfer device, while the wheel brake cylinder is connected to the other fluid chamber. When the fluid is discharged from one of the fluid chambers through the pressure-reducing shut-off valve, the volume of the other fluid chamber of the pressure transfer device is increased, so that the fluid is discharged from the wheel brake cylinder. When the fluid is discharged from both of the pressure-increasing and pressure-reducing shut-off valves, the rate of reduction of the fluid pressure in the wheel brake cylinder can be increased, whereby the wheel brake cylinder pressure can be rapidly reduced.

While the conditions to select one of the pressure reduction, increase and hold modes in the anti-lock brake pressure control operation have been described by reference to the flow chart of FIG. 20, these conditions are not limited to those in the flow chart of FIG. 20, but may be suitably changed. Further, the conditions to initiate and terminate the anti-lock brake pressure control operation are not limited to those of FIG. 20.

While the illustrated embodiments use the pressure sensors 110, 112, 114 to detect the fluid pressures in the wheel brake cylinders 24, 26, 50, 52, the use of these pressure sensors is not essential. The wheel brake cylinder pressures may be estimated on the basis of the times of the pressure increase, normal pressure reduction and rapid pressure reduction in the anti-lock brake pressure control operation.

Although the feed-forward control portion 300 and the feedback control portion 302 are employed in the illustrated embodiments to determine the pressure-increasing and pressure-reducing solenoid voltages Vapply and Vrelease, only one of these two portions 300, 302 may be employed to determine the solenoid voltages Vapply, Vrelease.

The hydraulic braking system in the illustrated embodiments is adapted to be used for a motor vehicle equipped with the regenerative braking system, the principle of this invention is equally applicable to a hydraulic braking system for a motor vehicle not equipped with a regenerative braking system. In this case, the basic control is substantially the same as in the illustrated embodiment, except in that the calculation of the hydraulic braking force by subtracting the regenerative braking force from the desired total braking force is not necessary. The invention is also applicable to a hydraulic braking system wherein a hydraulic control valve device including solenoid-operated directional control valves and shut-off valves is used in place of the linear solenoid valve device 56. It is also possible to eliminate the residual fluid pressure in the wheel brake cylinders when a movement of a brake operating member such as the brake pedal 19 to the non-operated position is detected by a suitable detecting means such as a switch.

The fluid chamber 186 of the pressure-reducing reservoir 154 may be exposed to the atmosphere.

It is to be understood that the present invention is not limited to the details of the illustrated embodiments, but may be embodied with various other changes, modifications and improvements, which may occur to those skilled in the art, without departing from the spirit and scope of the invention defined in the following claims:

What is claimed is:

1. A hydraulically operated braking system for a motor vehicle having a wheel, including (a) a brake including a wheel brake cylinder to which a pressurized fluid is supplied to brake said wheel, (b) a seating valve which is disposed in a fluid passage connected to said wheel brake cylinder and which includes a valve seat, a valve member movable toward and away from said valve seat, biasing means which biases said valve member in a first direction for seating of the valve member onto said valve seat to close said seating valve, and a valve driving device for generating a valve drive force acting on said valve member in a second direction opposite to said first direction, for moving said valve member away from said valve seat, and (c) a seating valve control device for controlling said valve driving device of said seating valve to selectively open and close said seating valve, for thereby regulating a pressure of said pressurized fluid in said wheel brake cylinder, wherein an improvement comprises:

said seating valve control device comprising seating velocity reducing means for commanding said valve driving device to generate a valve drive force, during at least a portion of a movement of said valve member for seating onto said valve seat, for reducing a seating velocity at which said valve member is seated onto said valve seat, so that the seating velocity reduced by said valve drive force is lower than a seating velocity at which said valve drive force is not generated by said valve driving device.

2. A hydraulically operated braking system according to claim 1, wherein said seating velocity reducing means includes gradual drive force reducing means for reducing said valve drive force such that a rate of reduction of said seating velocity of said valve member is gradually reduced.

3. A hydraulically operated braking system according to claim 2, wherein said gradual drive force reducing means determines a present value of said valve drive force by multiplying a last value of said valve drive force by a predetermined constant which is smaller than one.

4. A hydraulically operated braking system according to claim 1, wherein said seating velocity reducing means includes stopping drive force generating means for generating a constant valve drive force, at least immediately before seating of said valve member onto said valve seat, said constant valve drive force being sufficient to substantially stop said movement of said valve member.

5. A hydraulically operated braking system according to claim 4, wherein said seating velocity reducing means further includes operating stroke obtaining means for obtaining a distance between said valve member and said valve seat upon initiation of said movement of said valve member toward said valve seat, and said stopping drive force generating means determines said constant valve drive force on the basis of said distance obtained by said operating stroke obtaining means.

6. A hydraulically operated braking system according to claim 4, wherein said seating velocity reducing means further includes pressure difference force obtaining means for obtaining a pressure difference force which acts on said valve member based on a pressure difference of the fluid across said seating valve, and said stopping drive force generating means determines said constant valve drive force further on the basis of said pressure difference force obtained by said pressure difference force obtaining means.

7. A hydraulically operated braking system according to claim 1, further including a pressure-increasing control valve and a pressure-reducing control valve at least one of which is said seating valve, said pressure-increasing control valve having a pressure increasing state in which said valve member is spaced apart from said valve seat, to permit a flow of the fluid into said wheel brake cylinder at a flow rate corresponding to a distance between said valve member and said valve seat, and a pressure holding state in which said valve member is seated on said valve seat, to inhibit said flow of the fluid into said wheel brake cylinder, said pressure-reducing control valve having a pressure reducing state in which said valve member is spaced apart from said valve seat, to permit a flow of the fluid from said wheel brake cylinder at a flow rate corresponding to a distance between the valve member and the valve seat, and a pressure holding state in which said valve member is seated on said valve seat, to inhibit said flow of the fluid from said wheel brake cylinder.

8. A hydraulically operated braking system according to claim 1, wherein said valve driving device includes a movable member which is formed of a ferromagenetic material and which is movable with said valve member, and a solenoid coil which is energized to produce a magnetic field for moving said movable member in said second direction opposite to said first direction which said valve member is biased by said biasing means.

9. A braking system for a motor vehicle, including a hydraulically operated braking system as set forth in claim 1, and a regenerative braking system including an electric motor which generates a regenerative braking force for braking said wheel.

\* \* \* \* \*